(12) United States Patent
Ichihara et al.

(10) Patent No.: US 6,741,524 B2
(45) Date of Patent: May 25, 2004

(54) THERMALLY-ASSISTED MAGNETIC RECORDING AND REPRODUCING DEVICE HAVING AN ELECTRON BEAM THERMAL SOURCE

(75) Inventors: Katsutaro Ichihara, Yokohama (JP); Junichi Akiyama, Kawasaki (JP); Akira Kikitsu, Yokohama (JP); Tsutomu Tanaka, Oume (JP); Kuniyoshi Tanaka, Miura (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 387 days.

(21) Appl. No.: 09/749,802

(22) Filed: Dec. 28, 2000

(65) Prior Publication Data

US 2001/0006435 A1 Jul. 5, 2001

(30) Foreign Application Priority Data

Dec. 28, 1999 (JP) .......................... 11-375042

(51) Int. Cl.[7] .............................................. G11B 11/00
(52) U.S. Cl. ........................................ 369/13.01; 360/59
(58) Field of Search .......................... 369/13.13, 13.33, 369/13.17, 13.14, 13.01, 13.02; 360/59, 313, 328, 114.01, 114.02

(56) References Cited

U.S. PATENT DOCUMENTS 6,317,280 B1 * 11/2001 Nakajima et al. ............ 360/59
6,367,924 B1 * 4/2002 Sato et al. .................. 347/105
6,404,706 B1 * 6/2002 Stovall et al. ............ 369/13.17
6,493,164 B1 * 12/2002 Kikitsu et al. ................ 360/59
6,493,183 B1 * 12/2002 Kasiraj et al. .............. 360/126
6,507,540 B1 * 1/2003 Berg et al. ............... 369/13.13
6,515,814 B1 * 2/2003 Hamamoto et al. .......... 360/59
6,532,125 B1 * 3/2003 Hamann et al. ............. 360/59

FOREIGN PATENT DOCUMENTS

JP        6-290506        10/1994

OTHER PUBLICATIONS

Chiseki Haginoya, et al., Applied Physics Letters, vol. 75, No. 20, pp. 3159–3161, "Thermomagnetic Writing On 29 Gbit/In.$^2$ Patterned Magnetic Media", Nov. 15, 1999.

J. Nakamura, et al., Journal of Applied Physics Letters, vol. 77, No. 2, pp. 779–781, "High–Density Thermomagnetic Recording Method Using a Scanning Tunneling Microscope", Jan. 15, 1995.

* cited by examiner

*Primary Examiner*—Tan Dinh
(74) *Attorney, Agent, or Firm*—Oblon, Spivak, McClelland, Maier & Neustadt, P.C.

(57) ABSTRACT

Electrons are directed from an electron emitter towards a magnetic recording medium to heat a recording portion of the magnetic recording medium and magnetic information is written by a magnetic recording head to the temperature-elevated recording portion. Otherwise, a magnetic head having a magnetic pole is used and the magnetic pole serves as an electron emitter as well. Alternatively, a space between the electron emitter and recording medium is made shorter smaller the mean free path of electrons in the atmosphere to considerably improve the recording density.

18 Claims, 23 Drawing Sheets

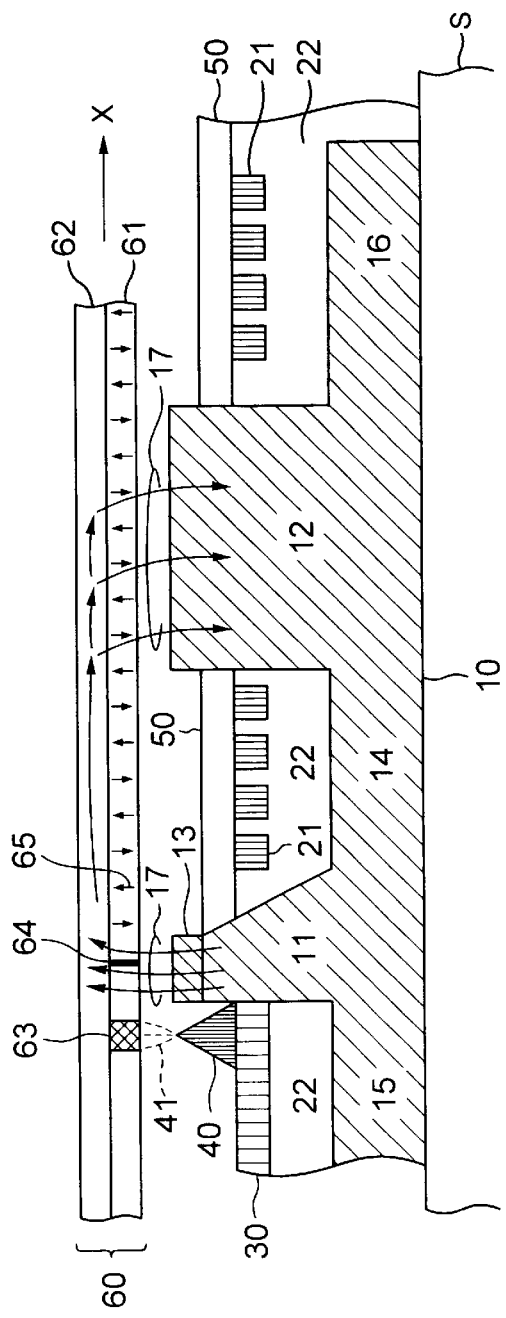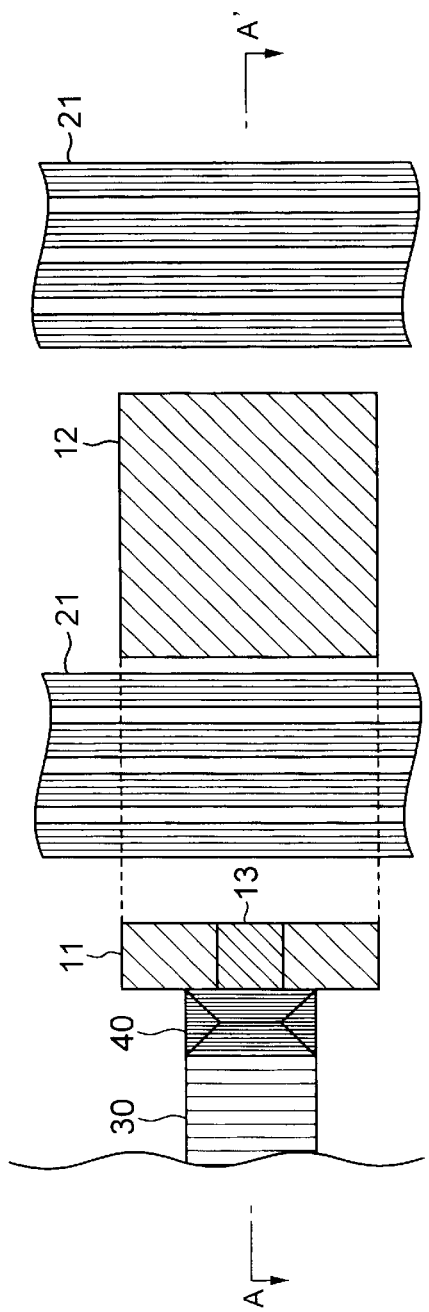
FIG. 1A
FIG. 1B

ELASTIC COLLISION CROSS
SECTION OF ELECTRONS IN $H_2O$

THERMALLY-ASSISTED MAGNETIC RECORDING AND REPRODUCING DEVICE HAVING AN ELECTRON BEAM THERMAL SOURCE

BACKGROUND OF THE INVENTION

The present invention relates to a thermally-assisted recording and/or reproducing device, and more particularly, to an improved and novel thermally-assisted recording device capable of heating a magnetic or other kinds of recording media by electron beams to write and/or read data to the medium with an extremely high density.

Personal computer (PC) systems and audio and/or video (AV) systems require a peripheral storage unit which has a large capacity and also is inexpensive. Currently, most of such peripheral storage units are magnetic or optical recording devices. The magnetic recording devices include a fixed magnetic hard disc drive (HDD) and magnetic tape recording device. Many of the PC systems adopt an HDD and an optical disc drive or magnetic tape recording device. Generally, various data including OS (operating system) and other software are stored in the HDD to which random access is made, while the optical disc drive or magnetic tape recording device is used for long-term storage of important data. Conventionally, the AV systems for storage of a large amount of moving picture information use mainly the magnetic tape recording device as the peripheral storage unit. With the larger capacity of the recent HDD and optical recording device, however, it has become expected that the HDD and optical recording device are employed in the AV systems for their speedy accessibility which is not possible with the conventional magnetic tape recording device. The magnetic and optical recording devices for use in the PC systems and AV systems are required to have a larger capacity and higher speed and be more inexpensive. With the conventional peripheral storage units, however, it is said that problems will arise as in the following.

First, the magnetic recording device will be considered. The magnetic recording device to magnetically write and read information has constantly been evolved as a large capacity, high speed and inexpensive information storage means. Among others, the recent hard disc drive (HDD) has shown remarkable improvements. Specifically, as proved on the product level, its recording density is over 10 Gbpsi (gigabits per square inch), internal data transfer rate is over 100 Mbps (megabits per second) and price is as low as several yens/MB (megabytes). The high recording density of HDD is due to a combination of improvements of a plurality of elements such as signal processing technique, servo control mechanisms, head, medium, HID, etc. Recently, however, it has become apparent that the thermal agitation of the medium inhibits the higher density of HDD.

The high density of magnetic recording can be attained by making smaller the recording cell (recording bit) size. However, as the recording cell is made smaller, the signal magnetic field intensity from the medium is reduced. So, to assure a predetermined signal-to-noise ratio (S/N ratio), it is indispensable to reduce the medium noise. The medium noise is caused mainly by a disordered magnetic transition. The magnitude of the disorder is proportional to a magnetic transition unit of the medium. The magnetic medium uses a layer formed from polycrystalline particles (will be referred to as "multiparticle layer" or "multiparticle medium" herein). In case a magnetic exchange interaction works between magnetic particles, the magnetic transition unit of the multiparticle layer is composed of a plurality of exchange-coupled magnetic particles.

Heretofore, when a medium is to have the recording density is several hundreds Mbpsi to several Gbpsi for example, the lower noise of the medium has been attained mainly by reducing the exchange interaction between the magnetic particles and making smaller the magnetic transition unit. In the latest magnetic medium of 10 Gbpsi in recording density, the magnetic transition unit is of only 2 or 3 magnetic particles. Thus, predictably, the magnetic transition unit will be reduced to only one magnetic particle in near future.

Therefore, to assure a predetermined S/N ratio by further reducing the magnetic transition unit, it is necessary to make smaller the size of the magnetic particles. Taking the volume of a magnetic particle as V, a magnetic energy the particle has can be expressed as KuV where Ku is an anisotropy energy density the particle has. When V is made smaller for a lower medium noise, KuV becomes smaller with a result that the thermal energy each particle has at a temperature near the room temperature will disturb information written in the medium, which is the "thermal agitation" referred to herein and has become the problem as mentioned above.

According to the analysis made by Sharrock et al., the ratio between magnetic energy and thermal energy of a particle, KuV/kT where k is Boltzman's constant and t is absolute temperature, is required to be greater than 100 or so in order to keep the reliability of the record life. If the particle size is decreased for a lower medium noise with the anisotropy energy density Ku being maintained at (2 to 3)×$10^6$ erg/cc of the CoCr group alloy conventionally used as a magnetic layer in the recording medium, it will be difficult to assure a thermal agitation resistance.

More specifically, the multiparticle layer of Co, Cr, Ta and Pt used in the current magnetic recording medium has a Ku value of about (2 to 4)×$10^6$ erg/cc. With a particle size of 10 nmφ-10 nmt or so, the magnetic energy of each particle will be under 100 times of the thermal energy each particle has at the room temperature and there will take place a noticeable destruction of written information due to the thermal agitation. Improvement of the medium material and increasing the anisotropy energy density Ku may look like an approach to the solution of the problem, but a larger value of Ku will be accompanied by a larger coercive force, which will make the information writing to the medium more difficult.

Recently, magnetic layer materials having a Ku value of more than $10^7$ erg/cc such as CoPt, FePd, etc. have been attracting much attention from all the field of industries concerned. However, simply increasing the Ku value for compatibility between the small particle size and thermal agitation resistance will lead to another problem. The problem concerns the recording sensitivity. Specifically, as the Ku value of the magnetic layer of a medium is increased, the recording coercive force Hc0 of the medium (Hc0=Ku/Isb; Isb is a net magnetization of the magnetic layer of the medium) will increase and the necessary magnetic field for saturation recording increase proportionally to Hc0.

A recording magnetic field developed by a recording head and applied to the medium depends upon a current supplied to a recording coil as well as upon a recording magnetic pole material, magnetic pole shape, spacing, medium type, layer thickness, etc. Since the tip of the recording magnetic pole is reduced in size as the recording density is higher, however, the magnetic field developed by the recording head is limited in intensity.

Even a combination of a single-pole head which will develop a largest magnetic field and a vertical medium backed with a soft magnetic material for example can develop a magnetic field whose largest possible intensity is on the order of 10 kOe (Oe: oersted). On the other hand, to assure a sufficient thermal agitation resistance with a necessary particle size of about 5 nm for a future high-density, low-noise medium, it is necessary to use a magnetic layer material having a KU value of $10^7$ erg/cc or more. In this case, however, since the magnetic field intensity necessary for write to the medium at a temperature approximate to the room temperature is over 10 kOe, no write to the medium is possible. Therefore, if the Ku value of the medium is simply increased, there will arise a problem of the write to the medium being impossible.

As having been described in the foregoing, in the magnetic recording using the conventional multiparticle medium, the lower noise, thermal agitation resistance and higher recording density are in a trade-off relation with each other, which is an essential factor upon which the limit of the recording density depends.

Secondly, the optical recording device will be considered. A high density of the optical recording basically depends upon the reduction of the size of a laser spot focused on an optical recording medium. Therefore, for a higher recording density with the optical recording device, a laser light used should be of a shorter wavelength or an objective lens used should have a higher numerical aperture (NA). However, use of a laser light having a shorter wavelength is limited by selection of a laser element material for use with the laser light and also by the spectral transmittances of the substrate of an optical disc and various optical elements included in the optical system of the optical recording device. Recently, there has been proposed a ultrahigh density optical recording using a near-field light (evanescent wave). For practical use of the near-field light, however, there are many problems to solve since the light spot size and light intensity on the medium are theoretically in a trade-off relation with each other.

Therefore, it is predicable that in organizing a future peripheral storage unit having a recording density of over Tb (terabits)/inch$^2$, both the conventional magnetic and optical recording systems will encounter many difficulties.

SUMMARY OF THE INVENTION

Accordingly, the present invention has an object to overcome the above-mentioned drawbacks of the prior art by providing a magnetic recording device having a novel construction based on a different principle from that for the conventional magnetic recording devices and capable of recording at a dramatically high density.

The present invention has another object to provide an electron beam recording device capable of solving the thermal agitation problem in the magnetic recording and trade-off problem related to the near-field light used in the optical recording to break through the recording density limit of the conventional peripheral storage units.

The Inventors of the present invention propose a thermally-assisted magnetic recording device based on a novel concept to attain the above object. In this thermally-assisted magnetic recording device, magnetic particles so fine that noise therefrom is sufficiently small are used and a recording layer having a high anisotropy energy density (Ku) at a temperature near the room temperature is used to assure a thermal agitation resistance. In a medium having such a large Ku value, since the magnetic field intensity necessary for recording exceeds the intensity of a magnetic field developed by the recording head when the ambient temperature is near the room temperature, no recording is possible. However, by locally heating the recording medium by any means, the coercive force Hc0 of the temperature-elevated portion of the medium can be reduced to below the magnetic field intensity of the recording head to write information to the medium.

The recording medium may be heated by irradiating light beam to near the recording magnetic pole. By locally heating the medium with the light beam during recording, the Hc0 value of the temperature-elevated portion of the medium can be reduced to below the intensity of the magnetic field developed by the recording head, thereby permitting to write information to the medium.

When a light beam from a conventional light source is used as a heat source, however, since the size of light spot is defined by the diffraction limit, an area of several hundreds of nm or more will be heated. Thus, use of such a light beam is not suitable for a future magnetic recording in which the track width will be 100 nm or less. Also, a near-field light may be used in order to limit the light beam to less than the diffraction limit. However, a near-field light emitted from a conventional light source cannot be used efficiently and the reduction in area of the temperature-elevated portion and light beam power are in a trade-off relation with each other, thus no sufficient heating can be assured in a recording at a high density.

That is, in the modality in which a far-field light is used as a heat source, the light spot size is defined by the diffraction limit, so no heating of a fine area is possible. On th other hand, the near-field light cannot be used with a high efficiency, and thus sufficient heating is difficult in a higher density of recording.

To avoid the above problem, the present invention uses an electron beam as a heat source.

Namely, the above object can be attained by providing a thermally-assisted magnetic recording device including, according to the present invention, an electron emission source of electron emitter and a magnetic recording head, electrons being directed from the electron emitter towards the magnetic recording medium to heat a recording portion of the magnetic recording medium and magnetic information being written to the temperature-elevated recording portion by the magnetic recording head applying the recording magnetic field to the magnetic recording medium. The electron beam can be limited very easily to a very fine spot size, whereby the recording density can considerably be improved.

In the above thermally-assisted magnetic recording device according to the present invention, the electron emitter can heat the magnetic recording medium so that the coercive force of the recording portion of the magnetic recording medium will be smaller than the intensity of the recording magnetic field developed at the recording portion by the magnetic recording head. Thus, positive recording is possible to a recording medium having a large coercive force.

Also in the above apparatus, the recording portion of the magnetic recording medium has a larger coercive force than the intensity of the magnetic field developed by the magnetic recording head, at the normal temperature. This magnetic recording medium is strong against the thermal agitation and the size of recording cells can be made rather smaller than the recording cell size in the conventional magnetic recording medium.

Further, in the above apparatus, there is provided a driving mechanism to move a recording surface of the magnetic recording medium in relation to the electron emitter and magnetic recording head, and after the magnetic recording medium is moved by the driving mechanism, the electron emitter will come nearer to a leading position in relation to the recording surface than the magnetic recording head. Thus, it is possible to positively elevate the temperature of the recording portion of the magnetic recording medium prior to recording.

Also in the above apparatus, the electron emitter includes a plurality of electron emitters disposed along the direction of the movement thereof by the driving mechanism. Thus, the recording portion of the magnetic recording medium can positively be heated.

Moreover in the above apparatus, there are formed on the magnetic recording medium a recording track parallel to the moving direction; the length Te of the electron emitter in the width direction of the recording track and length Tw of the magnetic recording head in the width direction of the recording track are in a relation of $Te/2 \leq Tw \leq 2Te$ with each other.

Moreover in the above apparatus, the electron emitter emits electrons by field emission. Thus, fine electron beam can positively generated, and the electron emitter has an improved reliability and operating life.

Also in the above apparatus, the electron emitter is placed in a non-oxidizing atmosphere or depressurized atmosphere. Thus, the electron emitter has a further improved reliability and service life.

In the above respect, the oxygen partial pressure density X (in mols/cm$^3$) and emission electron current density J (in A/cm$^2$) of the electron emitter are in relations of $X \leq 1.25 \times 10^{12} \times J$ and $J \leq 10^4$ with each other.

In the thermally-assisted magnetic recording according to the present invention, an electron emitter is used as a heat source. The electron emitter may be any of various types such as field emission type, thermoelectronic emission type, photoemission type, tunnel electron emission type, etc. The "field emission type" is such that by providing a high potential gradient (electric field) on an electron emission surface, electrons are directly emitted from the surface. The present invention adopts a field emission type electron emitter. In this case, since the electron emission area is on the order of 10 nm, an area of about 10 nm of the medium can easily be heated, thus the present invention can attain a resolution much better than that of the conventional method using the light beam. Also in case an electron emitter of the thermoelectronic emission type is used, however, the nearly same effect can be assured by converging the electron beam to a predetermined size.

Normally, the electron beam is used under a vacuum. However, taking in consideration the facts that the spacing between the magnetic head and medium is several tens of nm or less and this spacing will further be reduced in future and that the mean free path of electrons at 1 atm. is on the order of 150 nm which is sufficiently longer than the spacing between the magnetic head and medium, it can be said that emitted electron beam can be directed towards the medium with no collision. Namely, the electron emitter can be installed in a magnetic recording device which is to be used at normal atmospheric pressure.

Note that the mean free path of electrons depends upon the type of gas and electron energy. However, in case the gas used is a nitrogen being one of the major elements of air, the mean free path of electrons will be shortest even when the electron energy is 2 eV or so. The mean free path, in the nitrogen at atmospheric pressure, of the electron having the energy of 2 eV is 150 nm. Also, in case the gas used is oxygen being another major element, the mean free path of electrons is shortest when the electron energy is on the order of 20 eV. However, the mean free path is 300 nm or more, which is long enough as compared with the above-mentioned spacing.

Further, when the electron beam is used in a depressurized atmosphere according to the present invention, the probability of collision before an electron beam is incident upon the medium can be said to be rather low. Also, in case the gas used is an inert gas atmosphere according to the present invention, when it is a dry nitrogen, the mean free path of electrons is a minimum of 150 nm or so as in the above. When a rare gas such as Ne, Ar, Kr or Xe is used, the minimum value of mean free path of electrons at 1 atm. is 1000, 160, 130 or 94 nm, which is long enough as compared with the above spacing. The electrons can be incident upon the medium with little collision.

An inert gas atmosphere at a substantial atmospheric pressure should preferably be charged in the recording device for a longer service life of the electron emitter. When dry nitrogen is used as the inert gas, the mean free path of electrons is a minimum of 150 nm or so. Also when a rare gas such as Ne, Ar, Kr or Xe is used, the mean free path of electrons is long enough as in the above. In case, with the spacing between the magnetic head and medium being of several tens of nm, the electron beam can substantially work as under a vacuum. In this way, use of the dry nitrogen or rare gas atmosphere can permit a stable performance of the electron beam.

Also, the pressure of the atmosphere in which the electron beam is used may be near, higher or lower than 1 atm. However, a pressure of the atmosphere being at a substantial atmospheric pressure is convenient from the practical viewpoint.

On the assumption that the pressure inside the apparatus is P (in Torr), the minimum value of the mean free path of electrons at 1 atm. is λmin (in nm) and the spacing between the electron emitter and medium is d (in nm), the present invention should desirably meet the following condition:

$$d < \lambda \min \times (760/P)$$

The minimum value of mean free path of electrons λmin is defined to a mean free path over which there will take place no collision with a probability of 1/e (e is a base of natural logarithm) when the electron travels over the distance of λmin. That is, when the condition $d < \lambda \min \times (760/P)$ is met, the electron will collide with molecules with a probability of about 63% in the course since it is emitted until incident upon the medium. More preferably, the following condition should be met:

$$d < (\tfrac{1}{3}) \times \lambda \min \times (760/P)$$

When the above condition is met, the collision probability can be reduced to less than ½. It is more desirable to use a coefficient of ⅕ in place of the coefficient of ⅓ in the above expression. With this coefficient, the collision probability can be reduced to so small a value as will not be inconvenient in practice.

The pressure P inside the apparatus falls within a substantial range of the atmospheric pressure. Within a range meeting the above condition, it may be selected depending upon whether a practical apparatus is feasible with the lower limit of the pressure P. If the pressure inside the apparatus is different from the atmospheric pressure or if the apparatus is charged with a gas different from the atmosphere, a hermetic enclosure is required.

In case the hermetic enclosure is used, the lower limit of the pressure P depends upon the mechanical strength of the enclosure as the case may be. In case of the conventional electron beam recording device under a vacuum, since the enclosure is applied with a pressure as high as 1 kg/cm$^2$, it is not easy to assure a sufficient mechanical strength of the enclosure and also to maintain the vacuum state.

According to the present invention, however, the lower limit of the pressure P can be selected depending upon the practically allowable pressure to the enclosure and vacuum sealing of the enclosure. Since the lower limit of the pressure P should be considered in designing the enclosure, it cannot be fixed to a general value. However, a half or so of the atmospheric pressure may be reasonable. When the lower limit of the pressure P is higher than the half of the atmospheric pressure, the pressure applied to the enclosure will be 0.5 kg/cm$^2$ or so and the sealed or hermetic extent of the enclosure may be a sealing provided by the ordinary aluminum sash for example.

The upper limit of the pressure P is basically defined by the above expression. The practical upper limit is double the atmospheric pressure or so based on the same consideration to the lower limit. The "substantial atmospheric pressure" referred to herein is as having been described in the foregoing.

Now, the electron emitter of the field emission type will be considered. The electron emission area of this source depends in size upon the applied electric field and shape of the electron emitter. The size of the electron emission area is on the order of 10 nm when the electric field is $10^6$ to $10^7$ V/cm and the electron emitter has a sharpened or tapered shape obtained by a selective etching or whose end curvature is several tens of nm or less. This size is difficult to realize with a light beam and the electron emitter should preferably be applied to a future magnetic recording device in which recording cell size is several tens of nm. Emission current depends on the applied electric field. With an electric field of $10^6$ to $10^7$ V/cm, an emission current of about $10^{-6}$ to $10^{-4}$ can be obtained from an area of 10 nm in diameter.

Note that the emission current is nearly proportional to the square of the intensity of applied electric field according to the Fowler-Nordheim expression. Therefore, if the electric field intensity is $3.3 \times 10^7$ V/cm for example, the emission current can be $10^{-3}$ A. Although an electric field intensity of $10^6$ to $10^7$ V/cm may seem to be very high, it will be suitably applicable to the magnetic recording device since the voltage to be applied between the electron emitter and medium is a maximum of several volts to several tens of V because the above spacing is several tens of nm.

Next, the mechanism of heating of the medium by electron beam will be described. When a voltage of 10 V is applied (with the spacing being 10 nm and field intensity being $10^7$ V/cm), an emission current of $10^{-4}$ A will provide a power of $10^{-3}$ W. When a voltage of 33 V is applied (with the spacing being 10 nm and field intensity being $3.3 \times 10^7$ V/c), an emission current of $10^{-3}$ A will provide a power of $3.3 \times 10^{-2}$ W. When this power is applied to a square area on the medium, whose one side is 10 nm long, the power density will be $10^9$ W/cm$^2$ or $3.3 \times 10^{10}$ W/cm$^2$. When 10 m/s is used as a practical linear velocity (moving speed of the medium in the direction of the recording track) in the magnetic disc drive, the medium takes a time of 1 ns for passing by the heated area of 10 nm. Therefore, the energy density applied to the square area whose one side is 10 nm long will be 1 J/cm$^2$ or 33 J/cm$^2$. It will be considered herebelow whether this value is adequate for heating the medium.

As an example of the heating mechanism using an electron beam, there is available a heating mechanism in which the electron beam behaves as de Broglie wave to heat the medium. The de Broglie wave is on the order of 0.4 nm when the electron energy is 10 V while it is about 0.2 nm when the electron energy is 33 V. Namely, it is equal to the atom size, so a lattice vibration (heating) can be generated. Alternatively, there may be available a mechanism in which an electron beam having such an energy is incident upon the medium to oscillate and excite the plasmon, and an energy emitted when the plasmon-oscillated electron and positive hole in pair are recombined is given to a phonon, namely, to a lattice to induce a lattice vibration, that is, a heat.

The power density or energy density necessary for heating the medium can be considered to be nearly equal to that used with the optical disc. So, if the above power density $10^9$ W/cm$^2$ or $3.3 \times 10^{10}$ W/cm$^2$, or energy density 1 J/cm$^2$ or 33 J/cm$^2$, is equal to or larger than the power density or energy density used with the optical disc, the medium can be heated sufficiently with the electron beam. In a common phase-change disc, for example, a linear velocity of 6 m/s, full width at half maximum (FWHM) of 0.6 $\mu$m of the light spot and a recording power of 10 mW will permit to heat this medium to a higher temperature than its melting point (600° C.). Since the medium takes a time of 100 ns for passing by the full width at half maximum and the area of the light spot is $0.28 \times 10^{-8}$ cm$^2$, the power density will be $3.5 \times 10^6$ W/cm$^2$ and energy density will be 0.35 J/cm$^2$. Therefore, it can be said that the medium can sufficiently be heated by the plasmon oscillation with a energy density of 1 J/cm$^2$.

In addition, there can take place a Joule-heating mechanism in which the electron beam causes a current to flow through the medium which is thus heated by the Joule-heating. This mechanism will coexist with the above-mentioned plasmon-oscillation heating mechanism. Comparison with the power density used with the optical disc will lead to the understanding of the reason why the Joule-heating mechanism is suitable for heating the medium. Specifically, when a current of $10^{-4}$ A or $10^{-3}$ A is supplied to a square area whose one side is 10 nm long of the medium in the direction of the layer thickness, the heating power will be $R \times 10^{-8}$ W or $R \times 10^{-6}$ W where R is a resistance of the medium. When the resistivity of a magnetic recording medium or magneto-optical recording medium is (5 to 6)$\times 10^{-6}$ $\Omega$cm, the area of current path is $10^{-12}$ cm$^2$ (10 nm square) and the current path length, namely, magnetic layer thickness is $2 \times 10^{-6}$ cm (20 nm), the resistance of the medium will be 10 Q or so. Therefore, the heating power will be $10^{-7}$ W or $10^{-5}$ W. Division of this heating power by the heated area of $10^{-12}$ cm$^2$) provides $10^5$ W/cm$^2$ or $10^7$ W/cm$^2$. Since the time of current supply is different from the time of electron beam incidence, the Joule-heating mechanism should be considered by comparison in power density, not in energy density. Thus, it can be said that the current of $10^{-4}$ A will be somewhat insufficient, but $10^{-3}$ A will enable a sufficient Joule heating.

Actually, there will take place together, as mentioned above, the process in which the medium is heated by the plasmon oscillation and excitation and the process in which the medium is heated by the Joule heating due to the current supply to the medium. In any of the above processes, the power density and energy density are sufficient. Therefore, any of these heating mechanisms may be selected for use in the thermally-assisted magnetic recording device according to the present invention.

The thermally-assisted magnetic recording head according to the present invention should preferably be embodied as a one in which an electron emitter and recording magnetic pole are disposed in this order from the downstream (leading) side in the direction of the medium movement. Owing to this arrangement, a recording magnetic field can be applied to the medium at a position where Hc0 has become sufficiently low immediately after the medium is heated by the electron beam. The distance between the electron beam incident position and recording magnetic field-applied position depends upon the thermal response of the medium as well, but should preferably be 100 nm or less, and more preferably be several tens of nm or less.

For a higher efficiency of the heating, a plurality of electron emitters in the electron emitter should be disposed in the direction of the recording track. The size of the heated area should preferably be nearly equal to the width of the recording track to enable a uniformmagnetic transition over the trackwidth. Also the track width Te of the electron emitter, and track width Tw of the recording head should desirably meet the condition of $Te/2 \leq Tw \leq 2Te$.

The inside of the ordinary magnetic disc drive communicates with the ambient atmosphere. When the electron beam is to be used in an atmosphere containing oxygen and moisture, consideration should be given to the life of the electron emitter as well as to the mean free path of electrons. At atmospheric pressure, air molecules or water molecules in the atmosphere will be adsorbed by the electron emitter and will possibly shorten the service light of the latter. Different from the conventional thermal emission type electron beam emitter and photo emission type electron beam emitter, the field emission type electron beam emitter having actively been researched and developed recently is extremely resistant against adsorbed molecules. When carbon (C) is used as a material for the electron emitter, the latter will be less influenced by the oxidation. For a practically long service life of the electron emitter, however, the densities of the gas atmosphere near the emitters, especially, the densities of oxygen, water and their dissociated species, and the frequency of their incidence upon the emitters, should be kept low.

The Inventors of the present invention made many experiments mainly on STM (scanning tunneling microscopy) emitter, and found from the experiment result a emitter-surrounding atmosphere required for obtaining a field emission current stably. As will further be described later concerning the embodiments of the present invention, the Inventor of the present invention found that it depends upon the emitter material how the emitter-surrounding atmosphere should be and that also when silicon (Si) on which a surface oxide film is easy to develop was used, electrons could be emitted stably if the density X (mols/cm$^3$) of oxygen molecules in the emitter-surrounding atmosphere and current density J (in A/cm$^2$) of electrons emitted from the emitter met the condition of $X \leq 1.25 \times 10^{12} \times J$ with $J \geq 10^4$. The definition of the range of J as in the above condition is intended to present a necessary range of J for significantly heating the medium. There will be no sense in defining an emission current with which no significant heating will take place or a relation between X and J which would be when the emitter stops operating.

When the emitter stops operating, a natural oxide layer or a physical adsorption layer will develop on the emitter surface. When the above defined condition in the present invention is met, such layers will easily desorb the emitter surface due to the following operation of the emitter. The above definition of the relation between X and J in the present invention is intended to present a condition under which so long as an emission current capable of significantly heating the medium is supplied, the tip of the emitter will not be deteriorated due to attack by oxygen. The relation between X and J has a physical meaning that while a hundred electrons are being emitted from the emitter, one oxygen molecule will be incident upon the emitter surface. With such an extent of the incidence of oxygen molecule, heating of the emitter surface by the electron emission, etc. will allow the incident oxygen to re-desorb the emitter surface which will thus not be deteriorated, which is one of the findings of the above Inventors' experiments.

As having been described in the foregoing, according to the present invention, a low-noise multiparticle medium formed from very fine particles, necessary for a high density magnetic write and read, can be made to have a sufficiently high resistance against the thermal agitation at a temperature near the room temperature, and the coercive force of the medium, that is, a necessary magnetic field for a magnetic transition, is reduced by incidence of an electron beam upon a portion of the medium to which a recording magnetic field is applied, to thereby enabling a practical recording head to attain a high speed of recording.

Also, according to the present invention, an electron emitter and write and read elements are formed integrally with each other to provide a compact and lightweight thermally-assisted magnetic recording head, which will enable a high speed seek operation and inexpensive head and drive.

Further, according to the present invention, it is possible to improve to a practical level the service life of the electron emitter of a thermally-assisted magnetic recording device in which a medium is heated by a high resolution, high efficiency electron emitter, the coercive force of the heated portion of the medium is reduced and a recording magnetic field is applied to the portion whose coercive force has thus been reduced, thereby recording information to the medium.

On the other hand, according to the present invention, a magnetic pole or magnetic yoke can also be used as an electron emitter, thereby enabling a magnetic write and read with a further high recording density.

Also according to the present invention, an electron emitter having an extremely superior recording resolution to that of the light beam or magnetic recording head used in the conventional magnetic recording device, can be used to write information to a medium. Thus, according to the present invention, there can provided a practical magnetic recording device in which information can be recorded with a considerably improved density and an electron beam recording can be done in the atmosphere, which is impossible with the conventional electron beam recording.

That is, according to the present invention, there can be provided a thermally-assisted magnetic recording device realizing a new concept that information can be recorded with a drastically higher density than with the conventional recording device. Thus the present invention is very advantageous in the field of art.

These objects and other objects, features, and advantages of the present invention will become more apparent from the following detailed description of the preferred embodiments of the present invention when taken in conjunction with the accompanying drawings. It should be noted that the present invention is not limited to the embodiments but can freely be modified without departing from the scope and spirit thereof defined in the claims given later.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 1A and 1B show the construction of an embodiment of the thermally-assisted magnetic recording head according to the present invention, in which FIG. 1A is a lateral sectional view that shows the major components including the head and recording elements of the head and FIG. 1B is a view from the medium surface of the major recording elements of the head;

FIGS. 6A through 6C schematically show the process of recording by the thermally-assisted magnetic recording head according to the present invention, in which FIG. 6A is a sectional view of an portion extracted from FIG. 1B and associated with the recording process, FIG. 6B graphically shows an electron beam profile on the medium and a temperature distribution on the medium and FIG. 6C graphically shows a spatial distribution of the medium coercive force and that of the recording magnetic field;

FIGS. 17A and 17B are conceptual views of the seventh embodiment of the magnetic recording device according to the present invention, showing especially a means for adjusting the atmosphere inside an enclosure of the magnetic recording device, in which FIG. 17A is a perspective view of the enclosure and FIG. 17B is a sectional view, enlarged in scale, taken along the line X–X' in FIG. 17A;

Figure 2A:
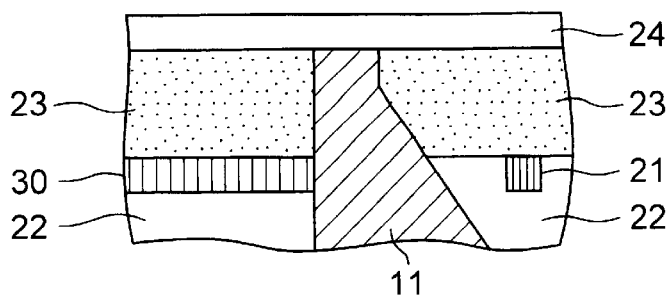
FIGS. 2A through 2E provide sectional views, enlarged in scale, of the head near the electron emitter, showing steps of manufacturing the electron emitter.

DETAILED DESCRIPTION OF THE PREFERRED EMBODIMENTS (First Embodiment)

Referring now to FIGS. 1A and 1B, there is illustrated in the form of sectional views one embodiment of the thermally-assisted magnetic recording head according to the present invention. FIG. 1A is a lateral sectional view showing the major components including the head and recording elements of the head, and FIG. 1B is a view from the medium surface of the major recording elements of the head. The line A–A' in the FIG. 1B corresponds to the center line of a recording track, and a view of the head and medium taken along a line perpendicular to the center line is FIG. 1A.

In FIGS. 1A and 1B, the reference S indicates a head substrate, X a medium moving direction (trailing direction), 10 a recording magnetic pole assembly, 11 a main magnetic pole, 12 a return-path magnetic pole, 13 a tip of the main magnetic pole, 14 a connection between the main magnetic pole 11 and return-path magnetic pole 12, 15 a leading portion of the recording magnetic pole assembly 10, 16 a trailing portion of the recording magnetic assembly 10, 17 a recording magnetic flux, 21 a recording coil, 22 a layer in which the recording coil 21 is buried, 30 an electron emitter electrode layer, 40 an electron emitter, 41 an electron beam, 50 a protective layer, 60 a medium body, 61 a recording layer, 62 a soft-magnetic lining layer, 63 an electron beam-incident portion of the medium 60, 64 a magnetically recording portion of the medium 60, and 65 a magnetization of the medium 60. In the above structure, the recording magnetic-pole leading portion 15, recording magnetic-pole trailing portion 16 and protective layer 50 are not always necessary.

The thermally-assisted magnetic recording head constructed as in the above can be built following the procedure below:

First, the head substrate S should preferably be formed from ALTIC (Al, Ti and C) substrate, for example, easy to be work into a slider and which is used to make the ordinary magnetic head. Then the resist frame plating method is used to form the recording magnetic pole assembly 10 directly on the substrate S or on an insulative layer previously formed on the substrate S as necessary. The material for the magnetic pole assembly 10 should be a one having a soft-magnetic, high saturation magnetic flux density, used to form the ordinary magnetic recording element, such as CoNiFe, NiFe or the like. The entire recording magnetic pole assembly 10 may not always be formed, but only the tip 13 of the main magnetic pole 11 may be formed, from the material having the high saturation magnetic flux density.

After the magnetic pole assembly 10 is thus formed, the layer 22 in which the recording coil 21 is to be buried may be etched off with the resist frame removed. First, the leading portion 15, connection 14 between the main magnetic pole 11 and return-path magnetic pole 12 and trailing portion 16 are formed flat in the recording magnetic pole assembly 10, and then the frame pattern is changed to form the main magnetic pole 11 and return-path magnetic pole 12. The main and return-path magnetic poles 11 and 12 may be formed to have the same height, or the latter may be formed to have a lower height. The tip 13 of the main magnetic pole 11 may be worked using a resist frame when the track width is relatively large and thus the tip 13 may be formed by the PEP process. In this case, the main and return-path magnetic poles 11 and 12 may be formed by collective frame plating with the track-directional width of the main magnetic pole 11 made to coincide with that of the tip 13. If the track width is 100 nm or less, it is difficult to adopt the PEP process. In this case, a plating is first made with the track-directional width of the main magnetic pole 11 made to coincide with that of the return-path magnetic pole 12, and then the FIB process may be used to determine the track width of the tip 13.

Next, there is formed on the leading portion 15 of the recording magnetic pole pattern, connection 14 and the trailing portion 16 the layer 22 in which the recording coil 21 is to be buried. On the top of the layer 22, there are formed a pattern of the recording coil 21 and a pattern of the electron emission electrode layer 30. Then the coil 21 and electrode layer 30 are formed by collective plating of copper (Cu). A postprocessing protective coating is provided on exposed resist areas around the Cu coil 21 and Cu electrode layer 30 as necessary. This protective coating will be the protective layer 50. For electrical connection between the-electrode layer 30 and electron emitter 40, no insulative layer will be formed on the electrode layer 30.

Thereafter, the electron emitter will be formed.

FIGS. 2A through 2E give sectional views, enlarged in scale, of the magnetic recording head portion near the electron emitter shown in FIGS. 1A and 1B. The steps of manufacturing the electron emitter will be described herebelow with reference to FIGS. 2A through 2E. Note that in FIGS. 2A through 2E, the elements having the same or similar functions as or to those of the elements shown in FIGS. 1A and 1B will be indicated with the same or similar reference numerals as those in FIGS. 1A and 1B. They will not be described in detail.

Next to the manufacturing step having been described in the above with reference to FIGS. 1A and 1B, a resist 23 is filled up to the top of the recording magnetic pole assembly 10, namely, the top of the tip 13 of the main magnetic pole 11 (top of the main magnetic pole 11 in the middle of the manufacturing process). After the resist 23 thus provided is flattened as necessary, a dielectric layer or metal layer 24 is formed on the resist as shown in FIG. 2A. The dielectric or metal layer 24 may be formed from any material which can be selectively etched away along with the resist.

Figure 2B:
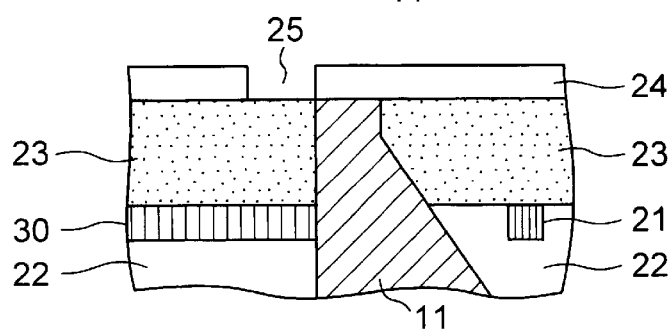

Then, a hole 25 is patterned on a portion of the dielectric or metal layer 24 below which the electron emitter 40 is to be formed, as shown in FIG. 2B. The hole 25 may be circular or square in shape. However, the length of the hole 25 in the direction of track width should be defined such that the top end width of the recording track generally coincides with the recording track width. The hole length in the direction of the track should be defined to be such a one that the electron emitter 40 can be sharpened or tapered at the top thereof as will further be described later.

On the assumption that the track width is Tw and height of the electron emitter 40 to be formed is He, the length of the hole in the direction of the track width should desirably be on the order of Tw+2nHe (where n is a parameter depending upon the distribution of the angle of injection of a material into the hole 25 when forming the electron emitter 40 in the hole 25) and that of the hole in the direction of the track should also desirably be about 2nHe for such a sharp or tapered top end portion of the electron emitter 40 as will enable an efficient field emission. When the material is injected at an angle nearer to the normal line, the parameter n is smaller. When the material is injected at an angle further from the normal line (more isotropically), th parameter n is larger. When n=1, the taper angle of the electron emitter is 45°. That is to say, the size of the hole 25 depends upon the track width Tw as well as upon both the parameter n depending upon the method of forming the electron emitter 40 and height of the electron emitter 40.

More specifically, the recording track width Tw (track width of the tip 13 of the main magnetic pole 11) is selected to be 0.75 $\mu$m, the height He of the electron emitter 40 is 0.25 $\mu$m, the size of the hole 25 is 1.25 m in the direction of the track width and 0.5 $\mu$m in the direction of the track (n=1), for example, in the present invention. The hole 25 may be formed by either the PEP or FIB process.

Figure 2C:
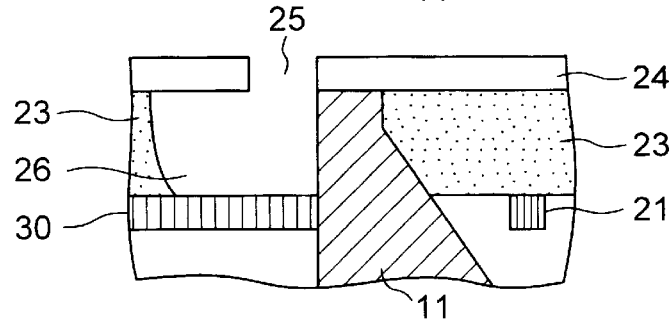

Thereafter, the resist 23 is etched by wet etching through the hole 25 to form a cavity 26 in which the electron emitter 40 is to be formed, as shown in FIG. 2C. Next, the material for the electron emitter 40 is injected into the cavity 26 by evaporation or sputtering from above the hole 25. The material for the electron emitter 40 may be a high melting point metal such as Mo, W, Ta or the like, a semiconductor such as Si, Ge or the like, or carbon (C). Among these materials, the carbon (C) is suitably usable to assure a stable service and long life of the electron emitter used in the atmosphere.

By injecting the material for the electron emitter 40 onto the electrode layer 30 in the cavity 26 from above the hole 25, an island of the electron emitter material is initially formed on the electrode layer 30. The island has a size nearly same as that of the hole 25. The material for the electron emitter 40 is heaped on the electrode layer 30 while being heaped as indicated with reference numeral 42 on the dielectric or metal layer 24. The adhesion of the layer 42 to the wall of the hole 25 is defined by the distribution of the angle of injection of the electron emitter material into the hole 25, and the distribution can be controlled.

For example, when sputtering method is employed, the distribution of the angle of injection can be controlled based on the distance between a sputtering target and hole 25 and sputter gas pressure or the aspect ratio of a through-hole formed between the sputtering target and hole 25. When the direction of the injection into the hole 25 is nearer to the normal line with respect to the electrode layer 30, the taper angle of the electron emitter 30 (angle from the electrode layer 30) is larger, namely, the electron emitter 40 is tapered more sharply. On the other hand, when the direction of the injection is more isotropic, the electron emitter 40 is tapered more gently.

It is essential to limit the radius of curvature of the top end portion of the electron emitter 40 to about 10 nm and make the height of the top end nearly coincide with that of the top of the recording magnetic pole (main magnetic pole) 11. These radius of curvature and height of the top end can be controlled buy adjusting the thickness of the resist layer 23, thickness of dielectric or metal layer 24, size of the hole 25 and method for heaping the electron emitter material. At the beginning of the material for the electron emitter 40 being thus heaped, it has the same size as the hole 25 when it is still near the electrode layer 30. The material is further heaped on the wall of the hole 25 as well as on the electrode layer 30. The material 42 will further be heaped on the wall of the hole 25 so that the hole 25 will be narrower at it goes upward. Namely, the effective size of the hole 25 will be reduced because the space in the hole 25 is reversely tapered.

Figure 2D:
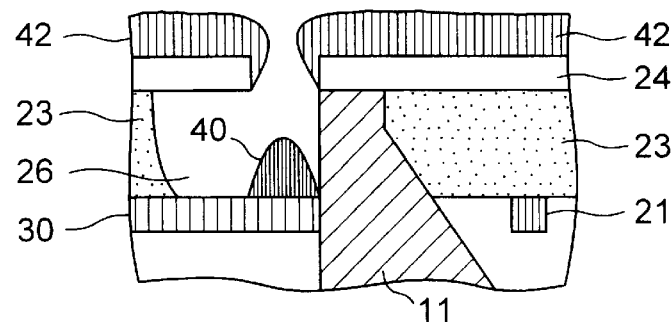

FIG. 2D shows the shape the electron emitter 40 will be formed to have in the course of the material being heaped.

Figure 2E:
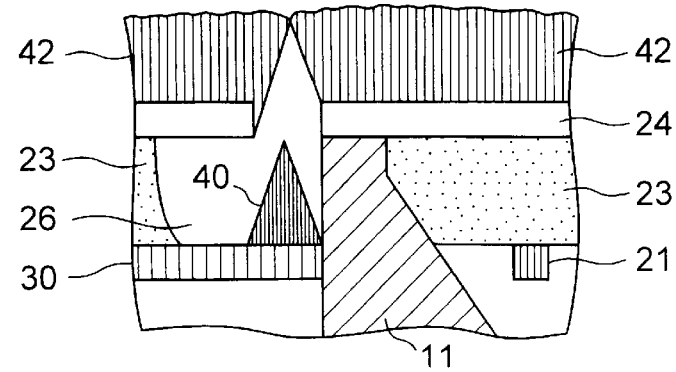

As the electron emitter material further grows as in the above, the top end portion of the electron emitter 40 will be gradually tapered. When the layer 42 of the same material as for the electron emitter 40, heaped on the dielectric or metal layer 24, has grown until it closes the hole 25, the electron emitter 40 will have a sharp tapered shape as shown in FIG. 2E. By observing the shape of the electron emitter thus formed by an electron microscope, it was confirmed that the taper angle formed between the lateral sides of the electron emitter 40 was about 45°, namely, the tapered portion being a ridge longer in the direction of the track width while being shorter in the direction of the track, the track width at the top end portion of the electron emitter 40 is nearly 0.75 $\mu$m and the curvature of the top end portion is nearly 10 nm.

By removing the dielectric or metal layer 24 and resist 23 at the final step, a thermally-assisted magnetic recording head as shown in FIGS. 1A and 1B can be provided. No read element is shown in FIGS. 1A and 1B, but a read element may be formed at either the leading side or trailing side of the write element, for example, as in an ordinary planar type magnetic head.

Figure 3:
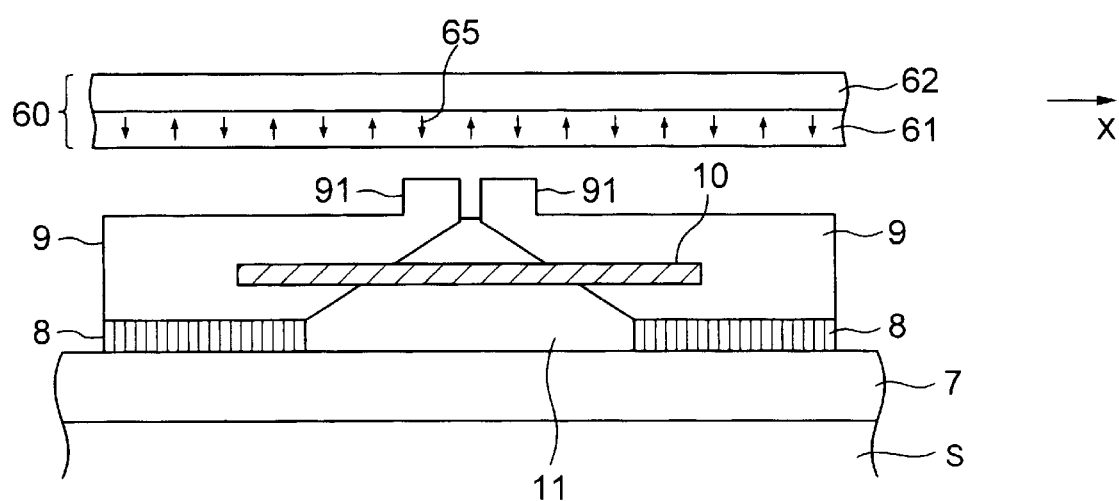
FIG. 3 shows an embodiment of the read element which may be disposed at the leading or trailing side in FIGS. 1A and 1B.

Referring now to FIG. 3, there is shown an embodiment of the read element which may be disposed at the leading or trailing side in FIGS. 1A and 1B. In FIG. 3, the reference S indicates a head substrate, X a medium moving direction (at the trailing side), 7 an adjusting layer, 8 an electrode, 9 a yoke, 91 a yoke end, 10 a GMR (giant magentoresistive) element, 11 an insulator, 60 a medium, 61 a recording layer and 62 a lining layer. In the above construction, the adjusting layer 7 is not always necessary. Note that in FIG. 3, the elements having the same or similar functions as or to those of the elements shown in FIGS. 1A through FIG. 2E will be indicated with the same or similar reference numerals as those in FIGS. 1A through 2E. They will not be described in detail.

The read element shown as an example in FIG. 3 can be manufactured in parallel to the aforementioned write element as in the following. The adjusting layer 7 is formed on an ALTIC substrate to make the top of the yoke end 91 generally coincide with that of the tip 13 of the main magnetic pole 11. Next, a resist frame is formed on the adjusting layer 7 to form the Cu electrode 8 for example. After removing the resist, the insulator 11 of $SiO_2$ for example is buried up to the bottom of the GMR element 10, and then it is tapered by etching to expose the electrode 8. The yoke 9 is formed by frame plating of the GMR element 10 down to the bottom of the latter. After the yoke 9 is flattened as necessary, the GMR element 10 is formed before patterning. The GMR element 10 may be formed from a lamination of Co, Cu, Co and FeMn layers.

Next, the portion of the insulator 11, over the GMR element 10, is formed and tapered by etching to expose the lower portion of the yoke 9. Then, the upper portion of the yoke 9 is formed by frame plating. The yoke end 91 and read gap (between two ends) have to be fine-worked. The FIB process is used to work them as necessary to form a pattern of several tens of nm. The yoke end 91 is provided to pick up signal magnetic field depending upon the magnetized direction of the recording layer 61 of the medium 60, and the picked-up signal is read by the GMR element 10 buried in the insulator 11.

A substrate having provided thereon the magnetic recording element in FIGS. 1A and 1B, provided with the electron emitter 40 produced as in the above, and the read element in FIG. 3, disposed at the trailing side in FIGS. 1A and 1B, is cut into stripes, and each stripe is cut into chips, each chip is worked into a slider, then the slider is mounted on a suspension to provide a thermally-assisted magnetic recording head according to the present invention. Note that the thermally-assisted magnetic recording head according to the present invention can also be produced by attaching a thin film element onto an appropriate substrate other than the ALTIC substrate, coating it with a protective member, separating the thin film element from the substrate, attaching it on a slider, and finishing the surface.

In embodying the present invention, the field intensity at the tip of the electron emitter is important, so when the magnetic recording head levitates, a variation of the head levitation will undesirably lead to a variation of the field intensity. To avoid this, the slider should be designed to a contact pad type which is slidable in contact with the medium. When the slider moves in contact with the medium, the head levitation will not vary but the load acting on between the head and medium will vary. There is coated on the sliding surface of the head on the medium a DLC (diamond-like carbon) layer of about 5 nm in thickness to protect the head.

Next, an embodiment of the medium installable in the thermally-assisted magnetic recording device according to the present invention will be described. The basic construction of the medium is as shown in FIGS. 1A and 1B. No medium-protective layer and lubricant are illustrated in FIGS. 1A and 1B for the simplicity of illustration. Normally, however, they should desirably be provided. This embodiment of the medium can use a vertically magnetizable, multiparticle layer with a soft-magnetic base layer. More specifically, a soft-magnetic base layer 62 of NiFe is formed to a thickness of 100 nm on a glass substrate, then a vertically magnetizable, multiparticle layer 61 of CoPt and $SiO_2$ films, is formed to a thickness of 20 nm on the base layer 62, and a protective layer of C is formed to a thickness of 3 nm on the layer 61, all by sputtering. Further, a lubricant is coated on the protective layer and the surface irregularities are removed by tape burnishing. In this embodiment, the recording layer 61 is made of a so-called granular layer having a structure in which magnetic particles of CoPt are dispersed in a base material of $SiO_2$. This is because the size and content of the magnetic particles can easily be controlled. For forming the recording layer 61 of CoPt and $SiO_2$ films, binary sputtering is made with a CoPt target and $SiO_2$ target, and the particle size and CoPt content are controlled by varying the sputter input to each of the targets. Also, only the particle size may be controlled independently by the bias power by applying a bias to the substrate during sputtering.

Before conducting experiments on the write and read by the thermally-assisted magnetic recording head according to the present invention, the composition, fine structure and magnetic characteristic of the medium involved in the present invention were examined. The content of CoPt in the CoPt-$SiO_2$ layer formed under the typical conditions was 60% by volume. The result of the fine structure analysis proved that the CoPt and $SiO_2$ particles are separate from each other and the $SiO_2$ base material was spotted with the CoPt particles. The mean size of the CoPt particles was about 7 nm. The magnetic characteristic was measured as will be described below. Namely, a torque meter and VSM were used to examine the thermal characteristic at different temperatures included in a range of liquid nitrogen temperature to 500° C. The typical magnetic characteristics measured at the room temperature were: Ku: $4.5 \times 10^6$ erg/cc, Hc: 5 kOe, and Ms: 400 emu/cc. The particles having the mean size was found to have a KuV/kT value of about 125 at the room temperature (300 K). Thus, the medium used in this embodiment can be said to show an ambient thermal agitation at a temperature near the room temperature. The magnetic characteristic varied as a function of the temperature and was found to be monotonously lower in a direction from a low temperature to a high temperature.

Figure 4:
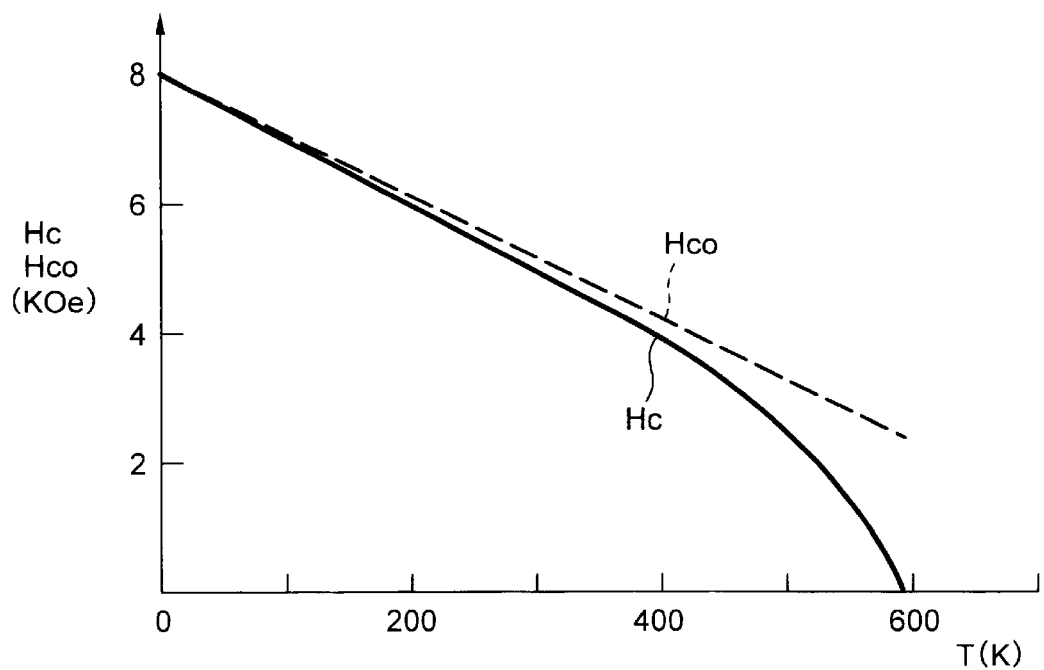
FIG. 4 graphically shows the temperature characteristic of Hc measured with VSM and that of Hc0 estimated using the Sharrock's expression.

Referring now to FIG. 4, there is illustrated a graph of the dependence on the temperature of Hc measured using VSM and that of Hc0 estimated using the Sharrock's expression. Since VSM takes a time of about 10 minutes for loop measurement, Hc measured by VSM is a coercive force after the magnetic field is subjected to a thermal agitation for about 10 minutes at the temperature. On the other hand, the coercive force Hc0 associated with the recording is a magnetic field required for a high speed magnetic transition for about 10 ns during actual recording by the head. It means a magnetic field required for a magnetic transition within a time for which it will be little influenced by a thermal agitation. In a temperature range in which the magnetic field will be little affected by the thermal agitation within a time of about 10 minutes, Hc and Hc0 will nearly (completely when K is zero) coincide with each other, but in a high temperature range, Hc will be considerably lower than Hc0. Important in the thermally-assisted magnetic recording is not Hc but Hc0. So, Hc0 was determined based on a combination of the measurement with VSM and Sharrock's expression.

As the result, Hc0 measured at a temperature near the room temperature was 5.2 kOe which is nearly the same as Hc, but in a temperature range higher than 100° C. equivalent to the temperature during the thermally-assisted recording, Hc was considerably higher than Hc0. The saturation magnetic field of the medium required for the recording should preferably be nearly double Hc0. However, since the saturation field is nearly proportional to Hc0, the present invention will be described below using Hc0 as the necessary magnetic field for the thermally-assisted magnetic recording. Note that when K is zero, the anisotropic energy Ku0 was $8 \times 10^6$ erg/cc and saturation magnetization Ms0 was 600 emu/cc. Since the CoPt content in the layer was 60% by volume, the net magnetization Isb was 1000 emu/cc. When the high temperature-side Hc0 was extrapolated, the Curie point was estimated to be five hundreds and several tens of ° C. and the temperature at which Hc0 decreased to 2 kOe was estimated to be about 300° C.

In the experiments, the medium having the above-mentioned magnetic characteristic was set along with the thermally-assisted magnetic recording head in a spin-stand type magnetic recording/reproducing evaluation apparatus, the medium was moved at a rate of 10 m/s in relation to the head, and the write and read were tested with a relatively low linear density equivalent to a solitary wave output of 100 kfci to examine the read output voltage. The head was moved in contact with the slider, the spacing was controlled in a range of 8 to 10 nm, that is, a range from a sum (8 nm) of the head protective layer thickness and medium protective layer thickness to a sum (10 nm) of the lubricant layer thickness and the sum of the layer thickness. As variables of write and read, the emission electron current was varied by changing the voltage applied to the electron emitter and the recording field intensity was varied by changing the current supplied to the recording coil 21. The electrode 30 of the electron emitter 40 was applied with a voltage being negative in relation to the ground potential, and the medium was at the ground potential. The voltage applied to the electron emitter 40 may be either a DC or pulse voltage.

Figure 5:
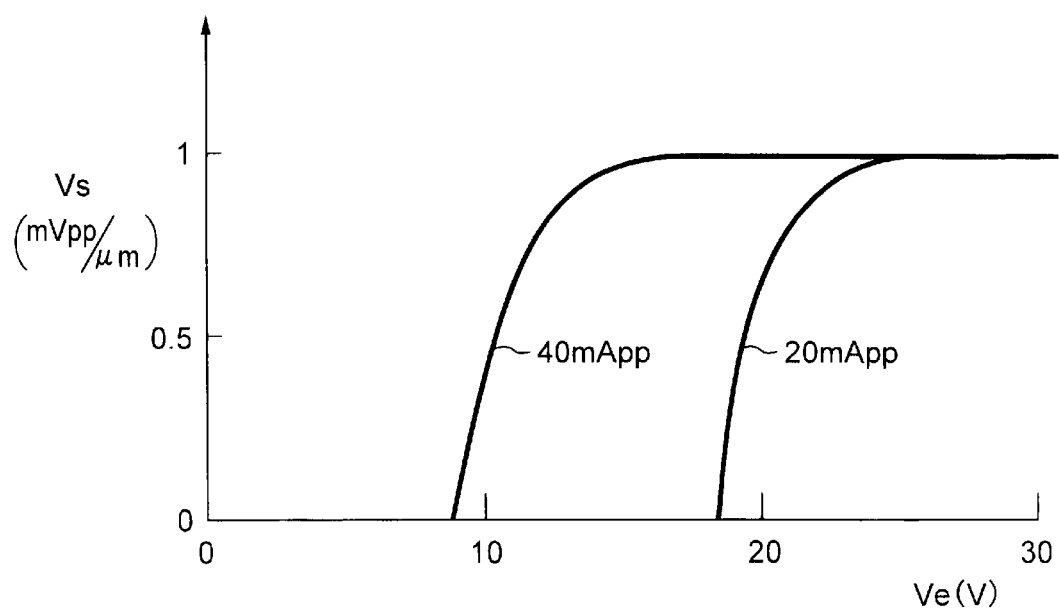
FIG. 5 graphically shows a relation between a voltage Ve applied to the electron emitter and GMR read output voltage Vs per 1 $\mu$m of track width in which a current Iw supplied to the recording coil is taken as parameter.

Referring now to FIG. 5, there is graphically illustrated a relation between a voltage Ve applied to the electron emitter and GMR read output voltage Vs per 1 μm of track width in which a current Iw supplied to the recording coil 21 is taken as parameter. In FIG. 5, only two examples, Iw of 20 mA and Iw of 40 mA, are shown. However, when the applied voltage Ve was lower than 7.5 V, no read output could be provided with the supplied current Iw increased to a largest possible one. On the contrary, when a voltage Ve applied to the electron emitter was higher than 15 V with the current Iw supplied to the recording coil 21 being 40 mA which is a practical value for use in the magnetic disc drive, and more preferably when the applied voltage Ve was higher than about 25 V with the supplied current Iw being 20 mA, a high saturation read output could be provided, which proves that the present invention is highly advantageous.

Further, some thermally-assisted magnetic recording heads were experimentally prepared by varying a track-directional distance D between the top end portion of the electron emitter 40 and the leading edge of the tip 13 of the main magnetic pole 11 as in FIGS. 1A and 1B and were similarly tested. The test result proved that if the distance D is too long, the medium once heated by the electron beam would be cold before the magnetic field-applied portion thereof was reached, so that no significant recording was possible. The range of the distance D which enables the significant recording was found to be 500 nm or less, preferably, 250 nm or less, and most preferably, 100 nm or less. The test result shown in FIG. 5 corresponds to the test with the distance D of 250 nm. As seen from FIG. 5, the shorter he distance D, the lower the values Ve and Iw necessary for the saturation recording were. However, even when the distance D was set as short as possible, no significant recording was possible with the applied voltage Ve being 5 V or less. As will further be described later, in case of a head having a ridge whose line is directed towards the track, a significant recording is possible even with the distance D being longer than the above.

Next, the recording mechanism of the thermally-assisted magnetic recording device according to the present invention will be described herebelow with reference to FIGS. 6A through 6C.

Figure 6A:
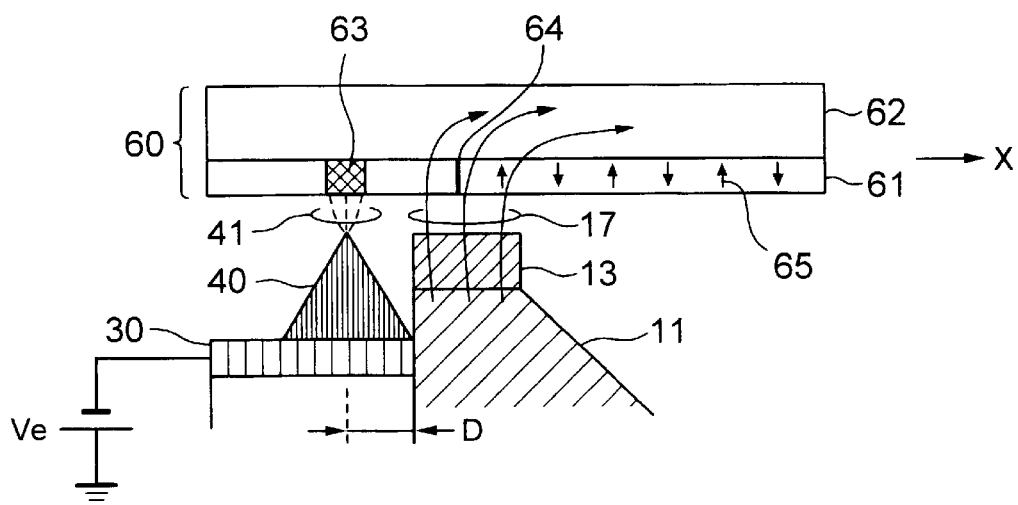
Figure 6B:
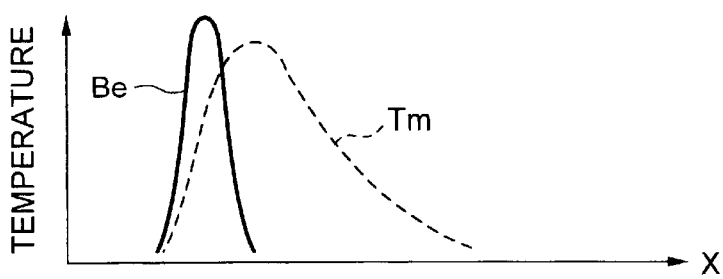
Figure 6C:
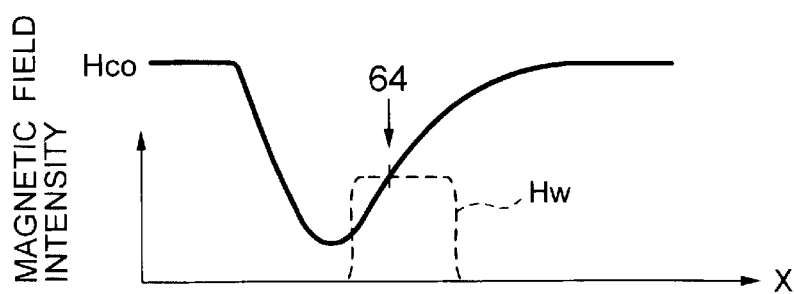

FIGS. 6A through 6C schematically shows the process of recording by the thermally-assisted magnetic recording head according to the present invention. FIG. 6A is a sectional view of an portion extracted from FIG. 1B and associated with the recording process, FIG. 6B graphically shows an electron beam profile on the medium and a temperature distribution on the medium and FIG. 6C graphically shows a spatial distribution of the medium coercive force and that of the recording magnetic field. In FIG. 6A, reference numeral 11 indicates a main magnetic pole, 13 a tip of the main magnetic pole, 17 a magnetic flux generated by the main magnetic pole 11, 30 an electron emitter electrode, 40 an electron emitter, 41 an electron beam, 60 a medium, 61 a recording layer, 62 a soft-magnetic lining layer, 63 a medium heater, 64 a magnetically recording portion of the medium 60, and 65 a magnetization of the medium 60. In FIG. 6A, the elements having the same or similar functions as or to those of the elements shown in FIGS. 1A and 1B will be indicated with the same or similar reference numerals as those in FIGS. 1A and 1B. They will not be described in detail.

In FIG. 6A, the reference Ve indicates a voltage applied to the electron emitter 40, D a track-directional distance between the top end portion of the electron emitter 40 and leading edge of the tip 13 of the main or recording magnetic pole 11, X a moving direction of the medium 60, Be an electron beam profile on the medium surface, Tm a medium temperature, Hc0 a coercive force of the medium 60, and Hw a recording magnetic field.

The medium 60 is moved from left to right (in the plane of FIG. 6A; the left side of the plane is leading side while the right side is trailing side) in relation to the head, and a voltage Ve is applied to the electron emitter 40 to direct an electron beam 41 from the top end portion of the electron emitter 40 towards the recording layer 61. The spatial distribution of the electron beam incident upon the medium 60 is as indicated with Be in FIG. 6B. The recording layer 61 is heated by the electron beam 41 having the profile Be. Since the medium 60 is moved at a high speed, the temperature of the recording layer 61 will delineate a curve whose peak is shifted towards the trailing side in relation to the electron beam profile Be, that is, a curve Tm in FIG. 6B. The distribution of the coercive force Hc0 of the medium 60 depends upon the temperature distribution Tm and temperature characteristic of Hc0 shown in FIG. 4 and delineates a curve Hc0 shown in FIG. 6C. The distribution of Hc0 and distribution Hw of a magnetic flux 18 generated by the recording magnetic pole 11 and interlinking the medium 60 intersect each other at a position 64 the magnetized direction of the medium 60 depends on.

As seen from FIG. 6C, the trough of Hc0 is deeper as the power or energy of the incident electron beam is higher, while the crest of Hw is higher as the current Iw supplied to the recording coil 21 is larger. The position where Hc0 and Hw curves intersect each other shifts depending upon the distance D between the top end portion of the electron emitter 40 and leading edge of the tip 13 of the recording magnetic pole 11.

As seen from FIG. 6C, the magnetic transition point in the thermally-assisted magnetic recording according to the present invention differs from that in the conventional magnetic recording and will also lie at other than the trailing edge of the tip 13 of the recording magnetic pole 11.

In the conventional magnetic recording not thermally assisted, since Hc0 of the medium 60 is spatially uniform and a larger recording magnetic field than Hc0 is applied to provide a magnetic transition, the magnetic transition position necessarily lies in the trailing edge of the tip 13 of the recording magnetic pole 11. On the contrary, in the thermally-assisted magnetic recording according to the present invention, the magnetized direction coincides with the direction of the recording magnetic field only within an area defined between Hc0 and Hw curves intersecting at two points. When the direction of the recording magnetic field is reversed at a time when the medium 60 passes by between Hc0 and Hw, a magnetic transition takes place at that position, therefore, the magnetic transition will not always take place in the trailing edge of the recording magnetic pole 11 but in an arbitrary area between Hc0 and Hw curves intersecting at two points and between the leading and trailing edges.

In FIG. 6A, there are shown only the major components of the recording device and medium in the form of a lateral sectional view. However, it should be noted that when the intensity distribution of the electron beam on the medium surface is curved in the direction of the track width, the line between the points of intersection between Hc0 and Hw curves. Therefore, the magnetic transition provided by the thermally-assisted magnetic recording according to the present invention is curved in the direction of the track width as the case may be. The development of the magnetic transition not always only in the trailing edge of the tip of the recording magnetic pole 11 but also at an arbitrary point between the points of intersection between Hc0 and Hw curves and occasional curving of the magnetic transition in the direction of the track width can be counted at the differences of the thermally-assisted magnetic recording according to the present invention from the conventional magnetic recording.

In the foregoing, the first or basic embodiment of the present invention has been described in which a low recording frequency is selected for the purpose of definite examination of the behavior of the signal output. However, it is of course that the present invention can realize a quality thermally-assisted magnetic recording even with a high linear density.

(Second Embodiment)

Next, the present invention will be described herebelow concerning its second embodiment of the thermally-assisted magnetic recording device.

In the first embodiment of the thermally-assisted magnetic recording device according to the present invention, the multiparticle layer was used as the medium. The present invention is advantageous when the medium is formed from a continuously magnetic layer, that is, an amorphous magnetic layer, too. A medium formed from a layer of a ferrimagnetic alloy of an amorphous rare earth and transition metal (R-T layer) and used as a magneto-optical recording medium, was experimentally prepared and installed in the thermally-assisted magnetic recording device according to the present invention. The second embodiment was evaluated similarly to the first embodiment having been described in the foregoing.

The medium is constructed by forming on a glass substrate a heat sink layer of an Al alloy, TbFeCo recording layer of TbFeCo, protective layer of C and a lubricant layer in this order. The heat sink layer was provided to adjust the thermal response of the recording layer.

Figure 7:
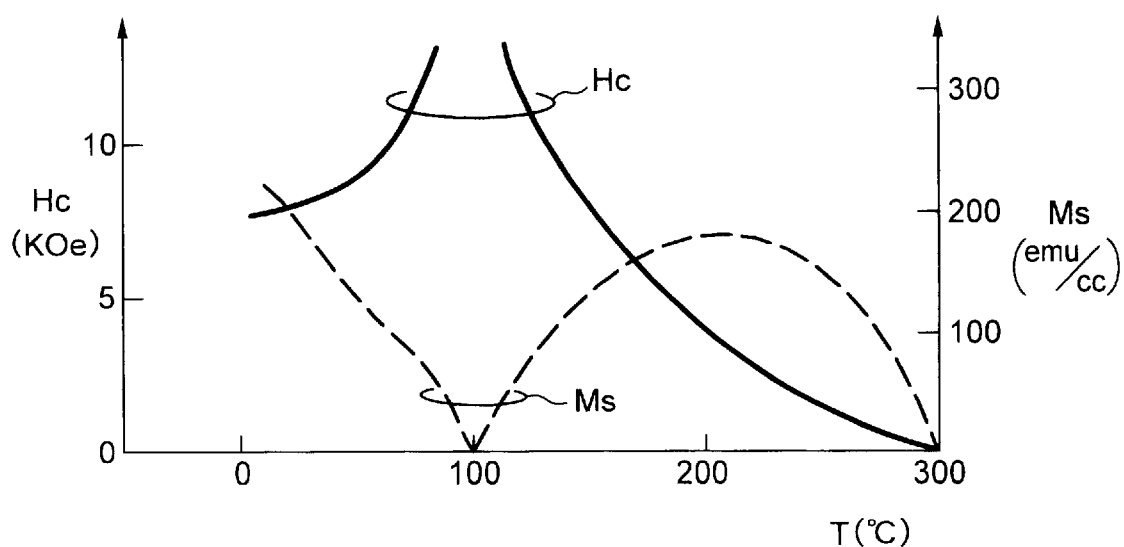
FIG. 7 graphically shows a thermally-assisted magnetic characteristic of the medium experimentally prepared, in which Hc is a coercive force and Ms is a saturation magnetization related to a read signal.

Referring now to FIG. 7, there is graphically illustrated a thermally-assisted magnetic characteristic of the medium experimentally prepared. In FIG. 7, Hc is a coercive force and Ms is a saturation magnetization related to a read signal. In a continuously magnetic layer such as a magneto-optical layer, since no thermal agitation will take place, Hc and Hc0 basically coincide with each other in the entire temperature range. In this second embodiment, the composition of the recording layer was adjusted so that Ms at a temperature near the room temperature was 200 cmu/cc or so for an ample magnetic signal. Also, the compensation point was set to about 100° C., recording point to two hundreds and several tens of ° C., and the Curie point was to 300° C. The medium was set along with the thermally-assisted magnetic recording head according to the present invention in the spin-stand type evaluation apparatus and subject to the same evaluation as for the first embodiment. The evaluation result was almost same as that of the first embodiment.

Figure 8:
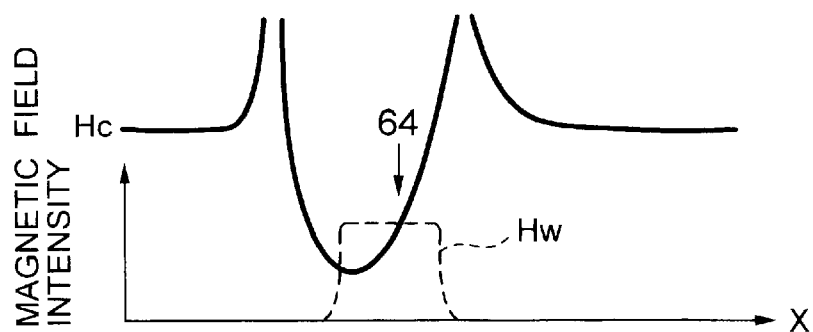
FIG. 8 graphically explains the concept of information recording to the medium in FIG. 7 according to the present invention.

FIG. 8 graphically explains the concept of information recording to the medium in FIG. 7 according to the present invention. The construction of the thermally-assisted magnetic recording head, intensity distribution of the electron beam, and temperature distribution on the medium are exactly as shown in FIG. 6B. Different from in FIG. 6B is the Hc distribution on the medium. Since the compensation point is set to nearly 100° C., Hc will be distributed as shown in FIG. 8 correspondingly to a temperature distribution Tm to that shown in FIG. 6B. The Hc curve and curve of the magnetic field Hw applied by the recording medium will intersect each other at a position the magnetized direction depends on.

(Third Embodiment)

Next, the present invention will be described herebelow concerning the third embodiment thereof.

According to this embodiment, the thermally-assisted magnetic recording head according to the present invention was produced with some different settings of the track width Te of the top end portion of the electron emitter and track width Tw of the tip of the recording magnetic pole, respectively, as shown in FIGS. 1A and 1B or FIG. 6A. The head was combined with the medium included in the first embodiment, and evaluated similarly to the first embodiment, and also the cross-erase (erasure of record signal on an adjacent track) was evaluated.

In the third embodiment, the track width of the tip of the recording magnetic pole was fixed to 0.75 $\mu$m, the length in the direction of the track width of the hole (25 in FIGS. 2B and 2C) for forming the electron emitter was changed, and the track width Te of the top end portion of the electron emitter was changed. Also, the track pitch was set to 1 $\mu$m, recording was made to five tracks adjacent to each other with different recording frequencies, and then recording to the middle track was repeated 105 times to examine whether the record signal in the adjacent tracks would be deteriorated.

Figure 9:
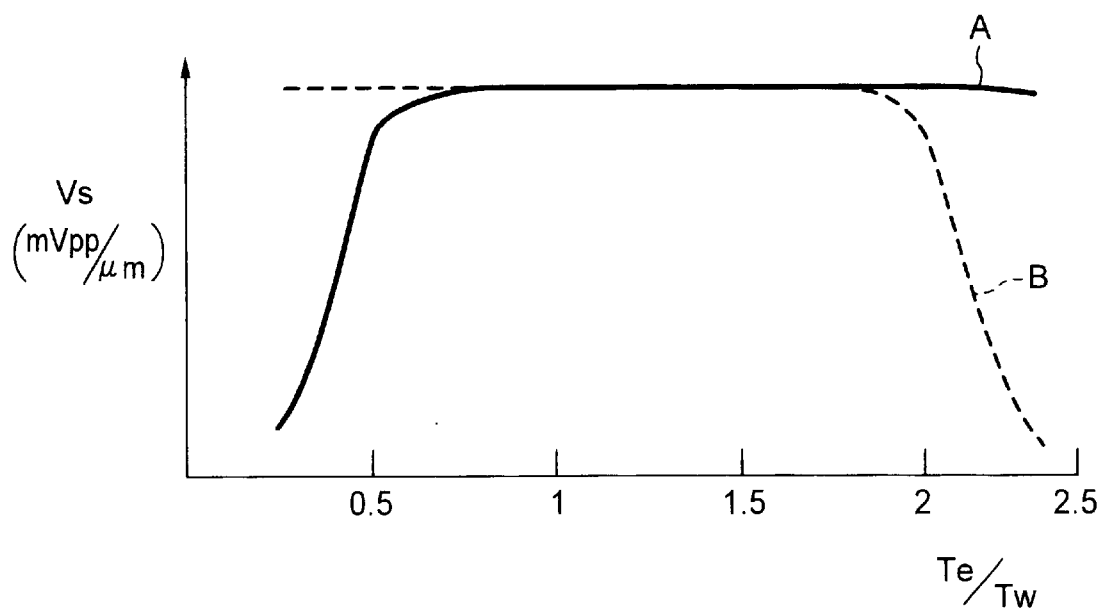
FIG. 9 graphically shows the result of the evaluation of the third embodiment of the present invention.

FIG. 9 graphically shows the result of the evaluation of the third embodiment of the present invention. In the graph, the horizontal axis shows Te/Tw ratio while the vertical axis shows read output. The reference A indicates a read output from the track, recorded as in the first embodiment, and B indicates a read output from a track adjacent to the track to which recording was repeatedly made 105 times (the read data had been pre-recorded with a difference frequency from that for the track to which 105 times of recording was repeated). The curve A will make it clear that the read output falls suddenly with the Te/Tw ratio being of less than ½. This is because with a too small a Te/Tw ratio, it is difficult to sufficiently heat the medium over the track width and no significant recording is possible near the track edge.

Also it will be known from the curve B that with two large a Te/Tw ratio, signals already recorded in tracks adjacent to the one to which recording was repeatedly made are deteriorated. It is considered as the reason for the above that although no recording magnetic field will be applied to any adjacent tracks during recording, too large a Te/Tw ratio will cause the end portions of the adjacent tracks to heated and data to be gradually destroyed by thermal agitation. As seen from FIG. 9, it is preferable in this embodiment of the present invention to establish a relation of ½Te≦Tw≦2Te between the track width Te of the electron emitter and track width Tw of the tip of the recording magnetic pole.

(Fourth Embodiment)

Next, the present invention will be described herebelow concerning the fourth embodiment thereof.

The fourth embodiment is a thermally-assisted magnetic recording head having a plurality of electron emitters provided in the direction of the track.

Figure 10:
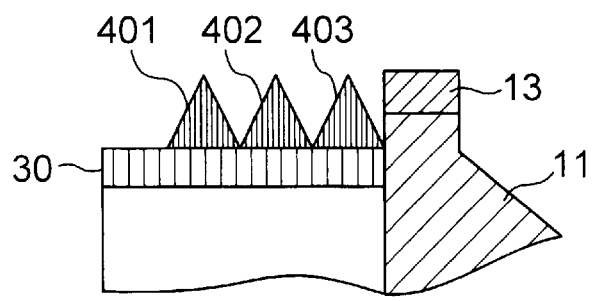
FIG. 10 is a sectional view of the essential components of the thermally-assisted magnetic recording head, by way of example, having a plurality of electron emission tips.

Referring now to FIG. 10, there are illustrated in the form of a sectional view essential components of the thermally-assisted magnetic recording head, by way of example, having a plurality of electron emitters provided therein. In FIG. 10, reference numeral 11 indicates a main magnetic pole, 13 a tip of the main magnetic pole 11, 30 an electron emission electrode, 401 is a first electron emitter, 402 a second electron emitter, and 403 a third electron emitter. In FIG. 10, the elements having the same or similar functions as or to those of the elements shown in FIGS. 1A and 1B or FIG. 6A will be indicated with the same or similar reference numerals as those in FIGS. 1A and 1B or 6A. They will not be described in detail. FIG. 10 illustrates an embodiment in which three electron emitters are provided. However, the present invention is not limited to this number of electron emitters but can use more than three electron emitters. This embodiment is specially advantageous in that the efficient of medium heating is improved by providing the plurality of electron emitters in the direction of the track. Any electron emitters disposed too far from the recording magnetic pole will not work so effectively. The preferable number of the electron emitters used in the present invention is two to five in total.

The plurality of electron emitters shown, by way of example, in FIG. 10 can be formed by somewhat modifying the manufacturing process for the first embodiment, having previously been described with reference to FIGS. 2A THROUGH 2E. Namely, in the process in which the hole is formed in the dielectric or metal layer 24, shown in FIG. 2B, it suffices to form a plurality of holes of a predetermined size in the direction of the track. When the plurality of electron emitters is provided, the distance between the top end portions thereof should preferably be short. Therefore, to form the electron emitters 401 to 403 (as in FIG. 2D), a highly anisotropic method such as the long-slow sputtering, collimated sputtering or the like should be adopted, and the height of the electron emitters should be low.

The thermally-assisted magnetic recording head provided with the plurality of electron emitters thus formed was evaluated similarly to the first embodiment. As the evaluation result of the first embodiment, the range of the distance D enabling significant recording was proved to be 500 nm or less, preferably 250 nm or less, and more preferably 100 nm or less. The evaluation result of the fourth embodiment proved that sufficiently significant recording was possible with a distance D being more than double that in the first embodiment. In the evaluation of the fourth embodiment, an integration in the direction of the track of the heat developed by the electron beams emitted from the individual electron emitters was taken as the medium temperature. The distance between the electron emitters should be equal to the distance D which should be when the single electron emitter is used.

On the other hand, the same effect can also be assured by changing the direction of the ridge of the electron emitter instead of providing the plurality of electron emitters. More specifically, the electron emitter in FIGS. 1A and 1B should be formed rectangular in the direction of the track (it should be turned 90° in the plane of FIG. 1B). Also in this case, the electron incident area of the medium will be longer in the direction of the track, so that the medium can be heated with a high efficiency. The track width in this case may be defined to be a one which would be when the plurality of electron emitters is provided in the direction of the tack width, or several tens of nm which would be defined when the single electron emitter is provided. Note that a top end portion of 10 nm or so of the electron emitter can effectively emit electrons as having previously been described. However, by applying a higher electric field, the effective electron emitting portion can be extended to 20 nm or so. Also, since the electric field distribution between the top end of the electron emitter and medium surface has a profile extending somehow on the medium surface, the electron incident area of the medium surface is wider than the electron emitting area. For example, when the spacing is 10 nm or so, the electron incident area will be 20 to 30% wider than the electron emitting area. With the spacing being small, the electron emitting area and electron incident area will be equal in size to each other.

(Fifth Embodiment)

The aforementioned embodiments are combinations of a planar type magnetic recording had and electron emitter. However, the present invention is applicable to a laminated type thin magnetic head.

Figure 11:
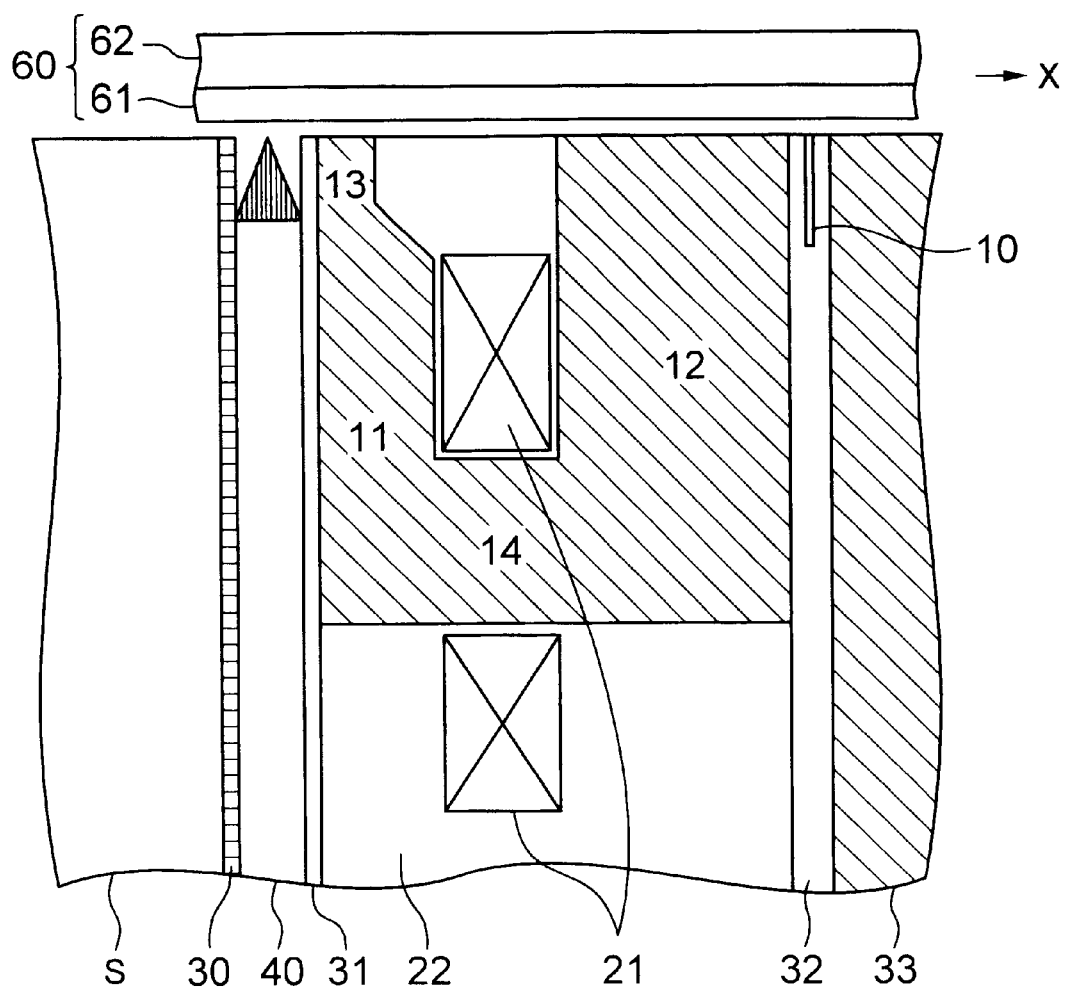
FIG. 11 is a sectional view of the thermally-assisted magnetic recording head composed of a laminated type magnetic head and electron emitter according to the present invention.

Referring now to FIG. 11, there is illustrated in the form of a sectional view a thermally-assisted magnetic recording head composed of a laminated type thin magnetic head and electron emitter according to the present invention. In FIG. 11, reference numeral 11 indicates a main magnetic pole, 12 a return-path magnetic pole, 13 a tip of the main magnetic pole 11, 14 a connection between the main magnetic pole 11 and return-path magnetic pole 12, 21 a coil, 22 a layer in which the coil 21 is buried, 30 an electrode, 32 a read gap, 31 an insulative layer, 33 an upper shield, 10 a GMR read element, 60 a medium, 61 a recording layer, 62 a lining layer, S a substrate, and X a medium moving direction. In FIG. 11, the elements having the same or similar functions as or to those of the elements shown in FIGS. 1A and 1G or FIG. 3 will be indicated with the same or similar reference numerals as those in FIGS. 1A and 1B or FIG. 3. They will not be described in detail.

The thermally-assisted magnetic recording head shown, by way of example, in FIG. 11 can be produced following the procedure given below for example. The substrate S should desirably be an ALTIC substrate easily workable into a slider. The electrode 30 for the electron emitter is provided in the form of a stripe on an insulative layer formed, if applicable, on the substrate S or directly on the substrate S. A layer of carbon (C) is provided also in the form of a stripe on the electrode 30. After the lamination thus formed is flattened, an insulative layer 31 is formed thereon, and the main magnetic pole 11 is formed by frame plating. The top end portion of the main magnetic pole 11 is etched to form the tip 13.

Next, the coil 21 of Cu is formed by frame-etching and a through-hole is formed in the connection 14. Then, the connection 14 is formed by frame plating, and also the return-path magnetic pole 12 is formed by frame plating. The surface of the return-path magnetic pole 12 is flattened.

Further, the read gap layer 32 is formed to a half or so thereof, the GMR element is formed, and a hard bias layer and Cu lead are formed at opposite sides of the GMR element. Thereafter, the rest of the read gap layer 33 is formed and then the upper shield 33 is formed. In this state, the top end portion of the electron emitter has no ridge yet but it has the shape of a square pole. After the thin layers are thus formed on the substrate S, the substrate S is cut into stripes and each stripe is cut into chips, and thus the surface of an ABS layer is exposed. A protective layer is coated on the ABS surface, and finally FIB process is used to taper the top end portion of the electron emitter (made of C) from both sides thereof. At this time, the tip 13 of the main or recording magnetic pole 11 may be trimmed as necessary.

The thermally-assisted magnetic recording head thus constructed following the above procedure was evaluated similarly to the aforementioned embodiments. The evaluation (Sixth Embodiment)

Figure 12:
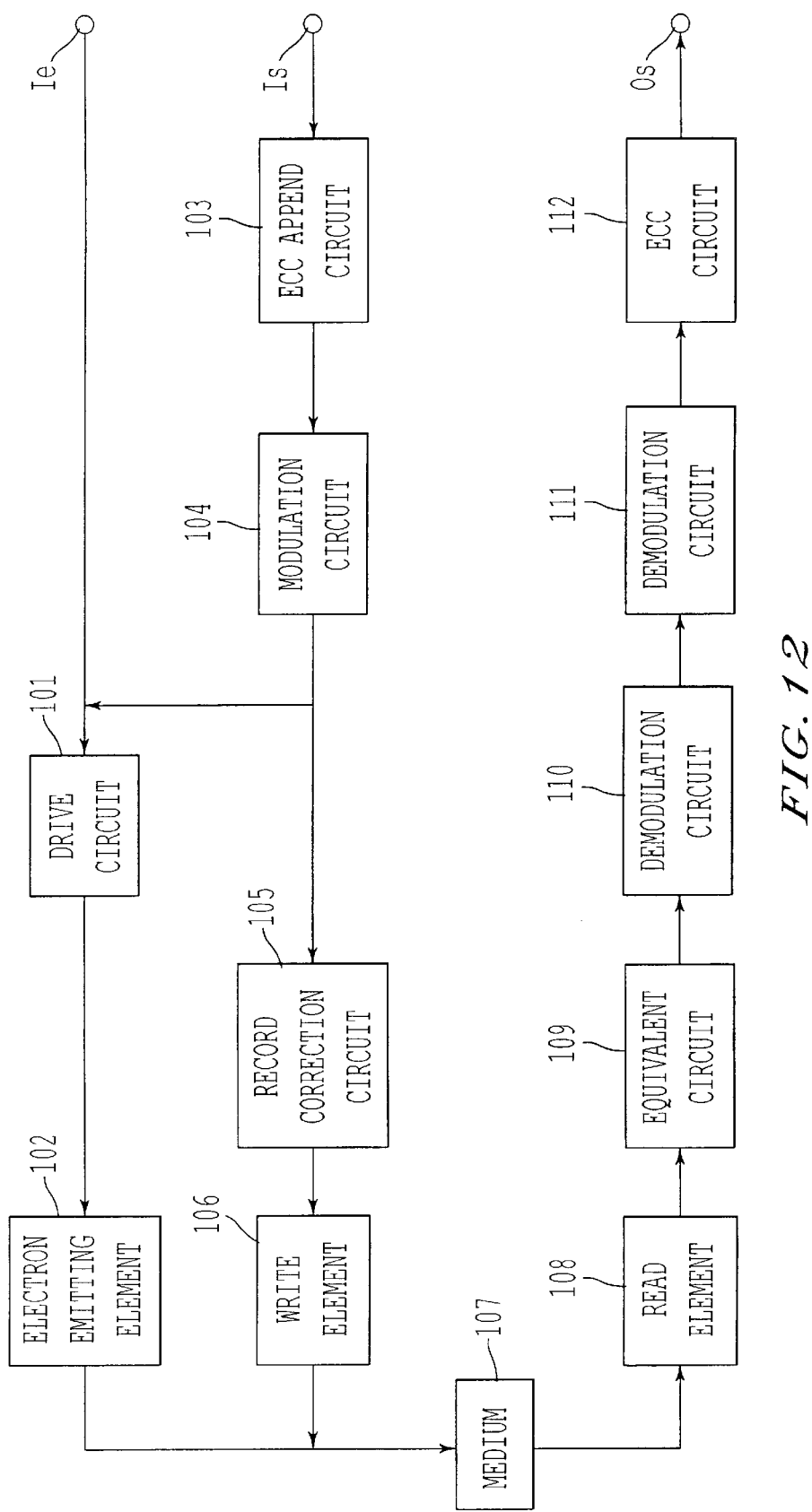
FIG. 12 is a block diagram of the thermally-assisted magnetic recording device according to the present invention, showing an example of the system construction of the recording device.

Next, the present invention will further be described concerning the sixth embodiment thereof with reference to FIG. 12.

This embodiment relates to a system configuration of the thermally-assisted magnetic recording device.

FIG. 12 is a block diagram of the thermally-assisted magnetic recording device according to the present invention, showing an example of the system construction of the recording device. In FIG. 12, the reference Ie indicates an electron emitter drive input, Is a signal input, Os is a signal output, 101 an electron emitter drive circuit, 102 an electron emitting element incorporated in the head, 103 an ECC (error correction code) append circuit, 104 a modulation circuit, 105 a record correction circuit, 106 a write element incorporated in the head, 107 a medium, 108 a read element incorporated in the head, 109 an equivalent circuit, 110 a demodulation circuit, 111 a demodulation circuit, and 112 an ECC circuit.

Different from the conventional magnetic disc drive not of the thermally-assisted type, this embodiment is characterized by the addition of the electron emitter drive input Ie, electron emitting element drive circuit 101 and electron emitting element 102, the novel head construction as having previously been described concerning the aforementioned embodiments, and the specially adjusted thermally-assisted magnetic characteristic of the medium as having previously been described concerning the aforementioned embodiments.

To drive the electron emitter, a DC voltage may be applied to the electron emitter or the electron emitting element may be DC-driven with no electron emitting element drive circuit being provided. Also, the electron emitter may be driven in a pulsed manner synchronously with an output from the modulation circuit 104. The pulsed drive will make more complicate the circuit configuration, but it is preferable for a longer service life of the electron emitter. The ECC append circuit 103 and ECC circuit 112 may not be provided. The modulation and demodulation method, and record correcting method may freely be selected.

Information is read to the medium by directing an electron beam from the electron emitting element 102 to the medium and applying a recording magnetic field derived by modulating a recording signal from the write element 106 to a position on the medium where Hc0 has been lowered due to the incident electron beam. Forming of information to be written as a magnetic transition train on the medium surface is the same as in the conventional magnetic recording device. However, when the electron beam is curved in the direction of the track idth, the magnetic transition is also curved in the direction of the track width. A fringing field developed from the magnetic transition train and coming from the medium is detected as a signal field by the read element 108.

The read element 108 is typically of GMR type, but it may be of the ordinary AMR (anisotropic magnetoresistance) type. It may be of a TMR (tunneling magnetoresistance) type in future.

The thermally-assisted magnetic write and read by the thermally-assisted magnetic recording device according to the present invention were evaluated. The result is equal to that obtained by the evaluation of the aforementioned embodiments using the spin-stand type evaluation apparatus.

result proved the effect of the present invention as with the aforementioned embodiments.

(Seventh Embodiment)

Figure 13:
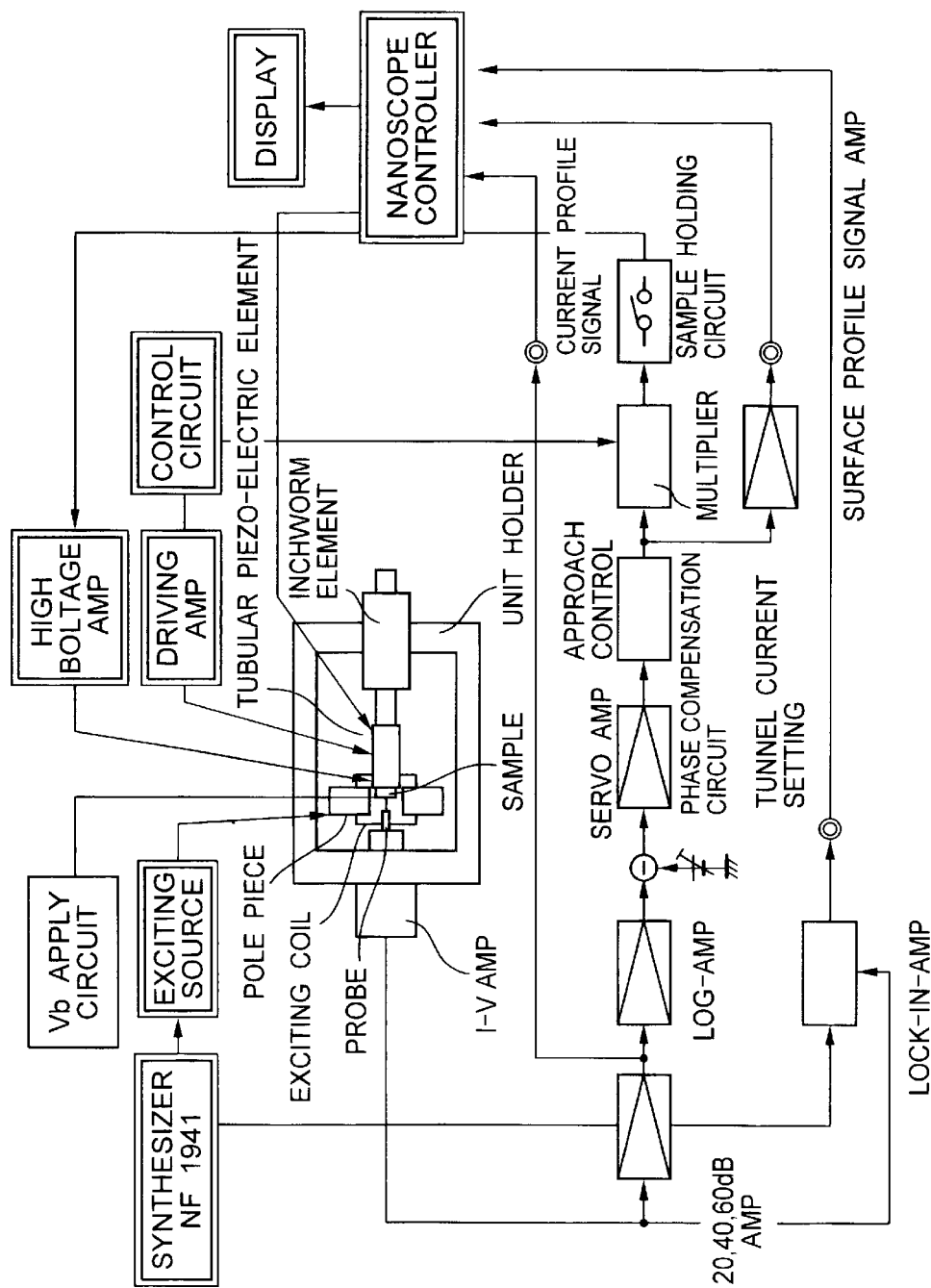
FIG. 13 is also a block diagram of the apparatus used in the experiments conducted by the Inventors of the present invention, showing the construction of the apparatus.

Next, the present invention will further be described concerning the seventh embodiment thereof with reference to FIG. 13.

This embodiment provides a thermally-assisted magnetic recording device in which the atmosphere around the electron emitter is controlled to further improve the reliability.

Before proceeding to the description of the seventh embodiment of thermally-assisted magnetic recording device according to the present invention, the experiments the Inventors of the present invention conducted and the experiment results will be described in detail herebelow. In the process to work out this embodiment, the Inventors made experiments on how the atmosphere around the electron emitter should be.

FIG. 13 is a block diagram of the apparatus used in the experiments conducted by the Inventors of the present invention. The apparatus shown in FIG. 13 is a modified one of STM (scanning tunneling microscopy). The modifications of STM will mainly be described below.

First Modification:

Carbon (C), Ta (tantalum) and Si (silicon) were coated on the layer of Pt (platinum) normally used to form the probe (corresponding to the electron emitter in the present invention) in STM to provide a probe made of materials generally used to form the field emission emitter.

Second Modification:

A sample having a dummy medium surface formed by coating a C (carbon) layer on a glass substrate was prepared as an object to be microscoped by STM (corresponding to the recording medium according to the present invention).

Third Modification:

This is related to the control of a distance between the probe and sample. In ordinary STM, the probe tip and sample surface are disposed several A (angstrom) off each other so that a tunnel current will flow. To detect a field emission current flowing over a distance of 10 nm or so, the Inventors of the present invention controlled an inchworm element by a sample holding circuit to move the sample in relation to the probe in a pulsed manner at a rate of 4 nm/step so that the distance between the probe and sample surface could be fixed to 10 nm or so.

Fourth Modification:

This is related to an increase of the range of measuring current. In ordinary STM, a tunnel current of 0.3 to 0.5 mA is used. However, since a field emission current of $10^{-4}$ A is advantageously used in the thermally-assisted magnetic recording device according to the present invention, the I-V amplifier was modified for a variable IV-converted resistance to monitor a current of $10^{-4}$ A or so. Furthermore, a modification was made so that when an emission current of $10^{-4}$ A or so was detected, a control in a constant current mode was started to enable measurement of a time for which the current continued to flow stable. The voltage applied to the probe was made variable between 0 and 15 V. Also, the probe and sample were disposed in a sealed container in which the internal atmosphere could freely be changed.

Using the experimental apparatus constructed as in the above, the experiments on this embodiment were conducted following the procedure given below:

First, with the probe kept at the ground potential, the probe was moved towards the sample surface to detect a tunnel current. It can be estimated that at this time, the probe and sample surface were several A (angstrom) off each other. The inchworm was driven taking this distance as a reference to move the sample from the probe at 2 to 3 steps, and the sample was fixed by the sample holding circuit. While applying a voltage gradually to the probe and varying the IV-converted resistance of the I-V in this condition, the field emission current was measured in a wide range of the current.

The probe used was a Pt probe normally used in ordinary STM and having C, Ta and Si coated to a thickness of about 2 to 5 nm by sputter coating. The atmosphere inside the container in which the probe was placed was changed to various degrees using a evacuation pump and gas inlet system. The composition of the gas in the sealed container was analyzed wit a quadrupole mass spectrometer (QMS) mounted on the container. When the internal pressure of the container was higher than the operating pressure of QMS, the gas was sampled through an orifice. The diameter of the orifice was varied depending upon the internal pressure of the container so that measurement was always possible with a high sensitivity. The output of QMS was calibrated with an output which was when an object gas (mainly oxygen) was introduced in 100% at a predetermined pressure to determine an absolute value of the partial pressure of the gas. Also, the experiment was conducted in a clean room so that the number of particles inside the container would be less than Class 100. After replacing the probe and sample, the container inside was cleaned back to a predetermined atmosphere by purging a dry nitrogen several times.

Figure 14:
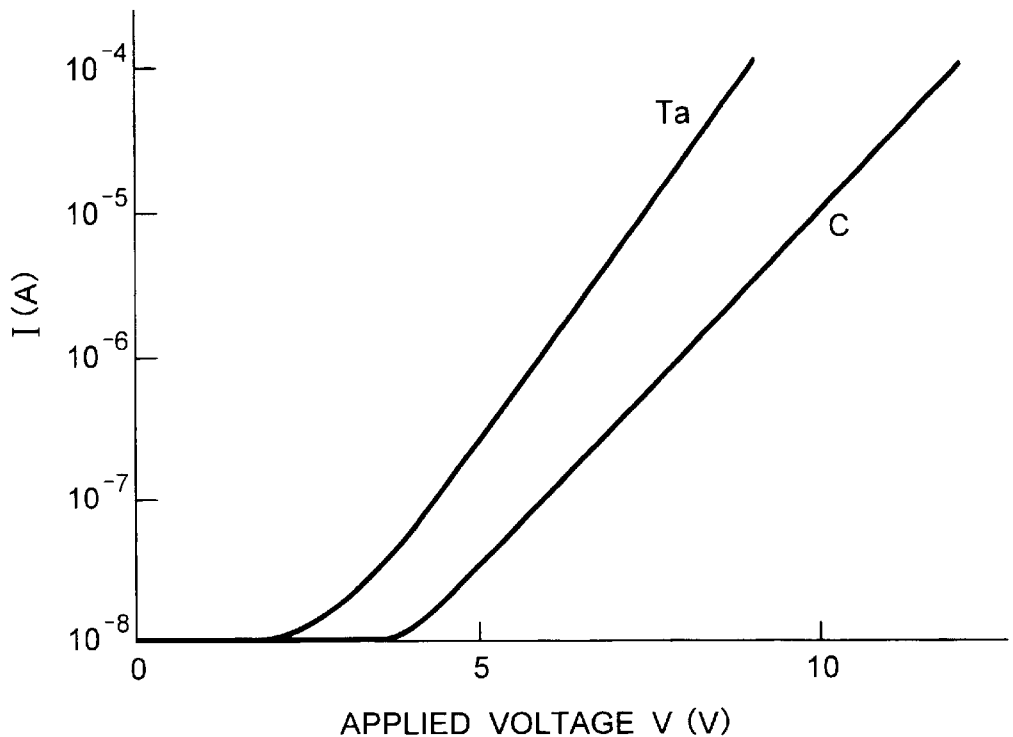
FIG. 14 graphically shows a relation between a field emission current I and voltage V applied to a probe, experienced using two probes made of Ta (tantalum) and C (carbon), respectively, in a depressurized atmosphere of $10 \times 10^{-4}$ Pa.

FIG. 14 graphically shows a relation between a field emission current I and voltage V applied to a probe, experienced using two probes made of Ta (tantalum) and C (carbon), respectively, in a depressurized atmosphere of $10 \times 10^{-4}$ Pa. Since the distance between the top end of the probe and sample surface is fixed to 10 nm as having previously been described, the voltage of 1 V is equivalent to a field intensity of $10^6$ V/cm. The behavior of the emission current against the field intensity was such that the Ta probe having a shape reflecting the Fowler-Nordheim expression and having a low work function provided a larger emission current than the C probe having a higher work function. Namely, the experiment results provide reasonable data. The Inventors conducted a similar experiment on a probe made of Si. The emission current of this probe was an intermediate one between those of the Ta and C probes, which also reflects its work function.

Next, an applied voltage was set so that the emission current would be constant at some voltages in a range of $1 \times 10^{-5}$ to $1 \times 10^{-4}$ A, to examine the time change of the emission current. In this experiment, a variety of atmospheres was selectively used in the container in which the probe was placed, including a vacuum atmosphere of $10^{-4}$ Pa, a high purity rare gas atmosphere charged at 1 atm. after evacuation of the container (atmosphere 1), a high purity dry nitrogen atmosphere charged at 1 atm. after evacuation of the container (atmosphere 2) and an atmosphere resulted from ordinary atmosphere (at a relative humidity of 25% RH or so) introduced after evacuation and whose pressure had been adjusted and set by the vacuum pump to several pressures (atmosphere 3), and a high purity oxygen atmosphere introduced at several set pressures after evacuation of the container to examine the influence of oxygen (atmosphere 4). When the atmospheres 3 and 4 are used in the container, the experiment was done while checking the absolute amount of oxygen using a quadrapole mass spectrometer.

Figure 15:
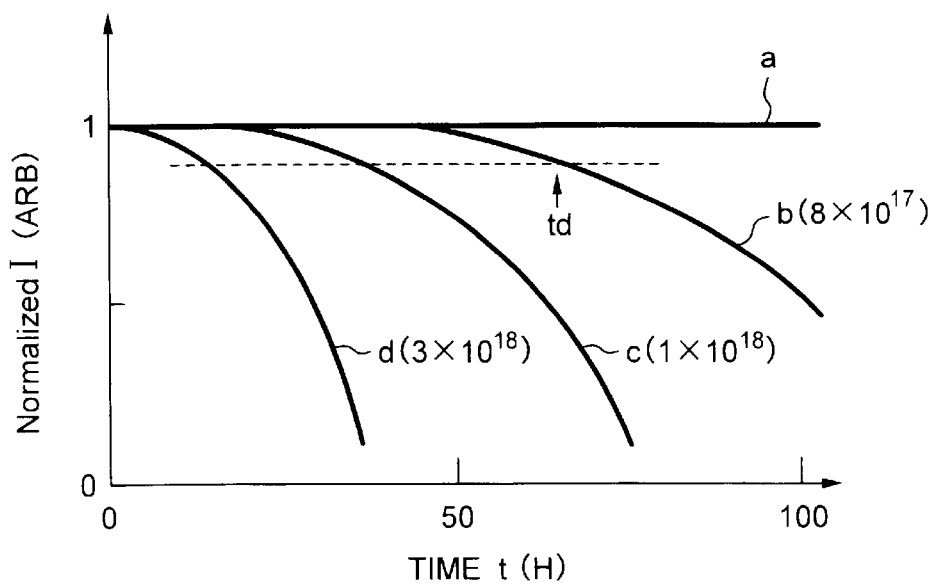
FIG. 15 graphically shows the result of an experiment effected using the probe made of C with the emission current set to $5 \times 10^{-5}$ A.

FIG. 15 graphically shows an example of the result of the experiment effected using the probe made of C with the emission current set to $5 \times 10^{-5}$ A. In FIG. 15, the reference a indicates a curve of a time change of the emission current which was when the oxygen amount in the atmospheres 1, 2, 3 and 4 is $5 \times 10^{17}$ (mols/cm$^3$) or less, and references b, c and d indicate curves of a time change of the emission current which was when the oxygen amounts are shown in FIG. 15. The radius of curvature of the top end portion of the C probe was about 5 nm and a field is emitted from the nearly semi-spherical portion of the top end portion. In this case, the emission current density J was $3.18 \times 10^5$ (A/cm$^2$). FIG. 14 shows the deterioration of the electron emitter, having resulted in a short period of time. The experiment result proved that also in case the C-made electron emitter excellent in oxidation resistance is used, the deterioration will be remarkable when the oxygen molecule density exceeds $5 \times 10^{17}$ (mols/cm$^3$).

When the above-mentioned value of J is substituted for J in the relational expression of X and J, defined in the present invention, the right side of the expression will be $3.98 \times 10^{17}$, which will show that the value of $5 \times 10^{17}$ (mols/cm$^3$) acquired in the experiment is rather higher than the upper limit of X in the relational expression. This fact shows the nature of the carbon (C) excellent in oxidation resistance. The results of the experiments conducted using a variety of electron emitters and various emission current densities, which will be described below, reveals that in such electron emitters and electron emitter made of Si and on which an oxidation zone will easily be formed, the relational expression defined in the present invention should be met in order to assure a longer service life of the electron emission source.

Taking as an index the time (td), in the characteristic curve shown in FIG. 15, in which the emission current is deteriorated to 90% of its initial value (indicated with a dash line in FIG. 15), various electron emitters and emission currents were examined about the relation between the oxygen amount in the atmosphere and the time (td).

Figure 16:
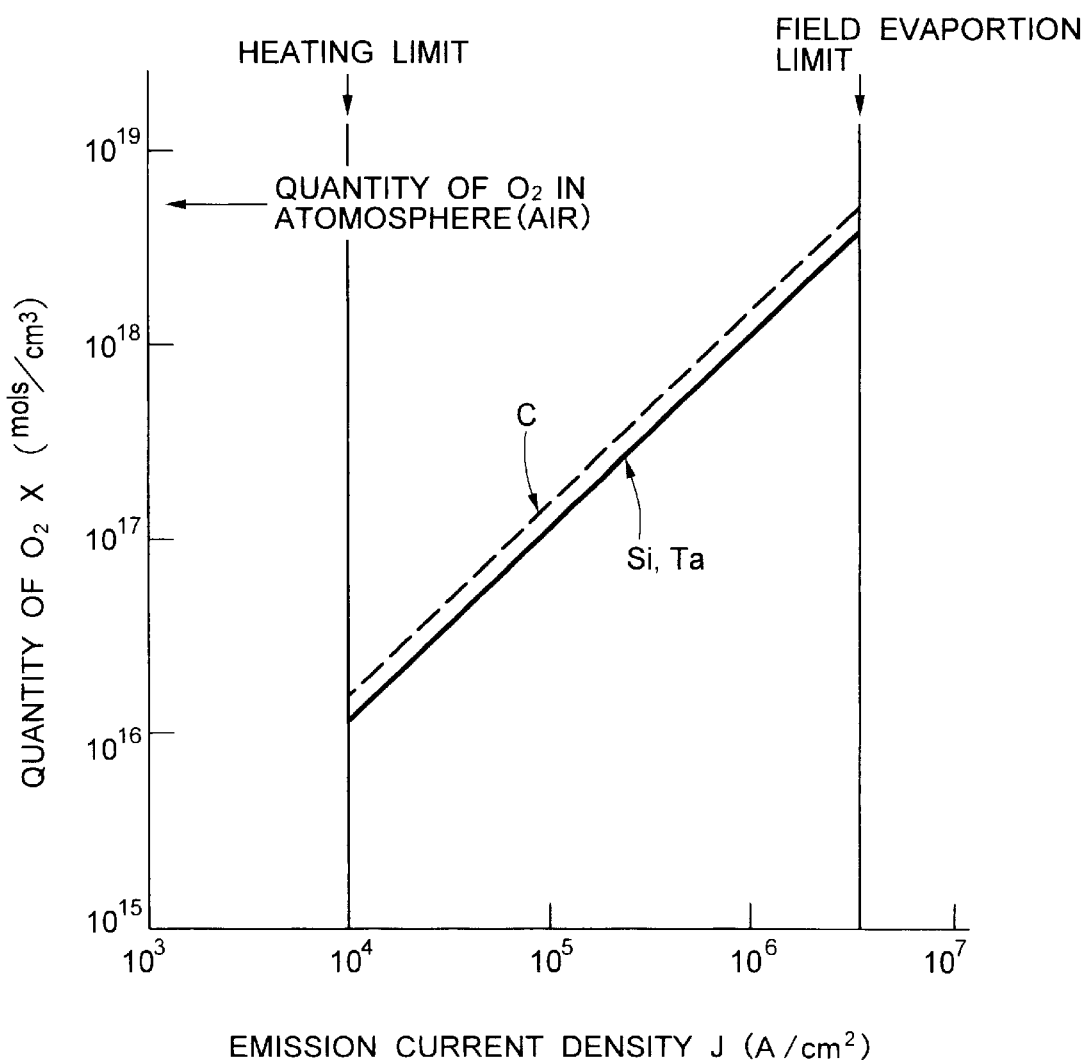
FIG. 16 graphically shows a relation between an amount of oxygen in the atmosphere and a time (td) as an index, experienced with different emitters and emission current densities in the experiment whose result is shown in FIG. 15, the time (td) being a time for which the emission current had deteriorated down to 90% (indicated with a broken line) of its initial value.

FIG. 16 graphically shows the result of this experiment. In the experiment, electron emission was continuously made for 10 hours and then paused for 12 hours. This was repeated until the electron emission had been made for a total integrated time of 300 hours. This result is also shown in FIG. 15. A line at which the time td exceeds 300 hours is shown in FIG. 16. The solid lines with references Si and Ta, respectively, in FIG. 16 are lines at which the time td is kept at 300 hours when the electron emitters made of Si and Ta, respectively, are used. In the area under these lines, the time td is over 300 hours. In FIG. 15, the broken line indicated with the reference C indicates the result of the experiment on the electron emitter made of C.

The line indicated with a legend "Field evaporation limit" shown at the right of FIG. 16 indicates that when the emission current density is larger (corresponding to an emission current from a semi-sphere of 10 nm in diameter being $5 \times 10^{-4}$ A), the intensity of applied field will be $10^8$ V/cm or so, meaning that the field evaporation will so be remarkable that it will be difficult to use the electron emitters in consideration as an electron emitter. The lower limit of J indicates a lower limit "at which the medium can yet be heated to a significant temperature". When the high purity oxygen in the atmosphere 4 was introduced in the container, the electron emitter seemed to have a longer service life than the line shown in FIG. 16 as compared with the service life which will be when an atmosphere containing moisture is introduced into the atmosphere 3. This is because the atmosphere 3 contains moisture in addition to oxygen. It is considered that the oxygen and its dissociated species as well as the moisture (water) and its dissociated species promote the deterioration of the emission current.

The aforementioned series of experiments revealed how the atmosphere around the electron emitter of the thermally-assisted magnetic recording device according to the present invention should be. Based on this findings, the Invention of the present invention invented a thermally-assisted magnetic recording device which will be described below.

The construction of thermally-assisted magnetic recording head used in this embodiment of thermally-assisted magnetic recording device is similar to that of the first to fifth embodiments. Also, the medium having previously been described concerning the first embodiment may be used as the thermally-assisted magnetic recording medium of a high Ku (Hc0) value with these heads.

Figure 17A:
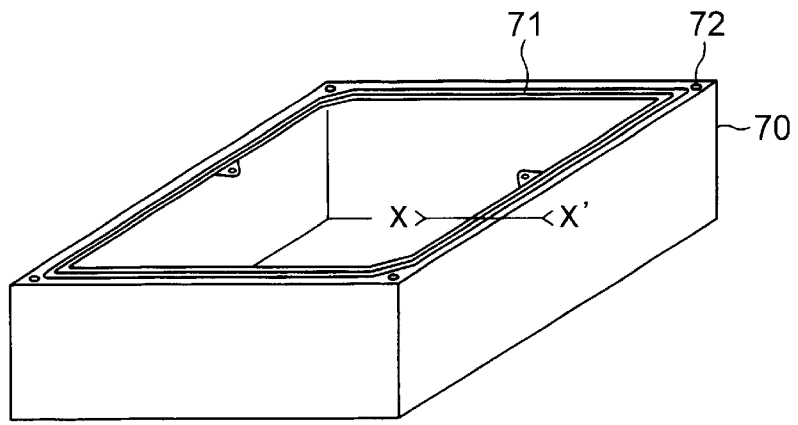
Figure 17B:
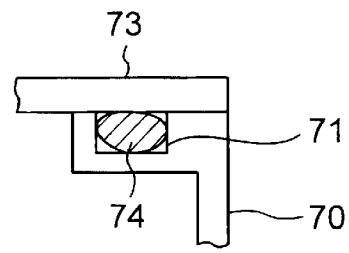

FIGS. 17A and 17B are conceptual views of a part of the seventh embodiment of the magnetic recording device according to the present invention, showing especially a means for adjusting the atmosphere inside an enclosure of the magnetic recording device, in which FIG. 17A is a perspective view of the enclosure and FIG. 17B is a sectional view, enlarged in scale, taken along the line X–X' in FIG. 17A. A medium having the above-mentioned magnetic characteristic was placed along with the thermally-assisted magnetic head according to the present invention in this enclosure, and the internal atmosphere was adjusted, thus experimentally preparing the thermally-assisted magnetic recording device according to the present invention.

In FIGS. 17A and 17B, reference numeral 70 indicates an enclosure, 71 a sealing groove, 72 a screw hole, 73 a lid and 74 an O-ring. The major part (not shown in FIGS. 17A and 17B) of the magnetic recording device which will further be described later is incorporated in the enclosure 70. The thickness of plates used to form the enclosure is appropriately set depending upon an internal pressure of the enclosure after sealed. The plate thickness is set larger for a lower internal pressure to prevent the enclosure from being deformed by the external atmospheric pressure. To prevent such deformation due to the external atmospheric pressure, a honeycomb-like or rectangular cell-like reinforcing member may be attached to the plate inner wall of the enclosure or the top and bottom and right and left walls of the enclosure may be connected with some studs, instead of simply using thick plates. When an inert gas at atmospheric pressure is charged in the enclosure, it is not necessary to used thick plates or reinforcing members.

The sealing groove 71 is formed in the open end of the enclosure 70 to receive the O-ring 74 therein. When the lid 73 is attached to the enclosure 70, the O-ring 74 will provide an effective sealing to isolate the internal atmosphere from the outer atmosphere. The portion where the sealing groove is formed depends upon the design of the enclosure. In case the enclosure formed from a rectangular parallelepiped whose five sides are formed integrally with each other is fixed to a chassis (shown in FIG. 18) after the components of the magnetic recording device are installed to the chassis, the sealing groove may be provided at only one side of the enclosure. The O-ring 74 may be a deformable ring such as rectangular ring and other ring, made of a rubber normally used for an airtight sealing. It is fitted in the sealing groove 71. The lid 73 (or chassis) is placed on the O-ring 74 and screwed to the enclosure 70 with screws driven into the screw holes 72, to complete the airtight sealing of the enclosure 70. Since it is only required to keep an oxygen density defined in the present invention for a predetermined length of time, the airtightness may not be so high as a one required for the vacuum devices. More specifically, in case the enclosure inside is not depressurized but an inert gas atmosphere is maintained at atmospheric pressure inside the enclosure, even a relatively simple sealing can maintain the oxygen amount defined in the present invention for the predetermined length of time.

Figure 18:
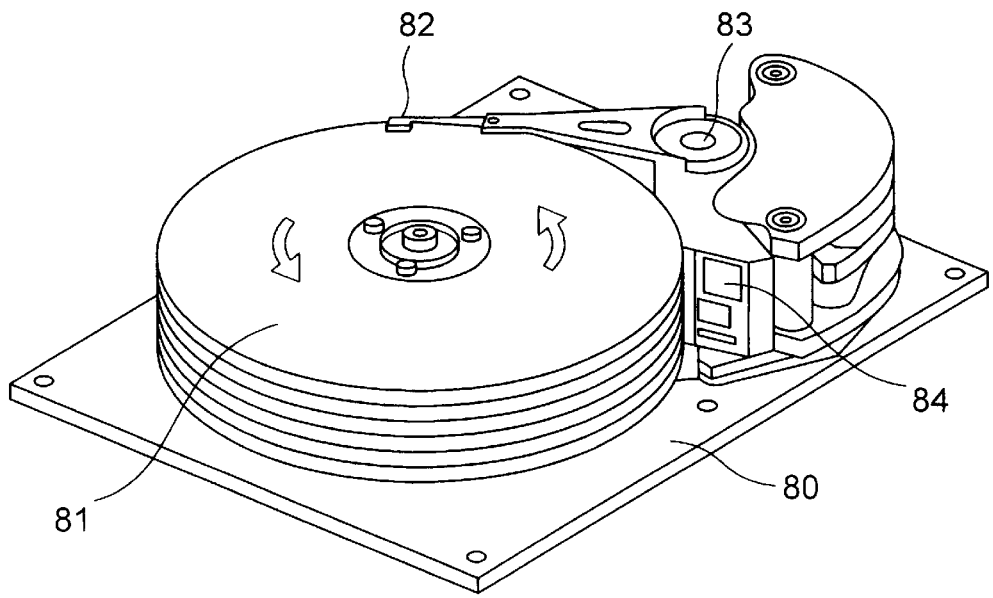
FIG. 18 schematically shows a magnetic recording device disposed in the enclosure shown in FIGS. 17A and 17B, showing the major components thereof by way of example.

FIG. 18 schematically shows a magnetic recording device disposed in the enclosure shown in FIGS. 17A and 17B, showing an embodiment of the major components thereof by way of example. In FIG. 18, reference numeral 80 indicates a chassis, 81 a magnetic recording medium involved in the present invention, 82 a thermally-assisted magnetic recording head involved in the present invention, 83 a high precision, high speed positioning system and 84 a signal processing system. The inner side of the chassis 80 shown in FIG. 18 is nearly mirror-finished to provide a sealing surface. It is closed to the O-ring 74 shown in FIGS. 17A and 17B to isolate the enclosure inside from the outside atmosphere.

Alternatively, to shut off any oxidizing atmosphere, an oxygen gettering substance may be provided on the electron emitter and enclosure inner wall, or a deoxidizer may be sealed in the enclosure 70. The gettering substances includes titanium or its alloy, for example.

The magnetic recording device shown in FIGS. 17 and 18 can be produced following the procedure given below, for example:

First in a normal atmosphere (in a clean room used at an ordinary manufacturing site), the spindle motor, magnetic recording medium 81 and a suspension arm having mounted thereon the magnetic head 82, and a controller of the signal processing system are sequentially installed to the chassis 80. The head has formed in the thin film element thereof the electron beam source or emitter according to the present invention, and the controller has additionally provided therein an electron beam controller (such as a voltage source, etc.).

Next, the chassis having various members installed thereon and enclosure are inserted into a glove box or sealed container charged with an inert gas, the oxygen density in the glove box or sealed container is monitored, and the oxygen density is lowered to less than a predetermined level by circulation of the inert gas. After confirming that the oxygen density has been lowered to a sufficient level, a robot or human worker (in case of the glove box) assembles the enclosure and chassis together by screwing. The assembling may be done by simple welding, not the screwing. Alternatively, a vent may be formed in the enclosure or chassis, the enclosure and chassis are assembled together in normal atmosphere, and then the atmosphere inside the enclosure may be replaced with inert gas, or the enclosure may be evacuated, through the vent. In this case, after it is checked at the exhaust system that the oxygen density inside the enclosure has been, changed to the predetermined level, a portion around the vent is sealed. For this sealing, the vent and exhaust system should be connected to each other by a pipe formed from a spreadable metal, and after the oxygen density has been changed to the predetermined level, the pipe should be crimped, for example.

The thermally-assisted magnetic recording device thus constructed according to the present invention was tested on the stability of the electron emitter involved in the present invention. In the test, the medium (ground potential) was rotated until the head comes to a predetermined track, then a voltage of −10 V was applied to the electron emitter, and a high frequency current was supplied to the recording magnetic pole to write a signal of 300 kfci for example. Immediately after that, the written signal was read by the GMR read element. After write to several tens of tracks, the head was sought back to the initial track, and a signal of 200 kfci for example was overwritten to the track. Just after that, the written signal was read by the GMR read element. Write is made to several tracks, and the head was sought back to the initial track, and a signal of 300 kfci was overwritten to the track.

The above operations were continuously done for a time length of 1000 hours. As the result, no change was found in the read signal quality, which proved the effect of the present invention. Note that it had previously been confirmed that just supplying the same high frequency current as in the above to the recording magnetic pole with no voltage applied to the electron emitter will not provide any recording and heating of the medium with electron beam enables recording. No change in the read signal quality means that there is no change in the emission current of the electron emitter.

(Eighth Embodiment)

The present invention will further be described herebelow concerning the eighth embodiment thereof.

This embodiment provides a magnetic head and thermally-assisted magnetic recording device, using an electron emitter instead of a magnetic yoke or pole in a magnetic recording head. This construction of the magnetic head and thermally-assisted magnetic recording device will enable a further higher recording density.

Figure 19:
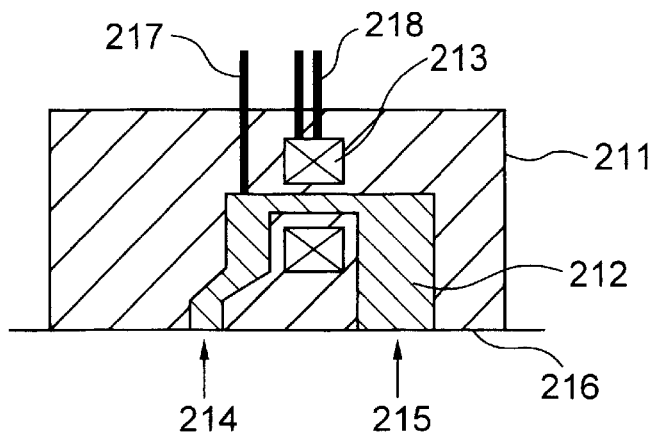
FIG. 19 is a conceptual sectional view of the major components of a first magnetic recording head according to the eighth embodiment of the present invention.

FIG. 19 is a conceptual sectional view of the major components of a first magnetic recording head according to the eighth embodiment of the present invention. The recording head shown in FIG. 19 is of a so-called single pole type. In FIG. 19, reference numeral 211 indicates a slider base, 212 a recording magnetic pole assembly, 213 a recording coil, 214 a main magnetic pole, 215 a return magnetic pole, 216 a position of medium-facing surface (air bearing surface: ABS), 217 a lead connected to the magnetic pole assembly, and 218 a lead connected to the recording coil 213. When a voltage is applied to the lead 217, it is possible to emit electrons from the top ends of the main magnetic pole 214 and return magnetic pole 215. The lead 218 connected to the recording coil 214 is normally applied with an electric signal of a desired recording frequency, and a magnetic field modulated with the electric signal will be applied to a magnetic recording medium (not shown) from the magnetic poles. The lead 217 may have a connection pad for itself or in common with other signal line and the like.

In this embodiment, the magnetic poles serve also as a heating electron emitter, so the heat source and magnetic flux emitter can be placed extremely near to each other. As a result, an ultrahigh thermally-assisted magnetic recording is enabled.

The requirements the magnetic recording head according to the present invention has to meet are the same as those for the conventional magnetic recording head except for the lead 217 provided to apply a voltage to the magnetic pole assembly 212 (or magnetic yoke). Supplemental explanation of some important components of the magnetic head according to the present invention will be given below:

Lead 217 and its pad:

The lead 217 may be a one formed by patterning a metal film such as Cu (copper) similarly to the lead 218 provided to supply a current to the magnetic field generating coil (recording coil) 213 for example.

The lead 217 can be connected to the magnetic pole assembly 212 in the same manner as the lead 218 provided to supply a current to the magnetic field generating coil (recording coil) 213. These leads can be formed in the same process as the case may be, except for replacement of the etching mask. Therefore, the magnetic head can be produced at a cost very lower than the conventional magnetic head in which a laser light is used to head the medium.

A pad (not shown) may be provided to apply a voltage the lead 217. This pad can simply be formed in the same process as that for the pad used in the conventional magnetic recording head.

Top end Face of the Main Magnetic Pole 214:

In a high density HDD, since the size of the main magnetic pole 214 (or magnetic yoke) in the ABS 216 is sufficiently small in size, electron emission will easily take place. However, to provide an easier, well-controlled electron emission, it has been proposed to "roughen" the air bearing surface opposite to the medium of the main magnetic pole 214 (or magnetic yoke). A rough surface has many fine projections and electric fields concentrate to the projections, so that field emission will preferentially take place at the projections. On the contrary, on a smooth surface, field emission point will move at the time passes, and thus cannot be well controlled. However, this will not be a great problem when the system requirement is such that the medium should only be heated within the range of the size of the main magnetic pole 214 (or magnetic yoke) in the ABS 216.

The surface "roughness" should be such that a mean roughness Ra being a general index obtainable through evaluation using AFM (atomic force microscope) is over 0.5 nm and under 10 nm. A mean roughness Ra of 0.5 nm or less will cause the field emission point to move easily, while a mean roughness of 10 nm or more will lead to a longer time for working the pole.

Recessing the Return Magnetic Pole 215:

Generally, in the magnetic pole assembly or magnetic yoke of the magnetic recording head, there is provided the return magnetic pole 215 (trailing-side yoke) to which the magnetic flux will come back through the magnetic recording medium. In the magnetic head according to the present invention, it is essential to head a portion to which recording is to be made. So, field emission should not desirably take place mainly on the return magnetic pole 215 (or trailing-side yoke).

To avoid the above, it is effective to recess the return magnetic pole 215 (or trailing-side yoke) somehow from the medium-facing surface (ABS) 216 in relation to the main magnetic pole 214 (or leading-side yoke). The recessing distance should desirably be over 0.5 nm and under 1000 nm. A recessing distance of 0.5 nm or less is not suitable since it will cause the magnetic flux not to be usable with a high efficiency, while a distance of 1000 nm or more will lead to a longer time for producing the return magnetic pole 215.

Figure 20:
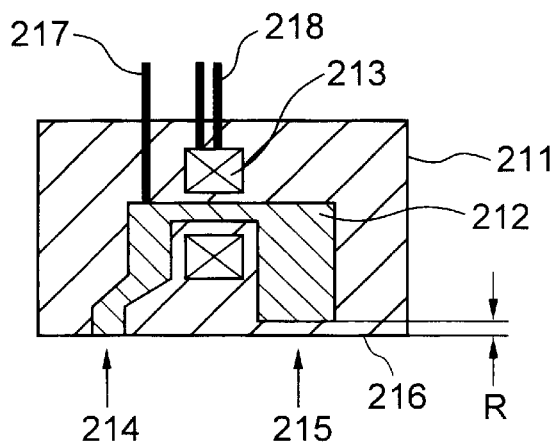
FIG. 20 is also a conceptual sectional view showing an example construction in which the return magnetic pole of a single-pole head is recessed from the medium-facing surface (air bearing surface)

FIG. 20 is also a conceptual sectional view showing an example construction in which the return magnetic pole 215 of a single-pole head is recessed from the ABS 216. In this example, the return magnetic pole 215 is recessed over a distance R shown in FIG. 20. This recessing can be made by patterning during production of the head, by carving by working with FIB (focused ion beam) after forming the head or otherwise.

Surface Roughness of the Main and Return Magnetic Poles:

For otherwise inhibiting the field emission from the return magnetic pole 215 (trailing-side yoke), it is known to roughen the surface of the main magnetic pole 214 (or leading-side yoke) more than that of the return magnetic pole 215. As in the above, electric field will concentrate more to rougher surface and field emission will take place more easily on the rougher surface. Thus, discharge from the return magnetic pole 215 whose surface is not so much rough will not easily take place. Such a surface is roughened by working with focused ion beam (FIB), optimizing the etching conditions during patterning, or using an etching pattern itself. Any of these techniques should appropriately be selected depending on the system requirement and cost.

Projection of the Main Magnetic Pole 214:

For otherwise inhibiting the field emission from the return magnetic pole 215, it is also known to form at least one projection on the surface of the main magnetic pole 214 (or leading-side yoke). Electric field will concentrate to the projection, so that other than the magnetic pole having the projection formed thereon will not emit any electric field.

Figure 21:
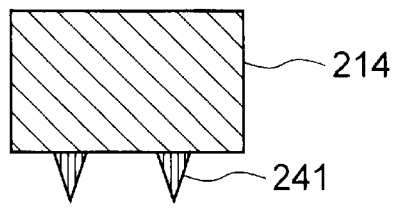
FIG. 21 is a conceptual sectional view, enlarged in scale, of a portion, near the air bearing surface, of the main magnetic pole or leading-side magnetic pole of the recording head according to the eighth embodiment of the present invention.

FIG. 21 is a conceptual sectional view, enlarged in scale, of a portion, near the medium-facing surface (air bearing surface: ABS), of the main magnetic pole or leading-side magnetic pole of the recording head according to the eighth embodiment of the present invention. In FIG. 21, reference numeral 214 denotes a magnetic pole and 241 indicates a projection. FIG. 21 shows two projections 241, but the number of the projections is not limited to two as in this case. One projection or more than three projections may be provided. Also the projection 241 may be formed to be any of circular cone, square cone, triangular cone or other which would be able to emit electrons efficiently. An appropriate shape of the projection can be selected depending upon a head producing process. Also, in case two or more projections are provided, they may appropriately be disposed.

It should be selected depending upon a system requirement and cost to provide a difference in surface roughness or to provide a projection or projections. There may be provided a single projection or more than one projection. A plurality of projections will assure a better-controlled discharge while a single projection will contribute to a lower cost. Further, the projection may be formed by working with focused ion beam (FIB), optimizing the etching conditions during patterning, or using an etching pattern itself. Any of these techniques should appropriately be selected depending on the system requirement and cost.

Construction of Magnetic Pole:

The magnetic head according to the eighth embodiment of the present invention is applicable to various conventional types such as ring type used in an in-plane head, single-pole type used for vertical magnetic recording, etc. as will further be described below. Any of these types should be selected which is most appropriate for the system requirement and cost.

Figure 22:
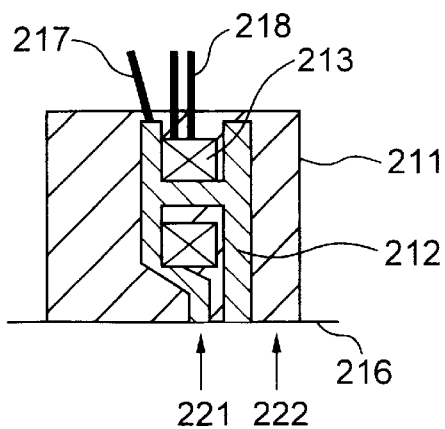
FIG. 22 is also a conceptual sectional view of the essential portion of the ring type magnetic recording head according to the eighth embodiment of the present invention.

FIG. 22 is also a conceptual sectional view of the essential portion of the ring type magnetic recording head according to the eighth embodiment of the present invention. In FIG. 22, reference numeral 211 denotes a slider base, 212 a recording magnetic pole assembly, 213 a recording coil, 221 a leading-side magnetic pole, and 222 a trailing-side magnetic pole. In FIG. 22, other elements having the same functions as the elements in FIG. 19 will be labeled with common reference numerals to those for the elements in FIG. 19, and will not further be described.

In this variant, direction of electrons from the tip of the leading-side magnetic pole 221 toward the magnetic recording medium enables a magnetic write to the medium being heated with the electrons. Since the heat source and magnetic flux emitter are located very near to each other, an ultra-high density of thermally-assisted magnetic recording can be assured.

Also, in case of a ring type head, the trailing-side magnetic pole 222 can be handled similarly to the return magnetic pole 215 in FIG. 19.

Protective Layer:

The magnetic head according to the eighth embodiment should preferably be coated with a C (carbon), B (boron) or hard oxide or nitride or a composite material containing these substances to protect the air bearing surface (ABS) 216 since the durability is improved. When the magnetic head is coated with C, the service life of he electron emitter used in the atmosphere is advantageously improved. More particularly, 3 to 10 nm of carbon (C) should desirably be heaped as a protective layer on the ABS 216 including the magnetic pole.

Recorder:

The thermally-assisted magnetic recording device according to the present invention is similar to the conventional magnetic recording device except for the aforementioned magnetic recording head and a means provided for applying a voltage to the head.

Figure 23:
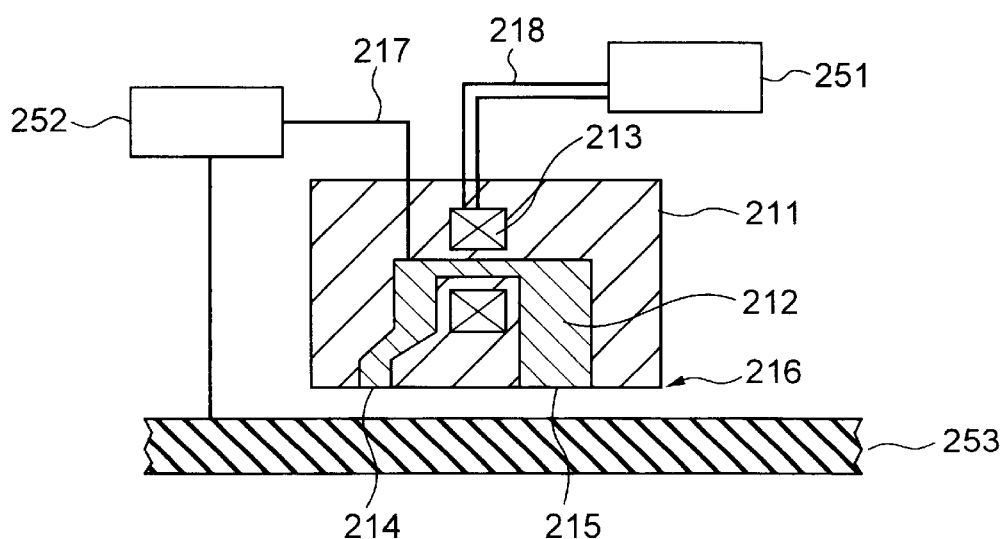
FIG. 23 is a conceptual sectional view of the essential potion of the magnetic recording device according to the present invention.

FIG. 23 is a conceptual sectional view of the essential potion of the magnetic recording device according to the eighth embodiment of the present invention. Therefore, the elements similar to those in the conventional magnetic recording device are not shown in FIG. 23. In FIG. 23, reference numeral 251 indicates a write controller to supply the recording coil 213 with a current corresponding to a recording signal, 252 a voltage applicator to apply a voltage for emission of electrons to the magnetic pole 214, and 253 a magnetic recording medium.

The voltage applicator 252 is connected to the magnetic recording medium 253 and magnetic pole 214. Since it is necessary to direct electrons from he magnetic pole towards the medium, the magnetic pole 214 (magnetic yoke) has to be applied with a voltage which is negative in relation to the potential on the medium.

The voltage applicator 252 should further be provided with a monitor to monitor the potential difference between the magnetic pole 214 and magnetic recording medium 253 to feed back the potential difference so that a constant or desired voltage will always be applied to the magnetic pole 214. This is preferable since it is possible to stably write to the medium.

The voltage may be applied either continuously or in a pulsed manner. When the voltage is applied continuously, the temperature below the recording magnetic pole 214 (or magnetic yoke) is always constant, which enables a stable thermally-assisted magnetic recording. Further, advantageously, the electron emission driver circuit can be simplified and high frequency-caused loss and induced heating will not easily take place.

On the other hand, when the voltage is applied in the pulsed manner, the heat will be lost more early, and so cross-erasing will not easily take place. Also, this pulsed application of the voltage will minimize the temperature spreading so that recorded information in adjacent tracks cannot easily be erased. Moreover, when the pulse width is sufficiently small, the heating temperature will be constant irrespectively of the linear velocity, thus enabling a stable recording without any special compensation. Further, advantageously, the pulse interval and intensity can be modulated as necessary to arbitrarily control the medium temperature and temperature spreading.

Note that the temperature elevation of the medium delays somehow in relation to the time of electron beam emission and a higher density of recording can be attained if the delay is taken in consideration. For this purpose, it is an approach to provide at the trailing side of the main magnetic pole 214 the projection 241 having previously been described with reference to FIG. 21. This is simple but cannot adjust so much the distance between the heated portion and magnetically recording portion (magnetic transition). When such an adjustment is required, it will be effective to provide a delay between the electron emission and recording, for example.

Figure 24:
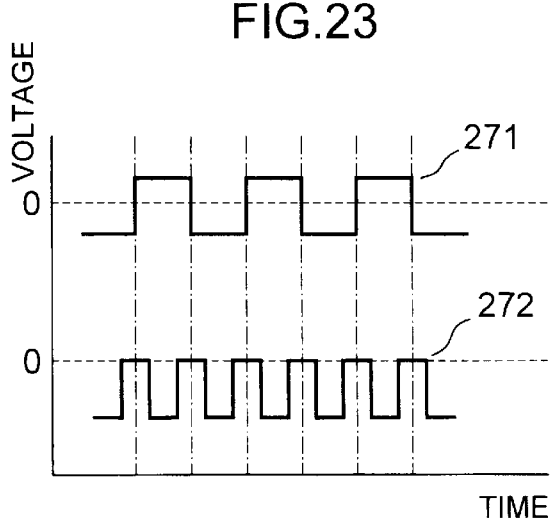
FIG. 24 is a timing chart showing the operations of the magnetic recording device according to the eighth embodiment of the present invention.

FIG. 24 is a timing chart showing the operations of the magnetic recording device according to the eighth embodiment of the present invention to emit electrons at one time while recording at any other time. A pattern indicated with reference numeral 271 in FIG. 24 represents a recording signal applied to the recording coil 213. It takes a simple form of 010101 . . . for the convenience of illustration and explanation. This signal is applied to the recording coil while a signal indicated with reference numeral 272 is applied to the electron emitter. In FIG. 24, the lower side of the signal is negative, and only when the signal becomes negative, electrons will be directed towards the recording medium. In this example, the timing phase is shown reversed. However, the phase difference should appropriately be set taking in consideration a heated state of the medium and a time lag between a signal at the recording magnetic pole and developed magnetic field.

Next, the magnetic head according to this eighth embodiment of the present invention will further be described concerning examples thereof:

FIRST EXAMPLE

First as the first example of the eighth embodiment, a magnetic recording head constructed as shown in FIG. 19 was produced. It was set along with the magnetic recording medium in the spin-stand type magnetic write and read evaluation apparatus. Separate from the magnetic recording head, a read head using a GMR (giant-magnetoresistance effect) element was also set in the spin stand. The medium was made by forming a soft-magnetic base layer of NiFe to a thickness of 100 nm on a glass substrate of 2.5 inches in diameter, then a magnetic recording layer of CoPt and $SiO_2$ to a thickness of 20 nm on the soft-magnetic base layer, and further a protective layer of C (carbon) to a thickness of 3 nm on the magnetic recording layer, all by sputtering, and then coating a lubricant on the protective layer and removing the surface irregularities by tape burnishing. The magnetic recording layer has a structure having a vertical magnetic anisotropy and in which magnetic particles of CoPt having a diameter of about 7 nm are dispersed in the amorphous base material of $SiO_2$. The content of CoPt in the SoPt-$SiO_2$ layer was 60% by volume. A torque meter and VSM were used to examine the thermal characteristic at different temperatures included in a range of liquid nitrogen temperature to 500° C. The typical magnetic characteristics measured at the room temperature were: Ku: $4.5 \times 10^6$ erg/cc, Hc: 5 kOe, and Ms: 400 emu/cc. The particles having the mean size was found to have a KuV/kT value of about 125 at the room temperature (300 K). Thus, the medium used in this embodiment can be said to show an ambient thermal agitation at a temperature near the room temperature. The magnetic characteristic varied as a function of the temperature and was found to be monotonously lower in a direction from a low temperature to a high temperature. Taking a thermal fluctuation in consideration, the temperature dependence of the coercive force Hc0 under a magnetic transition of about 10 ns was estimated. As a result, it was proved that the coercive force Hc0 at a temperature near the room temperature was 5.2 kOe and at a temperature of 250° C. equivalent to the assumed recording temperature for a thermally-assisted magnetic recording effected by the magnetic recording device according to the present invention, the coercive force Hc0 fell to 2 kOe. When the coercive force Hc0 at the high temperature was extrapolated, the Curie point was estimated to be several tens of ° C. higher than 500° C.

The medium having the above magnetic characteristic was moved at a rate of 10 m/s in relation to the head, and the write and read were tested with a relatively low linear density equivalent to a solitary wave output of 100 kfci to examine the read output voltage. The head was moved in contact with the slider, the spacing was controlled in a range of 8 to 10 nm, that is, a range from a sum (8 nm) of the head protective layer thickness and medium protective layer thickness to a sum (10 nm) of the lubricant layer thickness and the sum of the layer thickness. As variables of write and read, the emission electron current was varied by changing voltage applied to the electron emitter and the recording field intensity was varied by changing the current supplied to the recording coil. The medium was at the ground potential.

Figure 25:
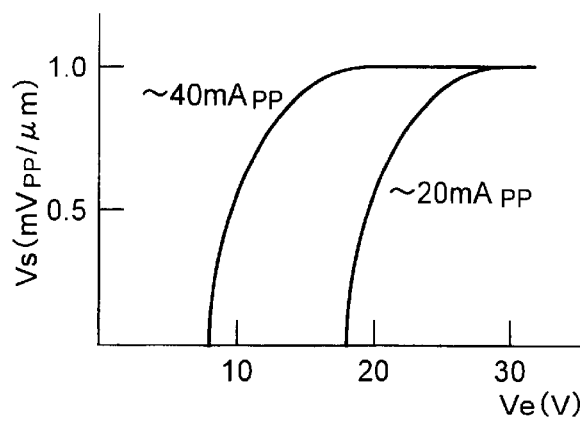
FIG. 25 graphically shows the result of evaluation.

Referring now to FIG. 25, there is graphically illustrated the result of the evaluation. FIG. 25 shows a relation between a voltage Ve applied to the electron emitter and GMR read output voltage Vs per 1 $\mu$m of track width in which a current Iw supplied to the recording coil is taken as parameter. In FIG. 25, only two examples, Iw of 20 mA and Iw of 40 mA, are shown. However, when the applied voltage Ve was lower than 7.5 V, no read output could be provided with the supplied current Iw increased to a largest possible one. On the contrary, when a voltage Ve applied to the electron emitter was higher than 15 V with the current Iw supplied to the recording coil being 40 mA which is a practical value for use in the magnetic disc drive, and more preferably when the applied voltage Ve was higher than about 25 V with the supplied current Iw being 20 mA, a high saturation read output could be provided, which proves that the present invention is highly advantageous.

More specifically, when the applied voltage Ve was less than 7.5 V, the medium was heated insufficiently or not heated by the emitted electrons, so since the coercive force Hc0 of the medium was higher than the intensity of a magnetic field developed by the recording magnetic pole, no recording could be made. As the applied voltage Ve exceeds 10 V, the medium is more heated with the emitted electrons and thus the medium temperature is elevated, the coercive force Hc0 will start gradually falling, a recording is enabled and the read signal will start increasing. When the supplied current Iw is yet small, the intensity of the magnetic field developed by the magnetic pole is low and recording will be enabled at an applied voltage Ve of about 20 V when the medium temperature is higher.

Note that in the basic example of the recording head, the low recording frequency was selected in order to examine the behavior of the signal output definitely but of course this is also true for a recording at a higher linear density.

SECOND EXAMPLE

Next, the protective layer of the magnetic head according to the eighth embodiment of the present invention was examined about its effect. For this examination, there were prepared a magnetic head constructed similarly to the first example and a comparative magnetic head having no protective C (carbon) layer provided therein. These magnetic heads were tested on write and read similarly to the first example. As the result proved, there was found no important difference in the write characteristic between the heads. However, the comparative head crushed in about one hour after start of the experiment and no further experiment could be made.

The air bearing surface (ABS) of the comparative head was elaborately observed using SEM (scanning electron microscope). Many deposits were found near the magnetic pole and the head structure was found partially broken. It is considered that this was caused by the absence of the protection by the C layer. Note however that the comparative head can be used in a magnetic recording device with a levitation of about 30 nm or when a clean atmosphere is kept in the drive and when the medium is smooth. That is, the protective C layer should be provided depending upon a system requirement.

THIRD EXAMPLE

As a third example of the eighth embodiment of the present invention, a magnetic head having the return magnetic pole provided recessed as shown in FIG. 20, and subjected to a similar write and read experiment to that for the first example. This magnetic head was prepared by forming it similarly to the first example and then working it by the FIB (focused ion beam). The recessed distance R of the return magnetic pole 215 was 50 nm. Owing to the recessing, no discharge took place from the return magnetic pole 215 and a stable discharge could take place. As the result, the medium noise was reduced by about 3 dB as compared with the characteristic shown in FIG. 25. Namely, the recessing is evidently effective for a ring type magnetic head as well. Since the cost for the FIB working will add to the total cost of the head, however, it should appropriately be selected depending upon the system requirement whether or not the return magnetic pole is be recessed. Otherwise, the magnetic pole 215 may initially be recessed by patterning, not by the FIB working.

FOURTH EXAMPLE

As a fourth example of the eighth embodiment, a magnetic head was experimentally prepared which had fine irregularities formed on the top end face of the magnetic face. More specifically, the similar process for the aforementioned third example was adopted to reduce the power of ion beam during the FIB working and directing ion beam intermittently during scan, thereby forming the fine irregularities on the air bearing surfaces (ABS) of the main magnetic pole 214 and return magnetic pole 215, respectively.

Figure 26:
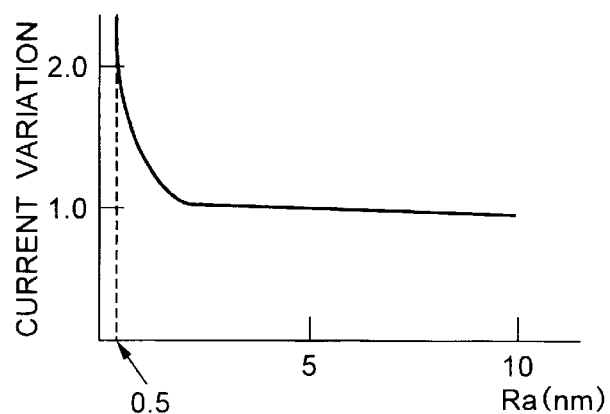
FIG. 26 graphically shows the emission current characteristic.

The magnetic head thus formed was set on the similar write and read tester (spin-stand) to that for the first example to examine the variation of the discharge current during rotation. FIG. 26 graphically shows the emission current characteristic. In FIG. 26, the horizontal axis shows a mean surface roughness Ra (nm) being a general index while the vertical axis shows an integration of the discharge current, as an index of the current variation (normalized with a value which would be when Ra=5 nm). As seen from FIG. 26, when Ra<0.5 nm, the discharge suddenly became more unstable. That is, when the surface roughness was decreased, there was found a variation of the discharge current which seemed to have been caused by an instability of the discharging position of the magnetic pole. On the other hand, when Ra>10 nm, the head crushed frequently and no stable levitation was possible.

Also, a magnetic head was prepared in which Ra of the main magnetic pole was set to 3 nm with the intensity of ion beam varied during FIB working while Ra of the return magnetic pole was set to 0.5 nm or less (with no FIB working), and tested on write and read characteristics similarly to the first example. Since Ra (mean surface roughness) of the main magnetic pole was set to 3 nm, little instability of the discharge took place at the return magnetic pole. As the result, the medium noise was reduced by about 2 dB as compared with the characteristic shown in FIG. 25. Apparently, this treatment is effective for the ring type magnetic head as well. With different degrees of mean surface roughness, the test was repeated. It was found that the effect of medium noise reduction can be assured so long as Ra of the main magnetic pole is larger than Ra of the return magnetic pole. Since the cost for the FIF working adds to the total cost of the magnetic head, however, it should appropriately be selected depending on the system requirement whether the surface is to be roughed.

FIFTH EXAMPLE

As a fifth example of the eighth embodiment, a magnetic head was experimentally prepared in which the main magnetic pole had projections formed on the top end thereof. More specifically, the same process as for the fourth example was adopted to control the pattern of scanning with ion beam during the FIB working, thereby forming on the surface of the main magnetic pole 214 projections 241 each having the section shape as shown in FIG. 21. Four projections 241 were formed. The magnetic head was set in the write and read evaluation apparatus (spin stand) similarly to the first example to examine a variation of the discharge current during rotation. As a result, it was confirmed that the projections 241 contributed to the stability of discharging portion and the variation of the discharge current could be suppressed to a level equivalent to the standard value 1 in FIG. 26. Also, no discharge took place at the return magnetic pole 215 and the medium noise was reduced by about 3 dB as compared with the characteristic shown in FIG. 25. Evidently, the projections will be effective for the ring type magnetic head as well.

The projections can be formed by the FIB working as well as by patterning during formation of the head. The patterning is advantageous in saving of the labor for the FIB working but disadvantageous in that fine projections cannot easily be formed depending upon a process of forming the projections. It should appropriately be selected depending upon the system requirement how to form the projections. Needless to say, the number of the projections is not limited to four. In case a single projection 241 is provided, the heating point is limited so that the single projection is preferable for a delicate heating. However, the single projection is disadvantageous in that the supplied power cannot easily be increased. On the contrary, a larger number of the projections 241 will enable to more positively minimize the instability of discharge but will add more cost for the working.

SIXTH EXAMPLE

All techniques associated with the recording head according to the present invention such as recessing, provision of protective layer, surface roughness adjustment and forming of a projection are evidently applicable to the ring type magnetic head schematically shown in FIG. 22. This is because the basic concept and effect of the provision of the electron emitter on the magnetic pole (the magnetic pole is used to emit electrons) is independent of the form of the head.

NINTH EMBODIMENT

The present invention will further be described herebelow concerning the ninth embodiment thereof.

This embodiment provides a magnetic head and thermally-assisted magnetic reproducing device, in which the magnetic yoke or magnetic pole of the magnetic read head is used as electron emitter. This construction will enable high density read.

Figure 27:
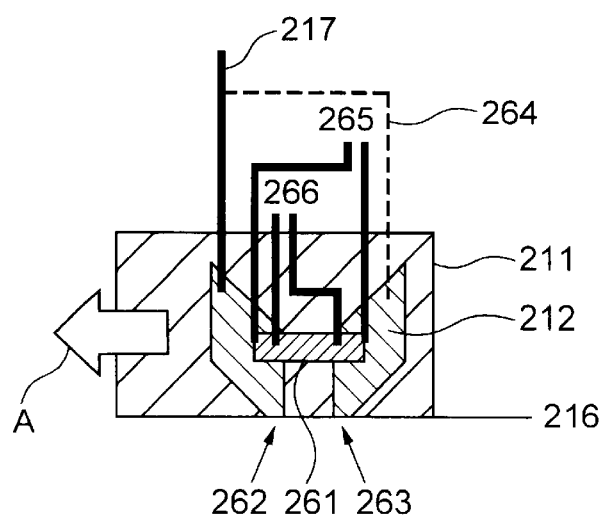
FIG. 27 is a conceptual sectional view of the essential portion of the magnetic read head according to the ninth embodiment of the present invention.

Referring now to FIG. 27, there is provided a conceptual sectional view of the essential portion of the magnetic read head according to the ninth embodiment of the present invention. The read head shown is a GMR head having a so-called "yoke type" structure. The head is moved in the direction of arrow A in FIG. 27. In FIG. 27, reference numeral 261 indicates a GMR element, 262 a leading-side magnetic pole, 263 a trailing-side magnetic pole, 264 an auxiliary lead, 265 a lead through which a current is supplied to the GMR element, and 266 a lead to detect a voltage based on a resistance variation equivalent to a read signal. A fringing field developed from a magnetic domain of the recording medium by the yoke or magnetic pole 212 is transmitted to the GMR element 261. Note that the construction shown in FIG. 27 is just an example and a TMR (tunneling magnetoresistance effect) element or any one of various magnetic detecting elements may be adopted in place of the GMR element 261.

In the construction shown in FIG. 27, the voltage lead 217 is connected to the yoke 212 to emit electrons from the yoke terminal on the ABS and heat the recording medium (not shown). As in the eighth embodiment, the heat source and magnetic detector can be placed very near to each other to enable an ultra-high thermally-assisted magnetic read.

The detail of the thermally-assisted magnetic read is disclosed in the report by H. Katayama et al. in the Journal of Magnetic Society of Japan, vol. 23, No. S1, p. 233, 1999.

Figure 28:
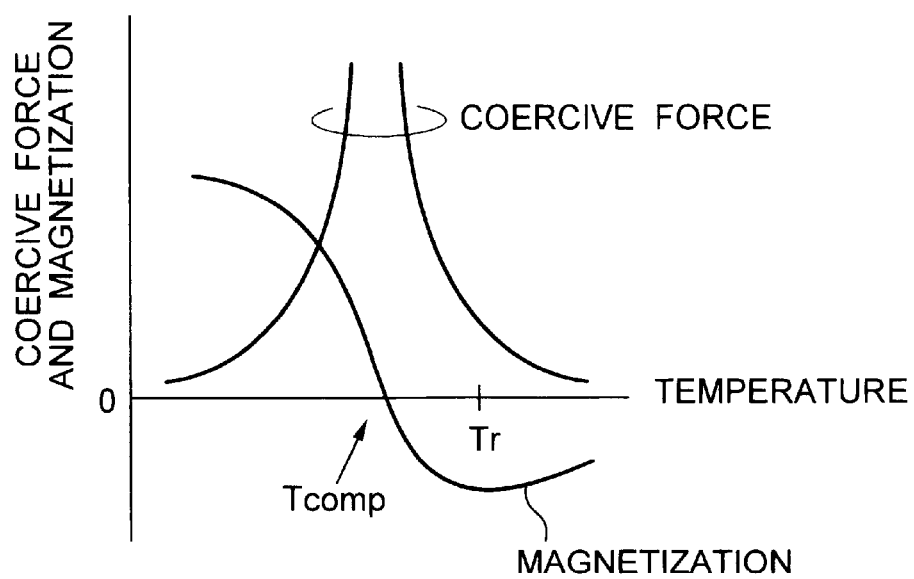
FIG. 28 graphically shows the magnetic characteristic of a layer or film of a ferrimagnetic alloy (R-T) of amorphous rare earth metal and transition metal.

The thermally-assisted magnetic read will be outlined below. For example, a ferrimagnetic alloy of an amorphous rare earth metal and a transition metal has a magnetic characteristic as shown in FIG. 28. As seen from FIG. 28, the coercive force of the alloy will increase as the alloy temperature is elevated. At a temperature (compensation temperature: Tcomp in FIG. 28), the coercive force will diverge infinitely and the magnetization will be changed from one direction to the other. Note that the compensation temperature Tcomp can be adjusted at a ratio between the rare earth metal and transition metal in the alloy.

In a medium designed for Tcomp to be near the room temperature, the magnetic domain wall after the recording will not easily move (since the coercive force is extremely large) and information holding characteristic will advantageously increase. However, since the medium is little magnetized in this condition, no signal can be provided even if read by the magnetic read head. When the medium is heated up to a temperature indicated with Tr in FIG. 28 for example during reading, a fringing field will take place with an intensity proportional to the magnetization at that temperature and thus the signal can be read.

According to the report by H. Katayama et al., the medium is heated by a focused laser light. This method is convenient for write in a size of about 1 μm but because of the limit of light diffraction, no magnetic recording is possible with a high density assumed for the magnetic recording device according to the present invention. Therefore, the medium is head by electron beam. As mentioned above, the incident electron beam enables to heat a very small area.

Also to the magnetic read head according to this embodiment, the techniques such as recessing, provision of protective layer, surface roughness adjustment, forming of the projection, etc. related to the recording head and having been described concerning the eighth embodiment are applicable as they are.

Note that the GMR element 261 and yoke 212 may possibly be in electrical contact with each other. In case electrons are emitted from the trailing-side yoke 263, a current for the emitted electrons will flow to the GMR element 261. When this is a problem, the techniques such as recessing, surface roughness adjustment, forming of the projection, etc. should be used to prevent the electron emission from taking place at the trailing side as having been described concerning the eighth embodiment. With the auxiliary lead 264 being provided, no potential difference will develop across the GMR element 261 irrespectively of the presence or absence of electron emission, and thus no current will flow to the GMR element 261. The above construction needs any working or an increased number of leads, so it should appropriately be adopted depending upon the magnitude of the current flowing to the GMR element 261.

The magnetic read head according to the ninth embodiment will further be described below concerning examples thereof:

SEVENTH EXAMPLE

A medium having a layer of a ferrimagnetic alloy (R-T) of amorphous rare earth metal and transition metal was prepared and evaluated similarly to the first example. The medium thus formed is composed of a heat sink layer of Al alloy formed, recording layer of TbFeCo, protective layer of C and a lubricant layer formed in this order on a glass substrate. The heat sink layer was provided to adjust the thermal response of the recording layer. The composition of the recording layer was adjusted so that the coercive force at a temperature near the room temperature (read temperature) would have such a value as could not be measured even by a VSM hose maximum applied field is 20 kOe. The medium was set along with the thermally-assisted magnetic read head in the spin-stand type write and read evaluation apparatus similarly to the first example to evaluate the read characteristic. Although the medium had a recording magnetic domain formed by the magnetic recording head used in the first example, no signal could be detected by ordinary GMR magnetic read head.

Figure 29:
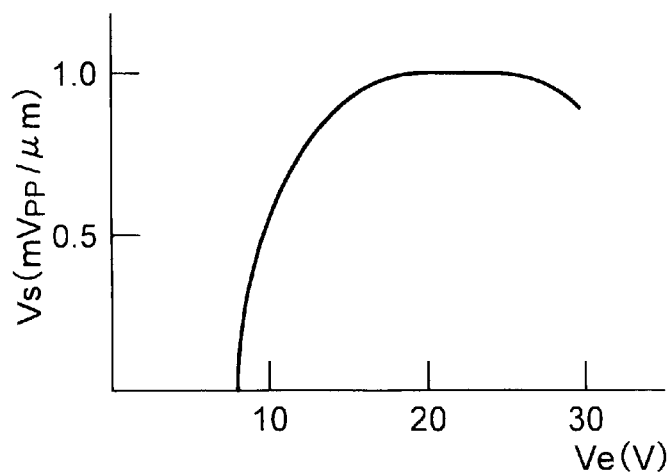
FIG. 29 graphically shows the result of the experiment on the information read by the magnetic read head according to the present invention.

FIG. 29 graphically shows the result of the experiment on the information read by the magnetic read head according to the present invention. In FIG. 29, the horizontal axis indicates a voltage applied o the yoke while the vertical axis indicates a GMR read output voltage Vs (normalized by peak value) per 1 μm of the track width. Since the medium is heated insufficiently or is not heated at all by emitted electrons when the applied voltage Ve is less than 7.5 V, the medium will not be magnetized so much as to develop a fringing field which can be detected by the GMR element, and so no signal can be acquired. As the applied voltage Ve exceeds 10 V or more, the medium is heated more by emitted electrons and the medium temperature is elevated, the magnetization will start gradually increasing and read signal intensity will increase. When the applied voltage Ve is about 25 V with which the medium temperature will be higher, the medium temperature is higher than Tr shown in FIG. 28 and so the read signal intensity will fall. Thus, it was confirmed that the thermally-assisted magnetic read head according to this embodiment could detect magnetic information from a fine magnetic domain from which the conventional magnetic head could not read.

(Tenth Embodiment)

The present invention will further be described herebelow concerning the tenth embodiment thereof.

This embodiment provides an electron beam recording device capable of an ultra-high density of recording even in the atmosphere or in any atmosphere approximate to the latter. This embodiment can write and read information with a higher density to and from various media such as magnetic recording medium as well as optical recording medium.

Experiment on Field Emission:

Before proceeding to the explanation of the electron beam recording device according to the present invention, the experiments the Inventors of the present invention conducted and results of the experiments will be described in detail below. Namely, the Inventors worked out the construction of this embodiment after repeating these experiments on the construction of the electron emitter and how the atmosphere around the electron emitter should be.

The experimental apparatus and devices the Inventors used in the experiments are similar to those having already been described with reference to FIG. 13. As having been described concerning the seventh embodiment, the Inventors used a modified STM (scanning tunneling microscopy) emitter. The STM emitter was modified in the same four respects and same manner as those having been described with reference to FIG. 13. Therefore, the experimental apparatus and procedure will not be described in detail.

First, the Inventors used carbon (C) as the material for the probe, and made Fowler-Nordheim plotting of the I-V characteristic measured at atmospheric pressure.

Figure 30:
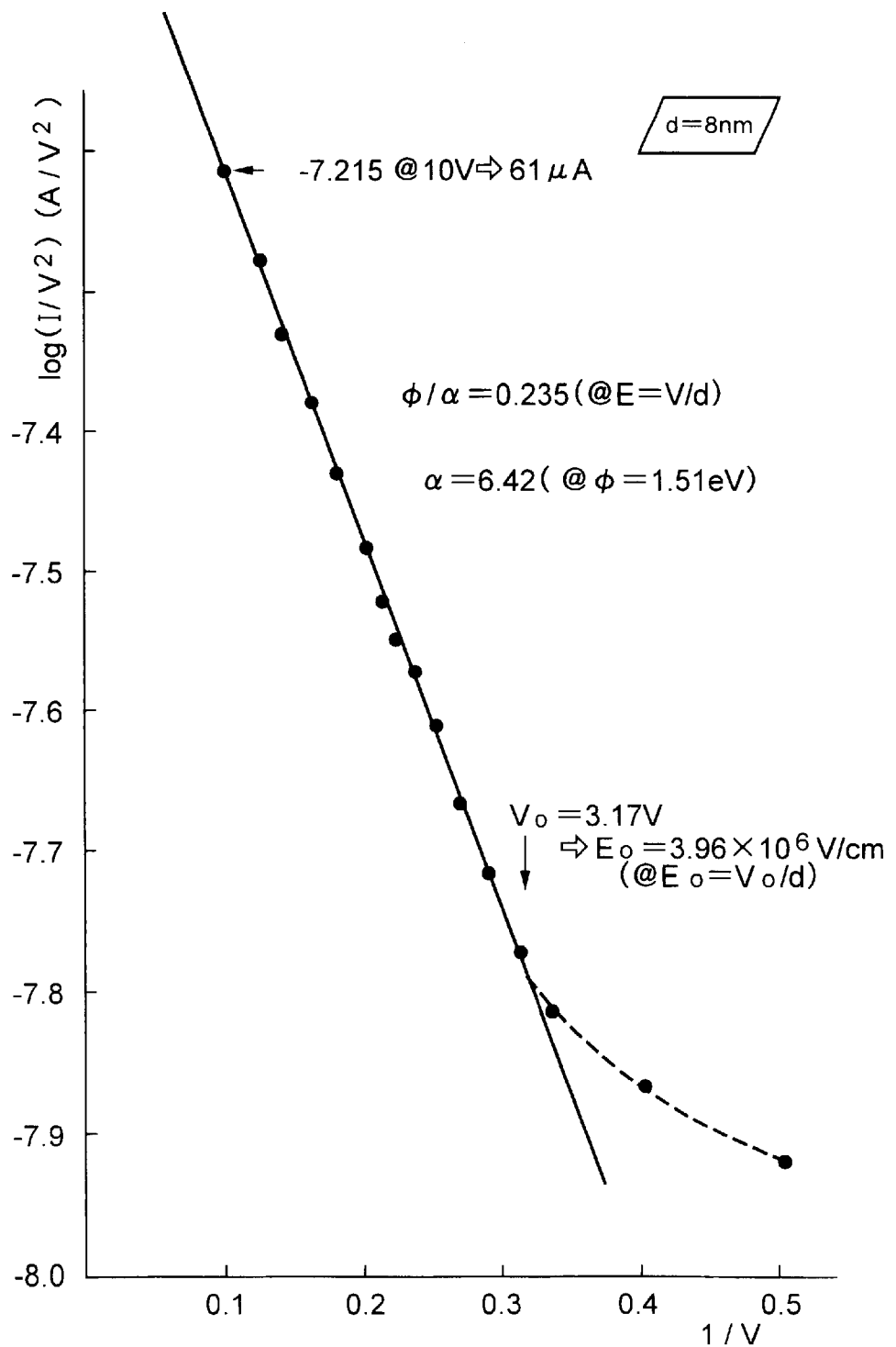
FIG. 30 graphically shows the Fowler-Nordheim plotting of the I-V characteristic experienced with the probe made of C (carbon) at atmospheric pressure.

FIG. 30 graphically shows the Fowler-Nordheim plotting of the I-V characteristic. In the experiment, the interval between the probe tip and sample surface was fixed to 8 nm. Disregarding the effect of field concentration at the probe tip and assuming a uniform electric field, a voltage of 1 V corresponds to a field intensity of $1.25 \times 10^6$ V/cm.

As apparent from FIG. 30, the I-V characteristic follows the Fowler-Nordheim expression when the applied voltage is 3.17 V or more, which proves that a field emission current could surely be acquired even in the atmosphere. The emission current when a voltage of 10 V was applied arrived at a value as large as 61 $\mu$A which is a sufficient value to heat the medium in the actual recording device to the recording temperature. The effective work function (a value resulted from division of the work function of a diamond-like carbon (DLC) layer by a shape enhancement coefficient), determined from the gradient of the straight line in FIG. 30, is 0.235 eV as a uniform field. Using this value and work function of the DLC layer (1.51 eV), the shape enhancement coefficient a is calculated to be 6.42. This value can be said to be a reasonable one since the radius of curvature of the tip of the C probe is 5 nm (thickness of the C layer coated on a Pt tip) and the interval between the probe and sample surface is 8 nm.

Note that an experiment made with the probe separated more from the sample surface revealed that the shape enhancement coefficient was doubly increased with the distance being longer. This experiment result is also reasonable since the field concentration can be considered to be remarkable with a longer interval between the probe tip and sample surface. Similar experiments were conducted with probes made of Ta and Si in addition to the C probe. As the result, the turn-on voltage of the field emission (a voltage with which the Fowler-Nordheim starts being linear) was higher than that of the C probe and the emission current was small. In any case, the Fowler-Nordheim plotting had a straight line portion, which proved that a field emission took place. Carbon (C) should preferably be used to assure that application of a low voltage results in a large field emission current.

Next, an applied voltage was set so that the emission current would be constant at some voltages in a range of 5 to 60 $\mu$A, to examine the time change of the emission current. In this experiment, a variety of atmospheres was selectively used in the container in which the probe was placed, including the atmosphere (atmosphere 1), a high purity rare gas atmosphere charged at 0.5 to 1 atm. after evacuation of the container (atmosphere 2), a high purity dry nitrogen atmosphere charged at 1 atm. after evacuation of the container (atmosphere 3) and a high purity oxygen atmosphere introduced at 1 atm. after evacuation of the container (atmosphere 4).

In the atmospheres 3 and 4, the field emission current was unstable even in a continuous operation of each of the C, Ta and Si probes for several tens of hours. In the atmospheres 1 and 2, the C probe provided a table field emission current but the field emission current was lower before the time of operation reached 10 hours. The material for a probe used in an inert gas atmosphere is not limited to any special one, but the carbon (C) should preferably be used to form a probe which is to be used in the atmosphere.

Supplemental explanation will be given of the mean free path of electrons in an atmosphere under a pressure near the atmospheric pressure. The reason why the electron beam is used under a vacuum in the conventional TEM (transmission electron microscopy) and SEM (scanning electron microscopy) systems is that when the electrons collide with gas molecules, they will be scattered (elastic collision) and lose energy (inelastic collision). However, the Inventors of the present invention worked out the fact that in case the spacing between the electron beam emitter and medium is sufficiently small, electron beam will little collide with gas molecules and can be incident upon the medium.

Figure 31:
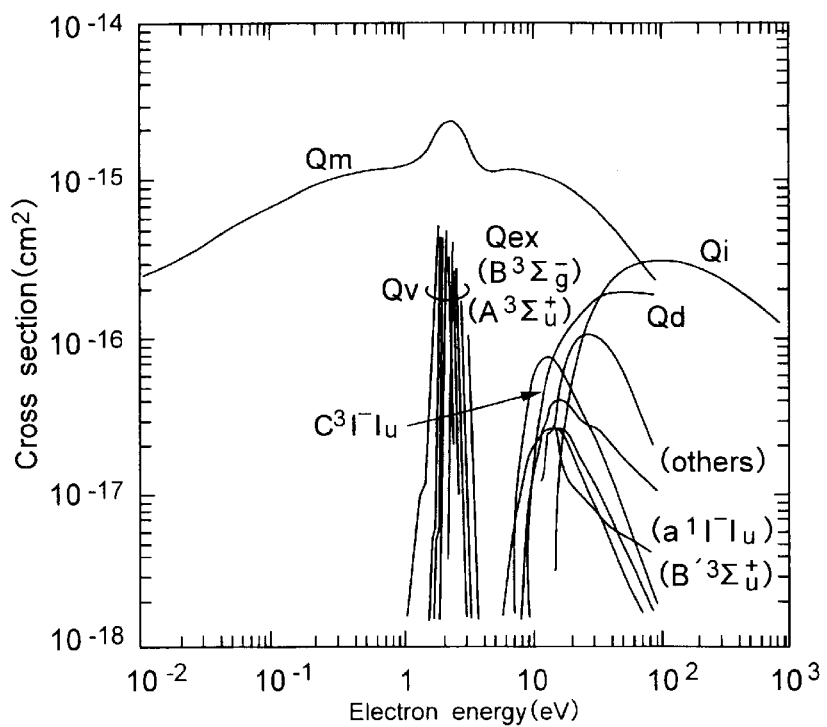
FIG. 31 graphically shows the collision cross section of electrons in nitrogen ($N_2$) as a function of the electron energy (Ee)
Figure 32:
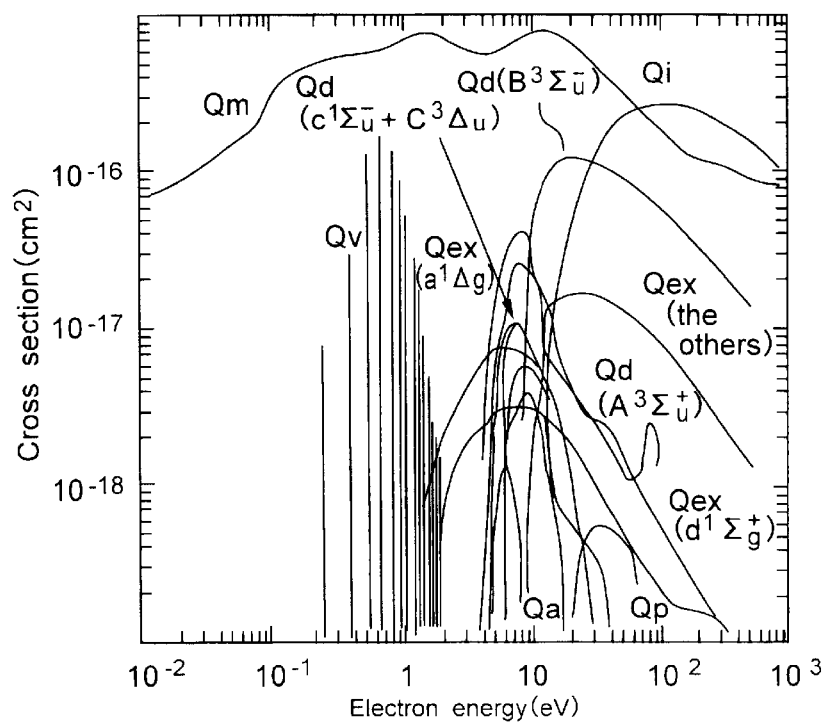
FIG. 32 graphically shows the collision cross section of electrons in oxygen ($O_2$) as a function of the electron energy (Ee)

FIGS. 31 and 32 graphically show the collision cross section of collision of electrons in nitrogen ($N_2$) as a function of the electron energy (Ee) and that of electrons in oxygen ($O_2$) as a function of the electron energy (Ee), respectively.

Figure 33:
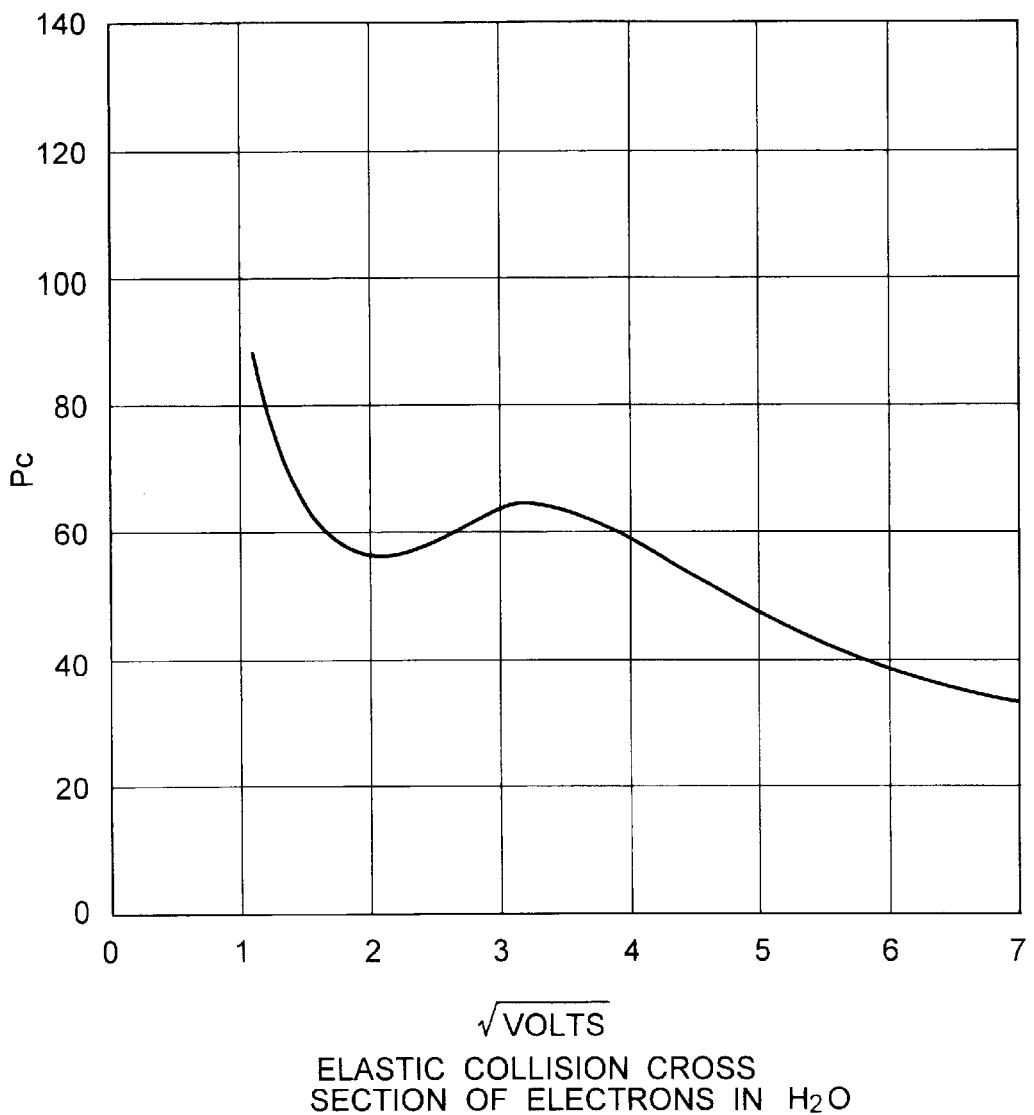
FIG. 33 graphically shows the momentum-conversion collision rate (Pc) of electrons in $H_2O$ (water)

FIG. 33 graphically shows the momentum-conversion collision rate (Pc) of electrons in $H_2O$ (water).

In the following description, symbols Qm, Qv, Qex, Qd, Qi and Qa will appear. Qm is a collision cross section at momentum conversion (elastic collision), Qv is a collision cross section at oscillating excitation, Qex is a collision cross section at excitation, Qd is a collision cross section at dissociation, Qi is a collision cross section at ionization, and Qa is a collision cross section at adhesion. The momentum-conversion collision rate (Pc) is a collision rate of an electron during travel over 1 cm under a gas pressure of 1 Torr, and it has a following relation with a collision cross section at a momentum conversion (elastic collision) (Qm):

$$Pc = 3.54 \times 10^{16} \times Qm \ (cm^{-1})$$

As seen from each collision cross section shown in FIGS. 31 and 32, Qm is largest. So, this collision cross section will first be explained. This is a collision cross section of electron at momentum conversion. In the collision of an electron with a molecule, the electron will lose little energy and change the direction of movement.

However, since the collision probability cannot easily be known from Qm itself, Qm is converted to a mean free path (k) to better know the momentum conversion collision cross section. The relation between Qm and $\lambda$ is given by the following expression:

$$\lambda = (n \times Qm)^{-1} \text{ (cm)}$$

where n is molecular density and its value at atmospheric pressure at the room temperature (25° C.) is given by the following expression:

$$n = 2.46 \times 10^{19} \text{ (cm}^{-3}\text{)}$$

As apparent from FIGS. 31 and 33, the momentum conversion collision cross section (Qm) shows a largest value at Ee of about 2.5 (eV) in an $N_2$ gas atmosphere and also at Ee of about 1 (eV) in $H_2O$. With a Qm value of about $2 \times 10^{-15}$ (cm$^2$) at this time, the mean free path ($\lambda$) will be about 200 nm. For example, when the distance between the electron emitter and medium is 10 nm, the probability of collision of the electron emitted from the emitter with gas molecule before it is incident upon the medium can be calculated to be 5% or so $(1-e^{-0.05})$. This value is a one when the mean free path ($\lambda$) is shortest. As seen from FIG. 31, the mean free path $\lambda$ is 400 nm or more except for electrons of 1 to 4 (eV) in $N_2$ gas as will be seen from FIG. 31. With this value of $\lambda$, the collision probability of electrons will be on the order of 2.5%. It cannot be said that no collision occurs but that the elastic collision-caused scattering loss is extremely small.

Next, the inelastic collision will be described. First, the inelastic collision of electrons in $N_2$ and $O_2$ gas atmospheres will be explained. As seen from FIGS. 31 and 32, the collision cross section is large in the order of Qv, Qex, Qd and Qa within a range of Ee being about 10 (eV). For each of these collision cross sections, collision probability will be estimated as for Qm. This estimation will be made concerning gases in which each collision cross section is large. The maximum probability with which the electron will collide gas molecules on a way from emission from the emitter until incidence upon the surface of a medium 10 nm off the emitter is estimated to be 1.2% in $N_2$ gas at oscillating excitation, 0.1% in $O_2$ gas at excitation, be 0.07% at dissociation ($O_2 \rightarrow O+O$) and 0.004% at adhesion ($O_2 + e \rightarrow O^- + O^+$). The energy loss of the electron at each collision is equivalent to the value along the horizontal axis in FIGS. 31 and 32, for example, on the order of 1 to 4 (eV) at oscillating excitation and 5 to 10 (eV) at excitation and dissociation. The energy loss due to one inelastic collision is not ignorable but the probability of the inelastic collision itself is very low, so the total energy loss may be regarded as ignorably small.

The inelastic collision cross section in $H_2O$ is unknown, but it is considered that an oscillating excitation will take place in $H_2O$. Also, since the energy of the dissociation of $H_2O \rightarrow H + OH$ and $OH \rightarrow O + H$ are 0.2 eV and 4.8 eV, respectively, the dissociation collision should be taken in consideration. Since the collision of dissociated species with elections is stepwise, it is considered to be ignorably small. Since the ionization thresholds of H and O being the dissociated species of $H_2O$ are 13.5 eV and 13.6 eV, respectively, the ionization of $H_2O$ may not be taken in consideration. If it can be estimated that the inelastic collision cross section in $H_2O$ is same as in $N_2$ and $O_2$, the energy loss in $H_2O$ can be judged to be extremely small.

As seen from the above, when the spacing between the electron emitter and medium surface is smaller than several hundreds of nm, electrons from the emitter will incur little scattering loss and energy loss on a way until incidence upon the medium surface. However, an excitation collision and dissociation collision will take place but not frequently. Practically, it will be important whether those of dissociated species and excited species which are diffused to the emitter or medium without being recombined or de-excited will cause the deterioration. Major ones to be taken in consideration are inert gases such as OH radical and O radical. Therefore, partial pressure of these gases should appropriately be selected taking in consideration any influence of them on the lubricant layer on the emitter surface and medium outermost surface.

Static data write:

The aforementioned experiment results have proved that a sufficient field emission current for heating the medium can be provided stably. Actually, a magneto-optical recording medium, phase-change recording medium and dye layer medium were actually prepared as samples. First, STM was used to make write experiment on each of them being static o relatively still in the atmosphere.

The sample was an Si wafer substrate on which a recording layer used in each medium was formed to a thickness of about 50 nm. The magneto-optical layer was formed from a transition metal-rich layer (whose compensation point is lower than the room temperature) and uniformly magnetized with the layer directed downward. The phase-change recording layer was initially crystallized uniformly. The write and read was evaluated using the same apparatus as in FIG. 13.

The write test was done with the C-coated probe separated about 10 nm from he sample surface, a voltage was applied in a pulsed manner for field emission of a current flow to heat the medium. The voltage applied to the probe (namely, emission current value) and voltage pulse duration were taken as parameters. At each write, the sample was canned about 100 nm and a record mark was formed in the form of a matrix, which was intended for easy finding a location of the record mark in a next mark observation test (static read).

In the write test on the magneto-optical layer, the sample was applied uniformly with an upward recording magnetic field of 200 Oe. Taking as parameters the voltage applied to the probe and voltage duration, a transition magnetic domain rows were defined, and then the mark rows were observed using MFM.

In the test on the phase-change recording layer, the voltage applied to the probe and voltage pulse duration were taken as parameters and amorphous marks were recorded, and then the marks were observed using SPOM.

Also, in the test on the dye layer, the voltage applied to the probe and voltage pulse duration were taken as parameters and deformation of the dye layer was recorded. Thereafter, the marks were observed using STM switched to STM mode.

Figure 34:
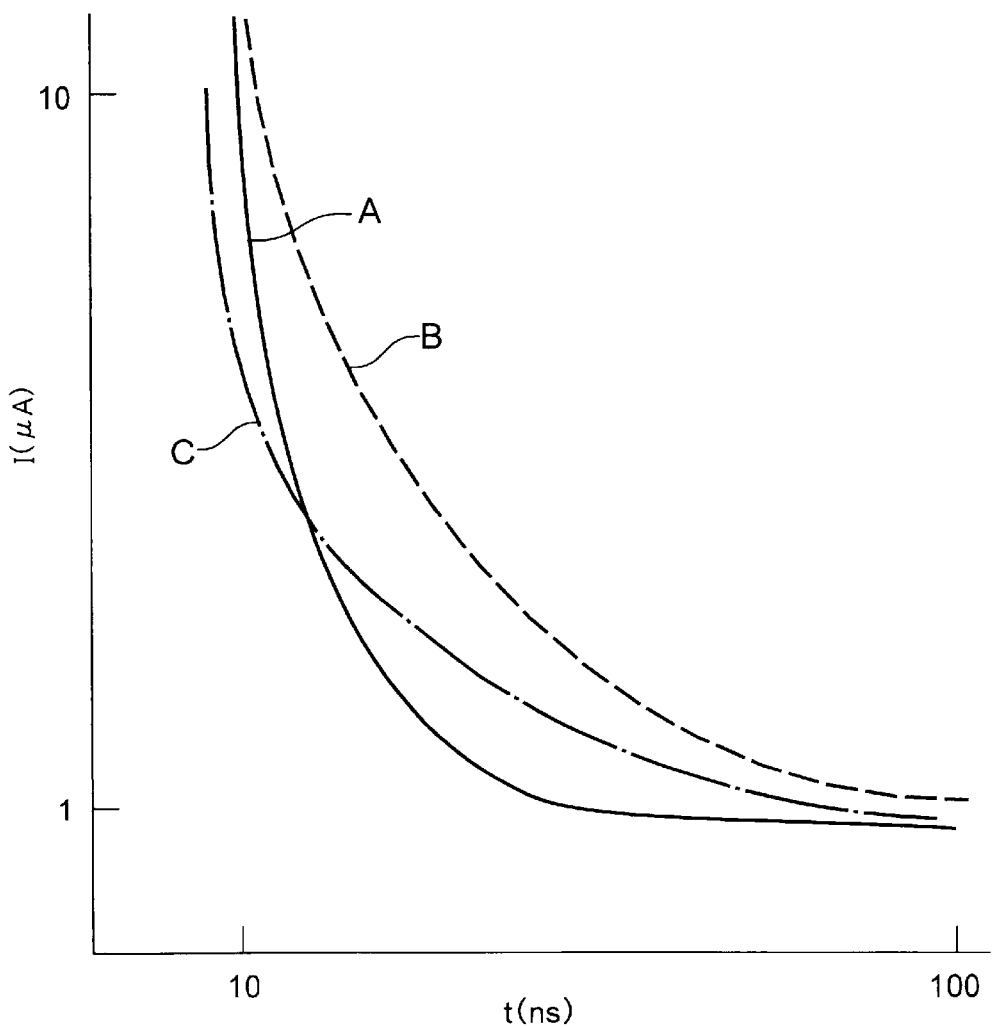
FIG. 34 graphically shows together the result of static write and read test, the field emission current I being indicated along the vertical axis while the voltage pulse time t is indicated along the horizontal axis.

FIG. 34 graphically shows together the result of static write and read test, the field emission current I being indicated along the vertical axis while the voltage pulse time t is indicated along the horizontal axis. In FIG. 34, the reference A indicates the result of the test made on the magneto-optical recording layer, B the result of the test on the phase-change recording layer, and C the result of the test made on the dye layer. Each curve in FIG. 34 indicates a boundary of an area above the curve in which the record marks could be found. The resolution of the observation depends upon the means for observation but it is on the order of 10 nm. Thus, no definite observation was possible of the record marks of less than 10 nm. The curves A, B and C in FIG. 34 mean that the record marks of about 10 nm were formed under the conditions above them. When the current I is large or pulse duration t is long, the marks were large and saturated at a size of 20 nm or so. It means that the spot size of the electron beam on the medium surface was 20 nm or so. Since the field emission current is emitted from the tip of 10 nm or so in diameter of the probe and the spacing between the probe and medium was 10 nm or so, the test results may be said to be reasonable. As having been described above, since the time of voltage application was relatively long in the static write test, even a current of as low as 1 to 10 $\mu$A could form such record marks.

Dynamic Write and Read:

As in the above, the static write and read were successfully made. Next, the Inventors of the present invention experimentally prepared a recording device and operated it for recording.

Figure 35:
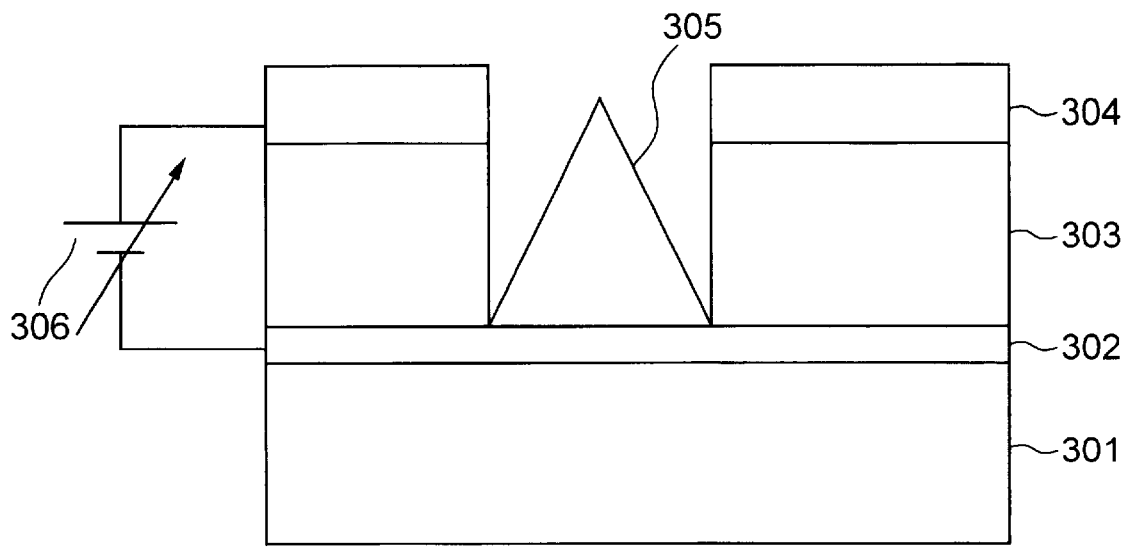
FIG. 35 is a conceptual view of the essential portion of the recording head usable in the electron beam recording device according to the present invention.

FIG. 35 is a conceptual view of the essential portion of the recording head usable in the electron beam recording device according to the present invention. In FIG. 35, reference numeral 301 indicates a head substrate, 302 a emitter electrode layer, 303 an insulative member, 304 a gate electrode, 305 an emitter, and 306 a voltage source. The surface of the gate electrode layer 304 in FIG. 35 works as the air bearing surface (ABS), namely, a surface opposite to a medium during magnetic recording.

The substrate 301 should preferably be formed from an ALTIC substrate used as a magnetic head slider or an ALTIC substrate having an Si wafer joined thereon. In the latter case, the emitter can be formed by surface orientation selective etching of Si material. The emitter electrode 302 may be formed from any conductive material but preferably from Cu (copper), Al (aluminum), Au (gold), Ag (silver) or an alloy using any of them as base, which has a high electrical conductivity.

The insulative member 303 may be an dielectric material or resist, for example, $SiO_2$. The gate electrode 304 may not always be provided. In a construction without the gate electrode, a voltage is applied directly between the emitter and medium. Also in the construction with no gate electrode, the top end of the emitter should preferably be recessed from the ABS as shown in FIG. 35 in order to prevent abrasion of the emitter top end. For a contact recording, the recessed distance will define a distance between the emitter and medium. For an levitated recording, no recessing is required.

The gate electrode 304 may be formed from a similar or same material as for the emitter electrode 302. The emitter may be formed from any material which is capable of field emission of electrons, and preferably from Ta, Si or C, and more preferably, from C (DLC). Alternatively, a suitable metal may be worked to be a cone and DLC be coated to a thin layer on the cone. The voltage source 306 may be either DC or pulsed one, or a modulated one. In the last case, it is should be modulated to prevent variation of emission current due to variation of levitation, or record mark size is multi-valued for a higher density of recording.

The electron beam recording head constructed as in FIG. 35 can be constructed as in the following. First, the emitter electrode layer 302 is formed on the ALTIC substrate 301 by sputtering or evaporation, and worked to a predetermined pattern by etching. The predetermined pattern means electrical connection between the emitter electrode and emitter and leading of the emitter to a pad for connection to the voltage source 306.

Next, the insulative member 303 is formed by sputtering, evaporation, CVD process or the like. For using a resist as the insulative member 303, the spin coating is employed. Next, the gate electrode layer is formed by sputtering or evaporation, and then is subjected to PEP process in which a gate electrode on which an emitter is to be provided and an insulation under the electrode are removed by etching. The insulation may be removed by anisotropic etching or isotropic etching. In the latter case, a cavity will be formed near a working hole for the gate electrode. A construction using no gate electrode, the gate electrode portion may be formed from any material other than electroconductive material, and the material may be the same as for the insulative member 303.

Next, the emitter material is formed by sputtering. For example, by sputtering with an appropriate anisotropy from above the gate, a conic emitter can be formed spontaneously owing to "shadowing effect" peculiar to sputtering. The "shadowing effect" is such that a layer formed on the top of he gate 304 by sputtering will grow in the form of a debris from around the gate hole towards center and the emitter will grow on the emitter electrode behind the debris.

Next, the emitter layer is removed from the gate by CMP (chemical mechanical polishing) for example. Then, with the pads of the emitter and gate electrodes being exposed, Au is grown on the pads by frame plating to form terminals. After that, the terminal was cut into chips and each chip was worked into a slider. The chip was assembled by head gimbal assembling, the terminal was connected to the lead from the voltage source to complete the recording head installable in the electron beam recording device according to the present invention.

The present invention is not limited to any special head type but it may be applied to a so-called planer type head in which a film element is formed on the lateral side of a slider, a head prevailing in the current field of he magnetic recording head and in which a film element is formed on the rear end face of a slider, or to a head in which an electron beam source is attached to a slider with a PEP precision. For example, the electron emitter may be formed on the lateral side or rear end face of a slider by using a wedge-like mask to make an oblique sputtering, thus forming a DLC layer on the wedge-like mask (whereby an emitter having a sharp tip formed owing to the "shadowing effect" can be formed), or by sharpening the tip of an emitter, once formed, by FIB working for example at the later stage of process.

In addition to forming an emitter directly on a slider in the layer or film forming process, the following method is also possible. Namely, a convex pattern is formed on a slider substrate with a slider-size pitch, then a concave pattern corresponding to the convex pattern the slider substrate is provided on a substrate on which the emitter is to be formed, and the substrates are joined to each other and chipped to provide the emitter.

The electron beam recording according to the present invention can be effected as in the following with the recording head formed as in the above being installed to a head of the spin-stand type magnetic write and read evaluation apparatus for example.

Figure 36:
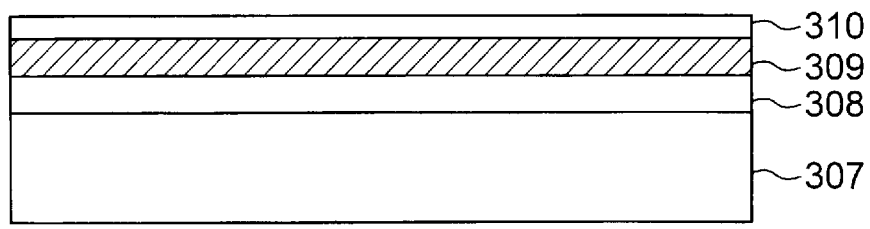
FIG. 36 is a sectional view of an example of the recording medium usable in the embodiments of the present invention.

FIG. 36 is a sectional view of an example of the recording medium usable in the embodiments of the present invention. In FIG. 36, reference numeral 307 indicates a medium substrate, 308 a seed layer, 309 a recording layer, and 310 a protective layer. The construction of this medium varies from one reading method to another. The construction shown in FIG. 36 is suitable for a probe type reading as in the aforementioned static write and read test. When a near-field light is used for an optical reading, the construction should be of an optical interference type similarly to that used in ordinary optical discs.

In any case, it is important that for writing, the electron emitter and medium should be placed near each other with a distance smaller than the mean free path of electrons in the operating atmosphere, and that for reading with a high resolution, the probe or near-field light source and medium should be disposed near each other as in the writing.

The medium substrate 307 may be formed from glass, Si or polycarbonate, and address information, servo control information, etc. may be formatted by either pre-formatting or soft-formatting.

The pre-formatting may be such that pre-pits and pre-grooves are formed in the medium substrate by the 2P process for example, or in case of a polycarbonate substrate, pit and land pattern may be formed directly in the substrate by injection molding.

The seed layer 308 is not always necessary. In case a phase-change layer is used as the recording layer 309, however, the seed layer 308 should preferably be formed from a metal layer, nitride layer, oxide layer or metal microparticle-dispersed layer to promote the crystallization speed and control the crystal particle size. In case the recording layer 309 is formed from a magneto-optical layer, the seed layer 308 should preferably be formed from a metal layer, metal alloy layer or the like to control the pinning site of the domain walls. In case the recording layer 309 is formed from a dye layer, the seed layer 308 should preferably be formed from a light-absorbing metal layer or an organic layer other than dye for promotion of deformation of the dye. In case the recording layer 309 is formed from a magnetic recording layer, the seed layer 308 should preferably be formed from Cr or V polycrystalline layer to control the crystal magnetic anisotropy. In case of a vertical magnetization recording layer, the seed layer 308 should preferably be formed from a soft-magnetic layer.

The recording layer 309 may be formed from any of the phase-change, magneto-optical, dye and magnetic layers which are typical ones in the field of art. However, it is not limited to these materials but it may be formed from a material whose temperature can be elevated by incident electron beams and in which some physical change will take place also by the electron beams.

The protective layer 310 should be formed from a ceramic and DLC such as oxide, nitride, carbide and boride. The protective layer should preferably have coated thereon a lubricant layer used in the magnetic recording.

The medium shown in FIG. 36 can be formed by a combination of preformat process and sputtering process. When the medium is to be soft-formatted, it can be formed by a combination of sputtering process and soft-format process (e.g., servo write process as in magnetic recording head).

The electron beam recording head according to the present invention and the above-mentioned medium were tested as in the foregoing with them set in the spin-stand type write and read evaluation apparatus.

Figure 37:
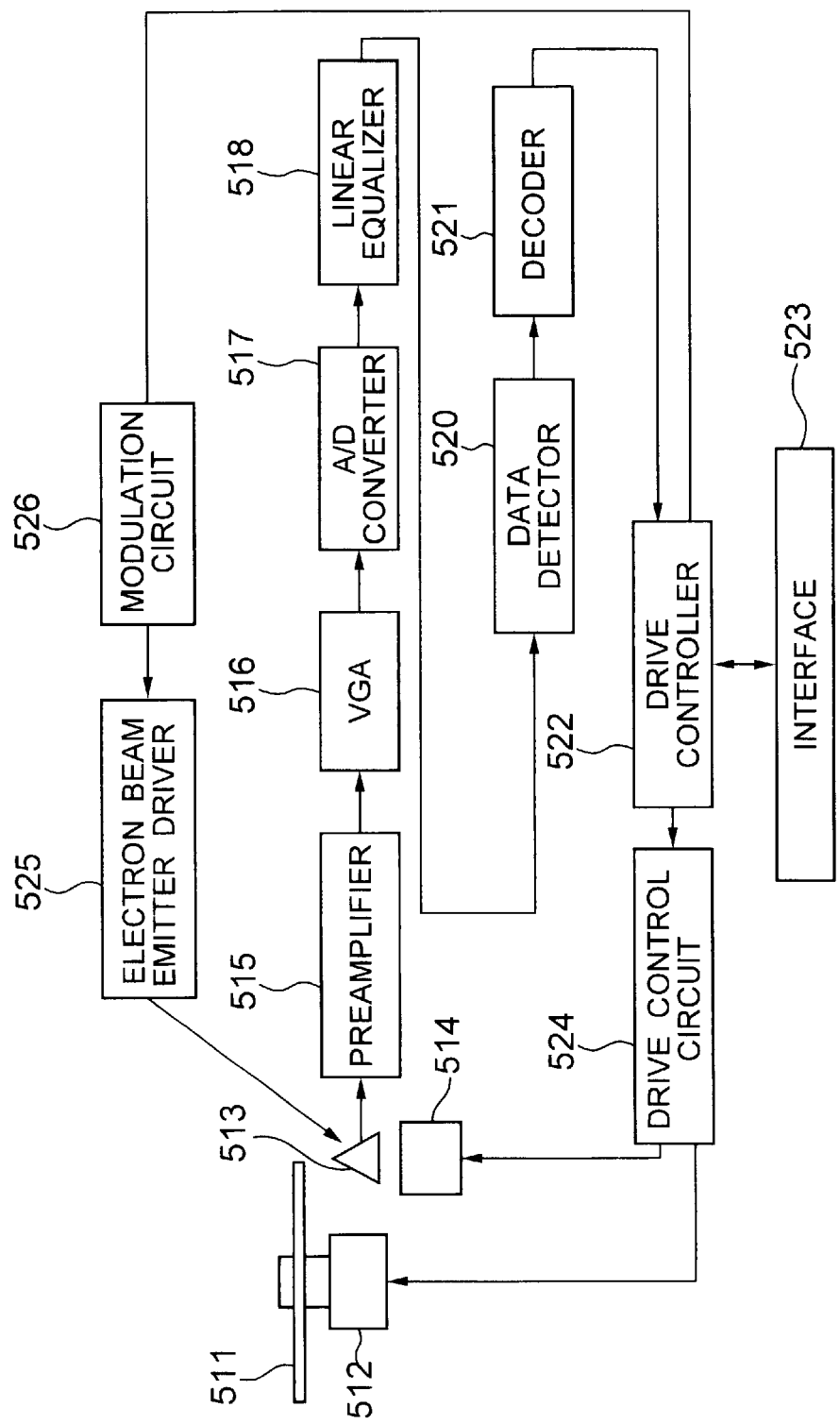
FIG. 37 is a block diagram of the electron beam recording/reproducing device according to the present invention, showing an example thereof.

FIG. 37 is a block diagram of the electron beam recording/reproducing device according to the present invention, showing an example thereof. In FIG. 37, reference numeral 511 indicates a disc-shaped recording medium, 512 a spindle motor, 513 a write/read head provided with a write electron emitter and read probe or near-field light source, 514 a servo motor system to drive the head, 515 a preamplifier to amplify read signal, 516 a variable gain amplifier, 517 an A/D converter to convert the amplified read signal to digital form, 518 a linear equalizer such as Viterbi decoder, 520 a data detection circuit to restore the read signal to original signal, 521 a decoder, 522 a drive controller to control transfer of write and read data, 523 an interface, 524 a circuit to drive and control the spindle motor and head drive servo motor, 525 an electron emitter driver, and 526 a modulation circuit.

Note that the necessary components for the present invention are the recording system including the interface 523, drive controller 522, electron emitter driver 525, drive control circuit 524, head drive servo motor 514, recording head 513 provided with an electron emitter, medium drive spindle motor 512 and recording medium 511, and the other components related to the reading are not essential.

In the construction shown in FIG. 37, the medium 511 is rotated by the spindle motor 512 to guide the head 513 on which the electron emitter is formed to a predetermined recording track, and the electron emitter driver 525 drives the electron emitter to direct an electron beam towards the medium, thereby writing data to the medium. This is the basic concept of the present invention. In case the electron source has a gate electrode, the driver 525 should be a one which can control both the voltage between the emitter and gate and voltage between the gate and medium.

In the foregoing, the present invention has been described concerning the embodiments thereof and examples of the embodiments. However, it should be noted that the present invention is not limited to these embodiments and examples.

For example, a structure and material of each of the elements composing together the electron emission source and magnetic head can appropriately be selected by those skilled in the art from the well-known range, in addition to those having been described in the foregoing, to attain the same effect as that of the present invention.

Also, the recording medium may be a one capable of a magnetic recording, whether so-called "in-plane recording" or "vertical recording". For example, the recording medium may be any of various types including "keepered media" having a magnetic recording layer and soft-magnetic layer.

Furthermore, the recording medium is not limited to so-called hard disc but may be any of other media capable of magnetic recording such as flexible disc, magnetic card.

Similarly, the magnetic recording device may be a one intended only for magnetic write or a one intended for both write and read. The magnetic head and medium may be disposed in a geometrical relation with each other, such as so-called "levitated slide" or "contact slide". Moreover, the magnetic recording device may be a so-called "removable" type one from which the recording medium can be removed.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Application No.H11-375042 filed on Dec. 28, 1999 including specification, claims, drawings and summary is incorporated herein by reference in its entirety.

What is claimed is:

1. A thermally-assisted magnetic recording device comprising:
    an electron emitter configured to emit electrons toward a magnetic recording medium in a gas atmosphere at substantially atmospheric pressure for heating a recording portion of the magnetic recording medium to decrease a coercive force; and
    a magnetic pole configured to apply a magnetic field to the magnetic recording medium to record an information magnetically to the recording portion decreased in coercive force, wherein the electron emitter and the magnetic recording medium are spaced from each other by a distance shorter than the mean free path of the electrons emitted form the electron emitter.

2. The thermally-assisted magnetic recording device according to claim 1, wherein the electron emitter heats the magnetic recording medium so that a coercive force of the recording portion of the magnetic recording medium becomes smaller than an intensity of the magnetic field developed at the recording portion by the magnetic pole.

3. The thermally-assisted magnetic recording device according to claim 1, wherein at an ambient temperature, the recording portion of the magnetic recording medium has a larger coercive force than the intensity of the magnetic field developed by the magnetic pole.

4. A thermally-assisted magnetic recording device comprising:

an electron emitter configured to emit electrons toward a magnetic recording medium for heating a recording portion of the magnetic recording medium to decrease a coercive force;

a magnetic pole configured to apply a magnetic field to the magnetic recording medium to record an information magnetically to the recording portion decreased in coercive force; and a driving mechanism configured to move the magnetic recording medium in relation to the electron emitter and the magnetic pole, wherein the electron emitter is provided at a leading side of the direction of the movement by the driving mechanism and the magnetic pole is provided at a trailing side of the direction of the movement by the driving mechanism.

5. The thermally-assisted magnetic recording device according to claim 4, wherein the electron emitter includes a plurality of electron emitting portions disposed along a direction of the movement thereof by the driving mechanism.

6. The thermally-assisted magnetic recording device according to claim 4, wherein a recording track parallel to the moving direction is formed on the magnetic recording medium; and a length Te of the electron emitter in a width direction of the recording track and a length Tw of the magnetic pole in a width direction of the recording track are in a relation of $Te/2 \leq Tw \leq 2Te$ with each other.

7. The thermally-assisted magnetic recording device according to claim 1, wherein the electron emitter emits the electrons by field emission.

8. A thermally-assisted magnetic recording device comprising:

an electron emitter configured to emit electrons toward a magnetic recording medium for heating a recording portion of the magnetic recording medium to decrease a coercive force; and a magnetic pole configured to apply a magnetic field to the magnetic recording medium to record an information magnetically to the recording portion decreased in coercive force, wherein the electron emitter emits the electrons in a non-oxidizing atmosphere.

9. The thermally-assisted magnetic recording device according to claim 8, the oxygen partial pressure X (in mols/cm$^3$) and emission electron current density J (in A/cm$^2$) of around the electron emitter are in relations of $X \leq 1.25 \times 10^{12} \times J$ and $J \leq 10^4$ with each other.

10. A thermally-assisted magnetic recording device comprising:

a recording magnetic pole configured to apply a magnetic field to a magnetic recording medium; and a lead connected to the magnetic pole;

wherein a voltage is applied to the lead to allow the magnetic pole to emit electrons with which a recording portion of the magnetic recording medium is heated, and information is recorded magnetically to the magnetic recording medium by applying the recording portion with a magnetic field from the magnetic pole.

11. The thermally-assisted magnetic recording device according to claim 10, wherein the mean value of the surface roughness of the magnetic pole opposite to the magnetic recording medium is over 0.5 nm and under 10 nm.

12. The thermally-assisted magnetic recording device according to claim 10, further comprising a return-path magnetic pole forming a magnetic circuit for the magnetic field with the magnetic pole and magnetic recording medium;

the return-path magnetic pole being located as recessed from the magnetic pole as viewed from the magnetic recording medium.

13. The thermally-assisted magnetic recording device according to claim 10, further comprising a return-path magnetic pole forming a magnetic circuit for the magnetic field with the magnetic pole and magnetic recording medium, a mean value of the surface roughness of the return-path magnetic pole opposite to the magnetic recording medium being smaller than a mean value of the surface roughness of the magnetic pole opposite to the magnetic recording medium.

14. The thermally-assisted magnetic recording device according to claim 10, wherein the magnetic pole has at least a projection provided on a surface thereof opposite to the magnetic recording medium.

15. A thermally-assisted magnetic recording device comprising:

an electron emitter configured to emit electrons toward a magnetic recording medium for heating a recording portion of the magnetic recording medium to decrease a coercive force; and a magnetic pole configured to apply a magnetic field to the magnetic recording medium to record an information magnetically to the recording portion decreased in coercive force, wherein the electron emitter emits the electrons in a depressurized atmosphere.

16. The thermally-assisted magnetic recording device according to claim 1, wherein the electron emitter emits electrons by field emission.

17. The thermally-assisted magnetic recording device according to claim 1, wherein the electron emitter has a surface layer formed mainly from carbon.

18. The electron beam recording device according to claim 1, wherein a spacing d (in nm) between the electron emitter and the magnetic recording medium meets the following condition:

$$d < \lambda \min \times (760/P)$$

where λmin is the minimum value (in nm) of the mean free path of the electrons at 1 atm. and P is the pressure (in Torr) of the gas atmosphere.

* * * * *